June 1, 1954

I. MOLNAR 2,680,155

TELEPHONE SYSTEM USING MAGNETIC RECORDER

Filed Oct. 26, 1949

23 Sheets-Sheet 1

INVENTOR.
IMRE MOLNAR

BY

Smith, Olsen & Baird

ATTYS.

June 1, 1954 I. MOLNAR 2,680,155

TELEPHONE SYSTEM USING MAGNETIC RECORDER

Filed Oct. 26, 1949

23 Sheets-Sheet 2

INVENTOR.
IMRE MOLNAR
BY
Smith, Olsen & Baird
ATTYS.

June 1, 1954 I. MOLNAR 2,680,155

TELEPHONE SYSTEM USING MAGNETIC RECORDER

Filed Oct. 26, 1949

23 Sheets-Sheet 3

INVENTOR.
IMRE MOLNAR

BY *Smith, Olsen & Baird*

ATTYS.

INVENTOR.
IMRE MOLNAR
BY
Smith, Olsen & Baird
ATTYS.

INVENTOR.
IMRE MOLNAR
BY
Smith, Olsen & Baird
ATTYS.

June 1, 1954 I. MOLNAR 2,680,155

TELEPHONE SYSTEM USING MAGNETIC RECORDER

Filed Oct. 26, 1949 23 Sheets-Sheet 6

INVENTOR.
IMRE MOLNAR
BY
Smith, Olsen & Baird
ATTYS.

INVENTOR.
IMRE MOLNAR
BY
Smith, Olsen & Baird
ATTYS.

June 1, 1954 I. MOLNAR 2,680,155

TELEPHONE SYSTEM USING MAGNETIC RECORDER

Filed Oct. 26, 1949 23 Sheets-Sheet 8

INVENTOR.
IMRE MOLNAR
BY
Smith, Olsen & Baird
ATTYS.

June 1, 1954 I. MOLNAR 2,680,155

TELEPHONE SYSTEM USING MAGNETIC RECORDER

Filed Oct. 26, 1949

23 Sheets-Sheet 9

INVENTOR.
IMRE MOLNAR
BY
Smith, Olsen & Baird
ATTYS.

June 1, 1954 I. MOLNAR 2,680,155

TELEPHONE SYSTEM USING MAGNETIC RECORDER

Filed Oct. 26, 1949

23 Sheets-Sheet 10

*INVENTOR.*
IMRE MOLNAR

*BY* Smith, Olsen & Baird

ATTYS.

June 1, 1954

I. MOLNAR 2,680,155

TELEPHONE SYSTEM USING MAGNETIC RECORDER

Filed Oct. 26, 1949

23 Sheets-Sheet 11

INVENTOR.
IMRE MOLNAR

BY
Smith, Olsen & Baird

ATTYS.

June 1, 1954

I. MOLNAR 2,680,155

TELEPHONE SYSTEM USING MAGNETIC RECORDER

Filed Oct. 26, 1949

23 Sheets-Sheet 12

INVENTOR.
IMRE MOLNAR
BY
Smith, Olsen & Baird
ATTYS

June 1, 1954 I. MOLNAR 2,680,155

TELEPHONE SYSTEM USING MAGNETIC RECORDER

Filed Oct. 26, 1949

23 Sheets-Sheet 13

INVENTOR.
IMRE MOLNAR
BY
Smith, Olsen & Baird
ATTYS.

INVENTOR
IMRE MOLNAR
BY
Smith, Olsen & Baird
ATTYS.

June 1, 1954 I. MOLNAR 2,680,155

TELEPHONE SYSTEM USING MAGNETIC RECORDER

Filed Oct. 26, 1949 23 Sheets-Sheet 15

INVENTOR.
IMRE MOLNAR
BY
Smith, Olsen & Baird
ATTYS.

June 1, 1954 I. MOLNAR 2,680,155

TELEPHONE SYSTEM USING MAGNETIC RECORDER

Filed Oct. 26, 1949

23 Sheets-Sheet 16

INVENTOR.
IMRE MOLNAR

BY
Smith, Olsen & Baird
ATTYS.

June 1, 1954

I. MOLNAR 2,680,155

TELEPHONE SYSTEM USING MAGNETIC RECORDER

Filed Oct. 26, 1949

23 Sheets-Sheet 17

INVENTOR.
IMRE MOLNAR

BY
Smith, Olsen & Baird

ATTYS.

INVENTOR.
IMRE MOLNAR
BY
Smith, Olsen & Baird
ATTYS

INVENTOR.
IMRE MOLNAR
BY
Smith, Olsen & Baird
ATTYS.

June 1, 1954 I. MOLNAR 2,680,155

TELEPHONE SYSTEM USING MAGNETIC RECORDER

Filed Oct. 26, 1949

23 Sheets-Sheet 20

INVENTOR.
IMRE MOLNAR
BY
Smith, Olsen & Baird
ATTYS

June 1, 1954

I. MOLNAR 2,680,155

TELEPHONE SYSTEM USING MAGNETIC RECORDER

Filed Oct. 26, 1949

23 Sheets-Sheet 21

INVENTOR.
IMRE MOLNAR

BY
Smith, Olsen & Baird
ATTYS.

INVENTOR.
IMRE MOLNAR
BY
Smith, Olsen & Baird
ATTYS.

June 1, 1954

I. MOLNAR 2,680,155

TELEPHONE SYSTEM USING MAGNETIC RECORDER

Filed Oct. 26, 1949

23 Sheets-Sheet 23

INVENTOR.
IMRE MOLNAR
BY
Smith, Olsen & Baird
ATTYS

Patented June 1, 1954

2,680,155

UNITED STATES PATENT OFFICE 2,680,155

TELEPHONE SYSTEM USING MAGNETIC RECORDER

Imre Molnar, Chicago, Ill., assignor to Automatic Electric Laboratories, Inc., Chicago, Ill., a corporation of Delaware Application October 26, 1949, Serial No. 123,745

52 Claims. (Cl. 179—18)

Figure 1:
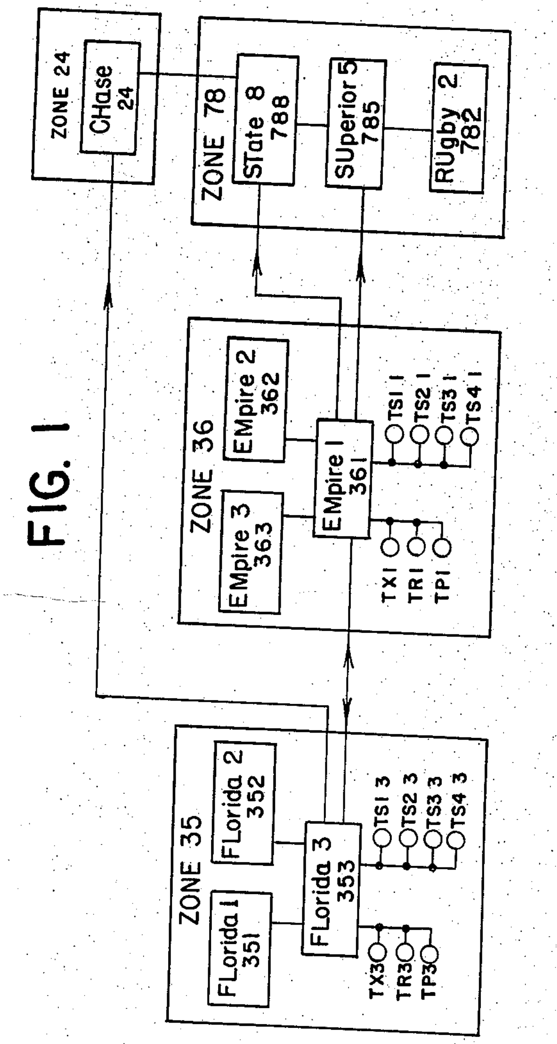

The present invention relates to automatic telephone systems and, more particularly, to translating apparatus which is operative to translate a portion of a called subscriber directory number into one or more routing digits and into one or more digits for performing certain control operations whereby a call may be routed over appropriate trunk routes to the desired called exchange. More particularly, the present invention relates to improvements in translator apparatus for use in telephone systems of the character disclosed in the copending application of John E. Ostline, Serial No. 75,985, filed February 12, 1949.

In a telephone system serving a large metropolitan area and also adjacent suburban areas, it is usually desirable to divide the areas into a plurality of zones and to handle calls between the exchanges in the different zones as short haul toll calls. Telephone calls which are completed as short haul toll calls are normally charged against the calling subscriber in accordance with the distance between the exchanges in the calling and the called zones or the distance between the calling and called exchanges in the same zones, and in accordance with the time duration of the conversational connection. In accordance with conventional practice, the telephone connections of this type are normally set up by a toll operator, and the toll operator supervises the connection and manually records various items of information pertaining to the connection whereby the cost thereof may be calculated and assessed against the calling station at the termination of the connection.

While manual systems of the type described above are satisfactory in operation, they require the services of a large number of toll operators and usually there is some delay in the completion of such calls due to the fact that the toll operators must first ascertain the available trunk routes over which connections may be established. In addition to the foregoing, the toll operators cannot handle additional toll calls during the time that they are manually writing out a toll ticket of the various items of information from which appropriate charges may be made for the telephone connection.

In an automatic toll ticketing system of the type disclosed in the above-mentioned Ostline application, the telephone connections are automatically completed to a desired called subscriber under control of a calling device at a calling subscriber substation. More particularly, the calling subscriber merely operates his calling device in accordance with the digits corresponding to the directory number of the desired called subscriber. Usually the called subscriber directory number includes three digits designating the called exchange and four digits designating the called subscriber substation, making a total of seven digits. In some telephone networks, the seven digits of a particular called subscriber may be used, without translation, to directly control the exchange switching apparatus in order to extend a telephone connection to the desired called subscriber. However, in complicated metropolitan telephone networks, it is necessary to translate the three digits designating the called exchange into appropriate routing digits and to utilize the routing digits as well as one or more of the called exchange digits and all of the numerical digits in order to complete the connection to the desired called subscriber. A system which operates to translate the first three digits designating the called office into appropriate routing digits is disclosed in the above-mentioned copending Ostline application. In that application an idle director is associated with a calling subscriber line and the seven digits of a called subscriber directory number registered therein. The director, in turn, will either transmit switch setting impulses corresponding to the value of the seven digits registered therein or will cause a translation to be made of the first three registered digits. If a translation is made of the first three digits, the director will control the switching apparatus first, in accordance with the translation, second, in accordance with one or more of the registered called office code digits and, finally, in accordance with all of the numerical digits of the called subscriber directory number in order to complete the connection. Furthermore, facilities are provided in the system for identifying the four numerical digits designating the calling subscriber substation and for registering these digits in the director for the purpose of identifying the subscriber substation that is to be charged for the telephone connection.

During the setting up of a telephone connection under control of the director, an idle toll ticket repeater will be included in the connection for the purpose of registering and storing the items of record information which have been temporarily stored in the director. The inclusion of a toll ticket repeater in the connection will signal the director to transmit code signals corresponding to the various items of record information including the calling subscriber substation number, the called office code digits, the called subscribed substation number, the class of service of the calling subscriber, the rate of charge applicable to the connection, and the identity of the director involved in establishing the connection. The toll ticketing repeater also times the established connection and, upon the release thereof, it will have stored therein the total elapsed conversation time of the telephone connection. Following the release of the connection, the toll ticket repeater will cause an idle tabulator to be associated therewith and it will transfer to the associated tabulator all of the stored items of record information pertaining to the telephone connection as well as the identity of the toll ticket repeater involved in the connection. The tabulator, in turn, will control a ticket tape punch mechanism and a record tape punch mechanism in accordance with the various items of record information thereby to produce two records of the completed short haul toll call. The completed records may be used by the telephone company to control appropriate business machines whereby printed records are produced of each completed call.

In a large telephone network including a large number of different exchanges, it is not economical to include translating apparatus in each of the many directors required to handle the telephone traffic. In the system disclosed in the above-mentioned copending Ostline application this fault was eliminated by providing an all-relay translator and temporarily associating the translator with each calling director in order to translate the called office code digits into appropriate routing digits and to register the routing digits in the particular calling director. The director utilized the routing digits registered therein to extend the connection over the trunk route determined by the translator. The translator apparatus employed in the above-mentioned Ostline application is provided with a separate multicontact translating relay for each three-digit called office code designation. Furthermore, each of the directors utilized in that system is provided with a Strowger type switch having eight sets of 100 bank contacts. In order to select the proper translating relay in the translator, the Strowger type switch is controlled in a vertical direction in accordance with the second digit of a three-digit called office code, it is controlled in a rotary direction in accordance with the third digit of a called office code and one of the eight sets of bank contacts is selected in accordance with the first digit of the called office code. Accordingly, the Strowger type switch may be operated to select any one of 800 different bank contact positions. Each of the 800 contacts in the Strowger type switch represents a different called office code and, consequently, when the translator apparatus is associated with the director, one of a possible 800 multicontact translating relays in the translator may be selected for use in translating the called office code into appropriate routing digits. It should be understood that the individual multicontact translator relays in the translator are each appropriately wired in accordance with the routing digits for extending the connection to the called exchange corresponding to the dialed three digit called office code. In addition to the foregoing, other translating relays are also provided in the translator for registering routing digits corresponding to an alternative route to a desired called office in the event that all of the trunks in the direct trunk route extending to the called office are busy. In the latter event, the alternative trunk route translating relay is automatically selected so that routing digits corresponding to an alternative route over which connections may be completed to the desired called office are registered in the director instead of routing digits corresponding to the direct trunk route extending to the called office.

Although a common translator apparatus of the type disclosed in the above-mentioned Ostline application is more economical than the arrangement in the prior systems wherein the translating apparatus was included in each of the directors, the large number of translating relays and the large number of conductors interconnecting the common translator with the various directors made the arrangement somewhat complicated.

Accordingly, it is an object of the present invention to provide an improved common translator which eliminates the use of a Strowger type switch in each of the directors and which eliminates the necessity of providing individual multicontact translator relays for each translation required.

It is a further object of the present invention to provide a continuously operating translator which may be selectively controlled to transmit only the translations corresponding to a particular called office which is registered therein.

It is a further object of the invention to provide in a translator mechanism a plurality of electronic registers for registering code designations which are to be translated and electronic checking means for preventing the continuously operating translator from transmitting any translations until the position of the checking means in the translator corresponds to the position of the electronic register.

It is a still further object of the invention to provide in a translator a continuously operating magnetic marking device containing coded information corresponding to each number to be translated and for selectively rendering effective only the coded information which pertains to each particular number.

It is an additional object of the invention to provide a register which may be selectively operated in accordance with a particular number and an electronic counting device which responds to a magnetic storage device, whereby the matching of the counting device and the particular number renders the magnetic storage device effective to transmit translations which are individual to the particular number.

It is a still further object of the invention to provide in a translator apparatus means for controlling a continuously operating magnetic storage device to magnetically store various items of information.

It is a further object of the invention to provide in a translator mechanism an electronic counting device to determine the exact position of a continuously operating magnetic storage means.

It is a further object of the invention to provide in a cyclically operable electronic translator of the type noted synchronizing means for periodically synchronizing an electronic counter and a continuously operating magnetic storage device whereby the completion of each cycle causes the electronic counter and the continuously operating magnetic storage device to be brought into synchronization.

It is a further object of the invention to provide in a continuously operating electronic translating device an electronic gate mechanism which prevents the information stored in the continuously operating magnetic storage device from being transmitted by the electronic translator until the exact position of the magnetic storage device corresponds precisely to the code registered in the variably operable electronic register.

It is a still further object of the invention to provide means for assigning the common electronic translator to the exclusive use of any one of a plurality of directors having access thereto.

It is a further object of the invention to selectively associate the electronic translator with calling directors in a predetermined sequence.

It is still another object of the invention to provide an electronic pick-up means for preventing the continuously operating electronic translator from transmitting an incomplete translation of a registered code.

It is a further object of the invention to provide in a continuously operating translator an alternate route testing circuit whereby a test is always made to determine whether a direct route translation should be transmitted or an alternate route translation should be transmitted at any instant that the transltaor is seized.

It is a further object of the invention to provide means for changing the translation of any particular code on the magnetic storage device when magnetic storage device reaches a position in its cycle of operation which corresponds precisely to the code position of the new translation, whereby the existing translation is erased and the new translation is substituted in place thereof.

Further features of the invention pertain to the particular arrangement of the circuit elements of the system, whereby the above-outlined and additional operating features are attained.

Figure 19:
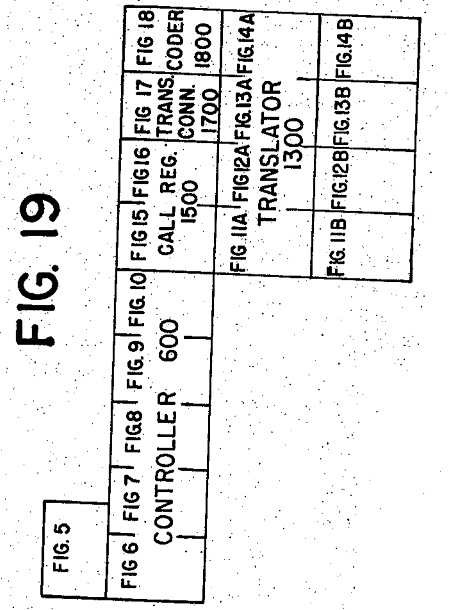
Figure 2:
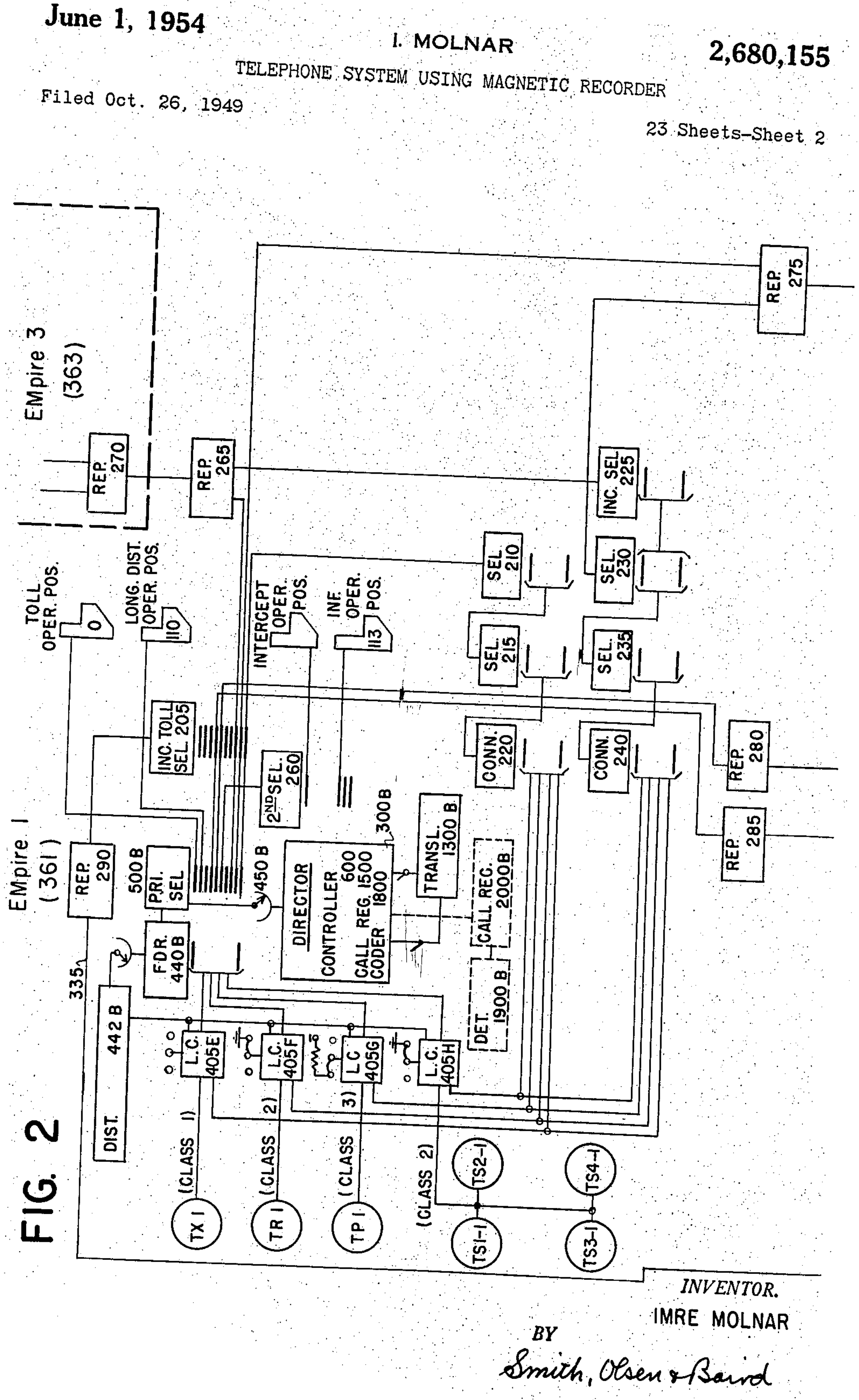
Figure 3:
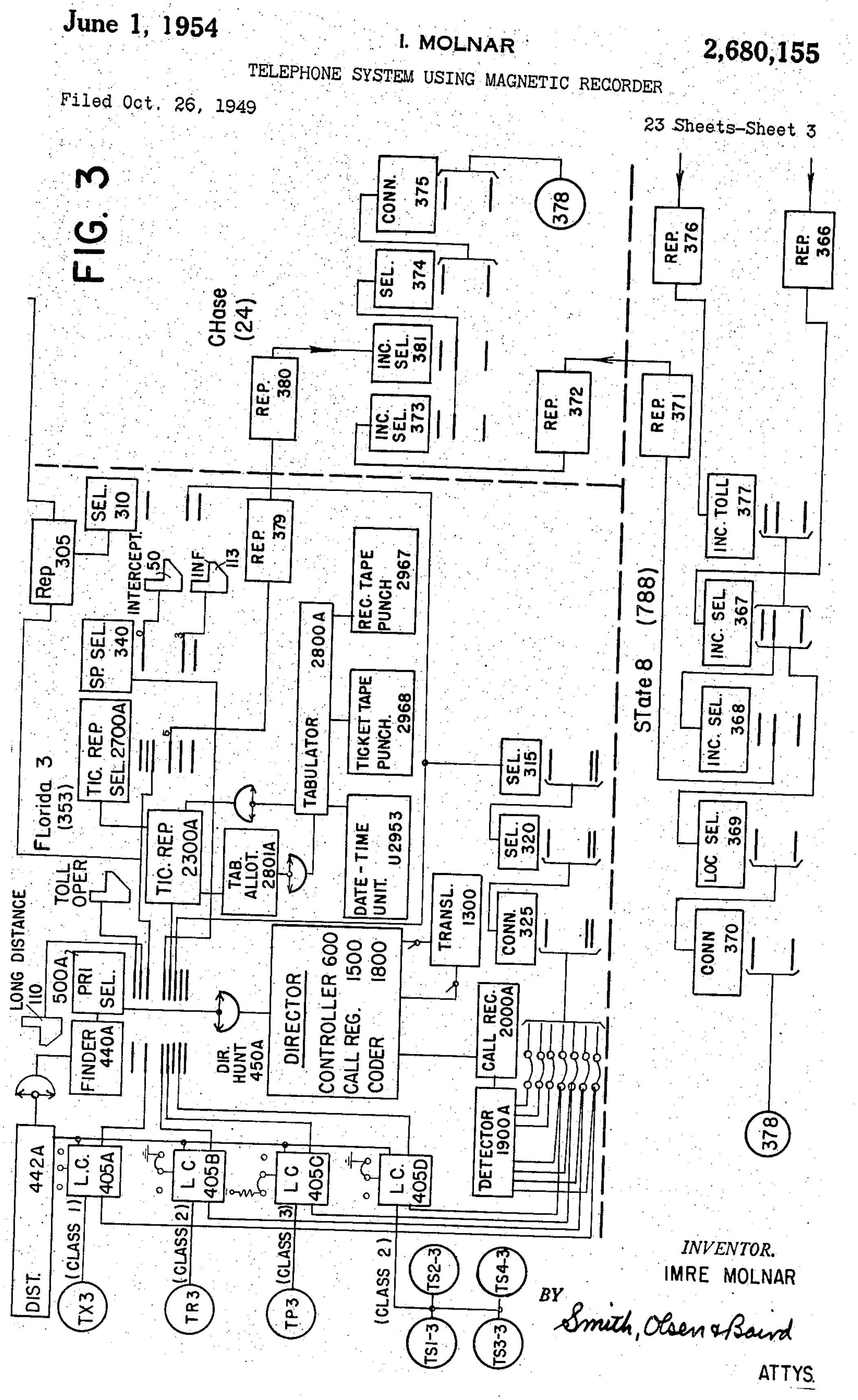
Figure 4:
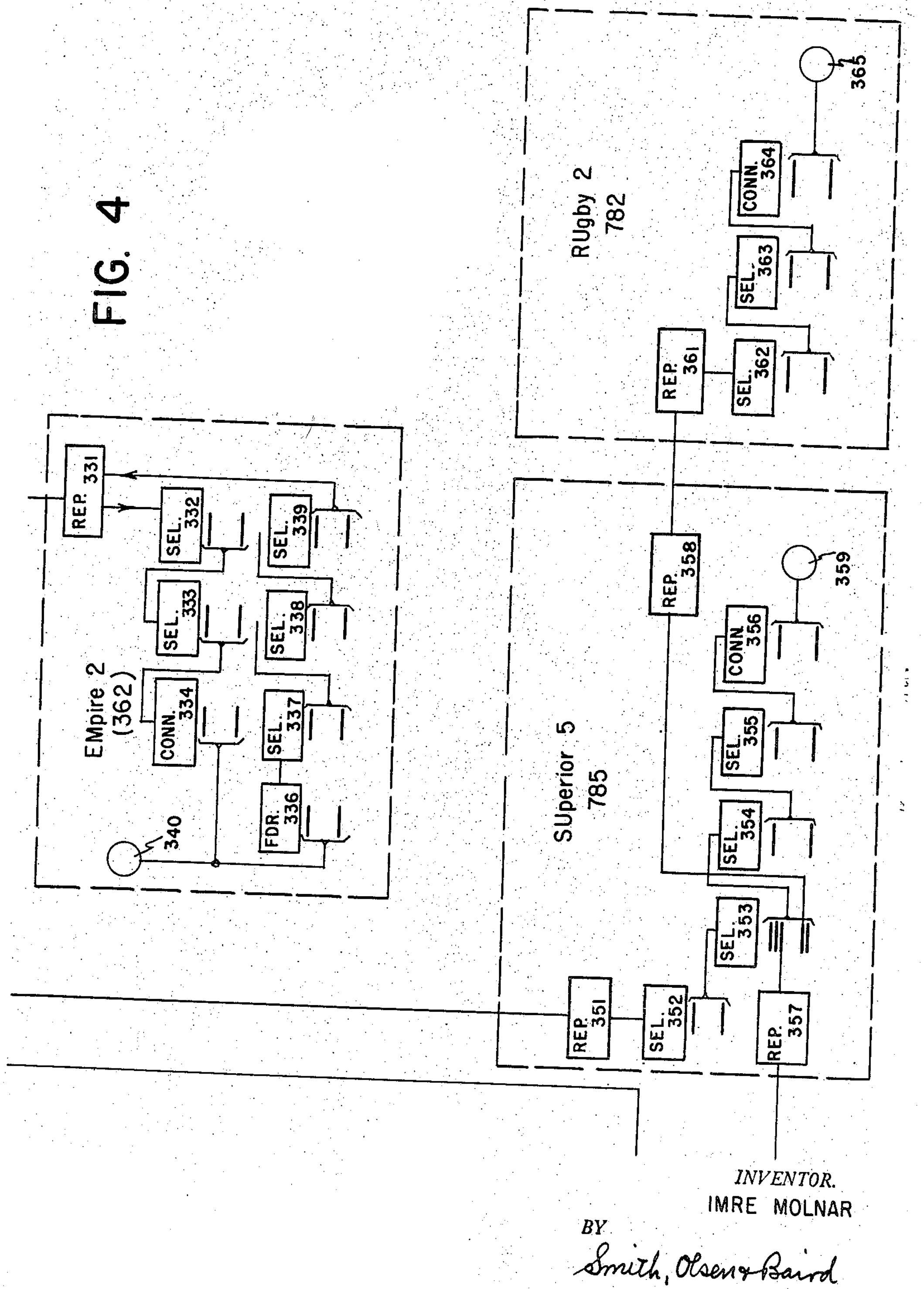
Figure 20:
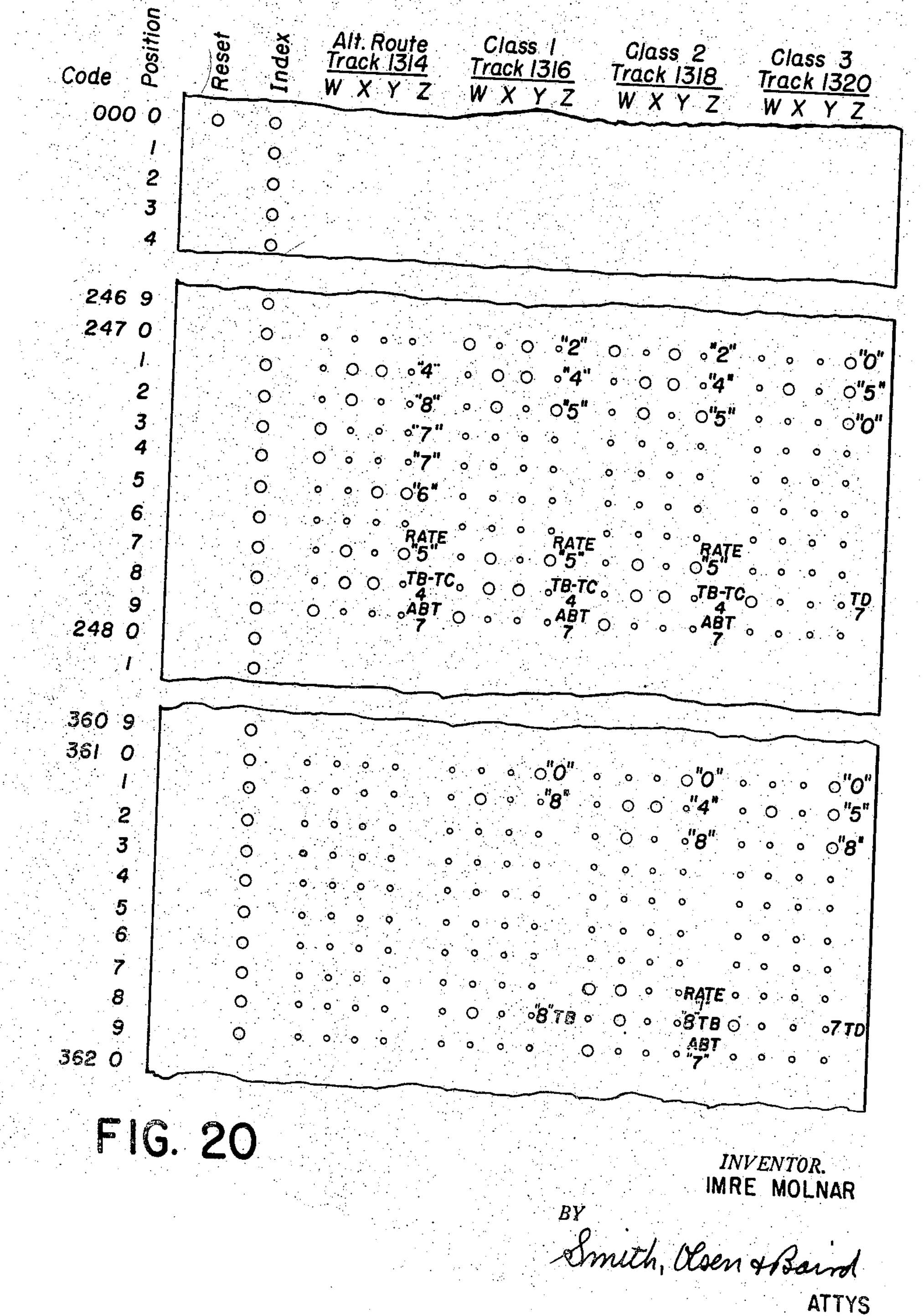

The invention, both as to its organization and method of operation, together with further objects and advantages thereof, will best be understood by reference to the following specification taken in connection with the accompanying drawings in which Fig. 1 is a schematic diagram of the area served by a telephone system embodying the present invention; Figs. 2, 3 and 4, taken together, illustrate the general arrangement of the apparatus incorporated in the various exchanges included in the telephone system and the interconnecting trunk and toll lines; Figs. 5 to 10, inclusive, 11A, 11B, 12A, 12B, 13A, 13B, 14A, 14B and 15 to 18, inclusive, taken together illustrate the apparatus incorporated in the FLorida 3 exchange in zone 35 of the telephone system, which apparatus has incorporated therein the features of the invention as previously outlined above; Fig. 19 illustrates the mode of combining Figs. 5 to 18, inclusive, to form a unified system; and Fig. 20 illustrates a fragmentary portion of the cylinder of the magnetic storage device showing the magnetized spots on the cylinder for storing the translations of the various called office code designations.

Figure 5:
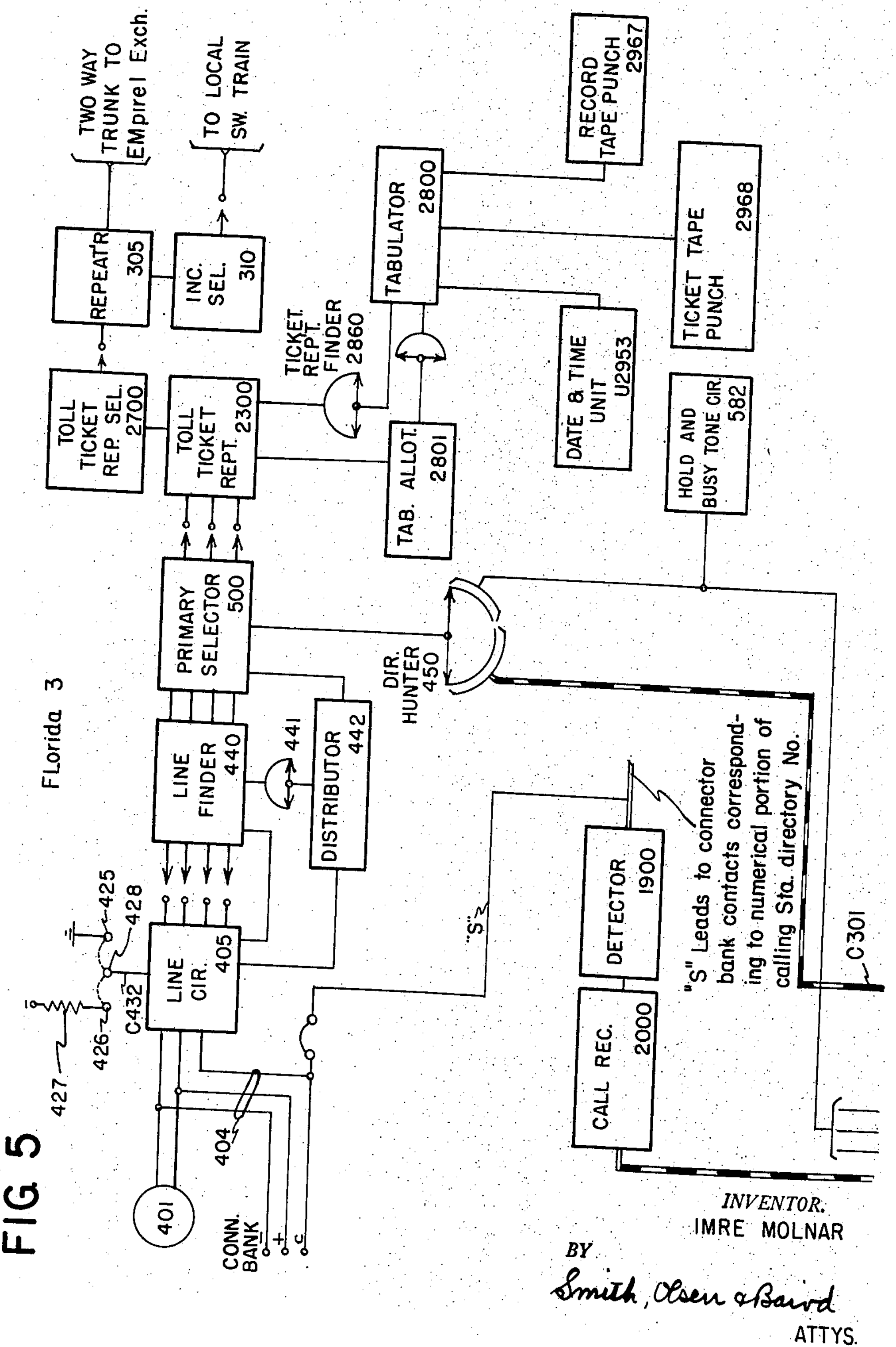
Figure 6:
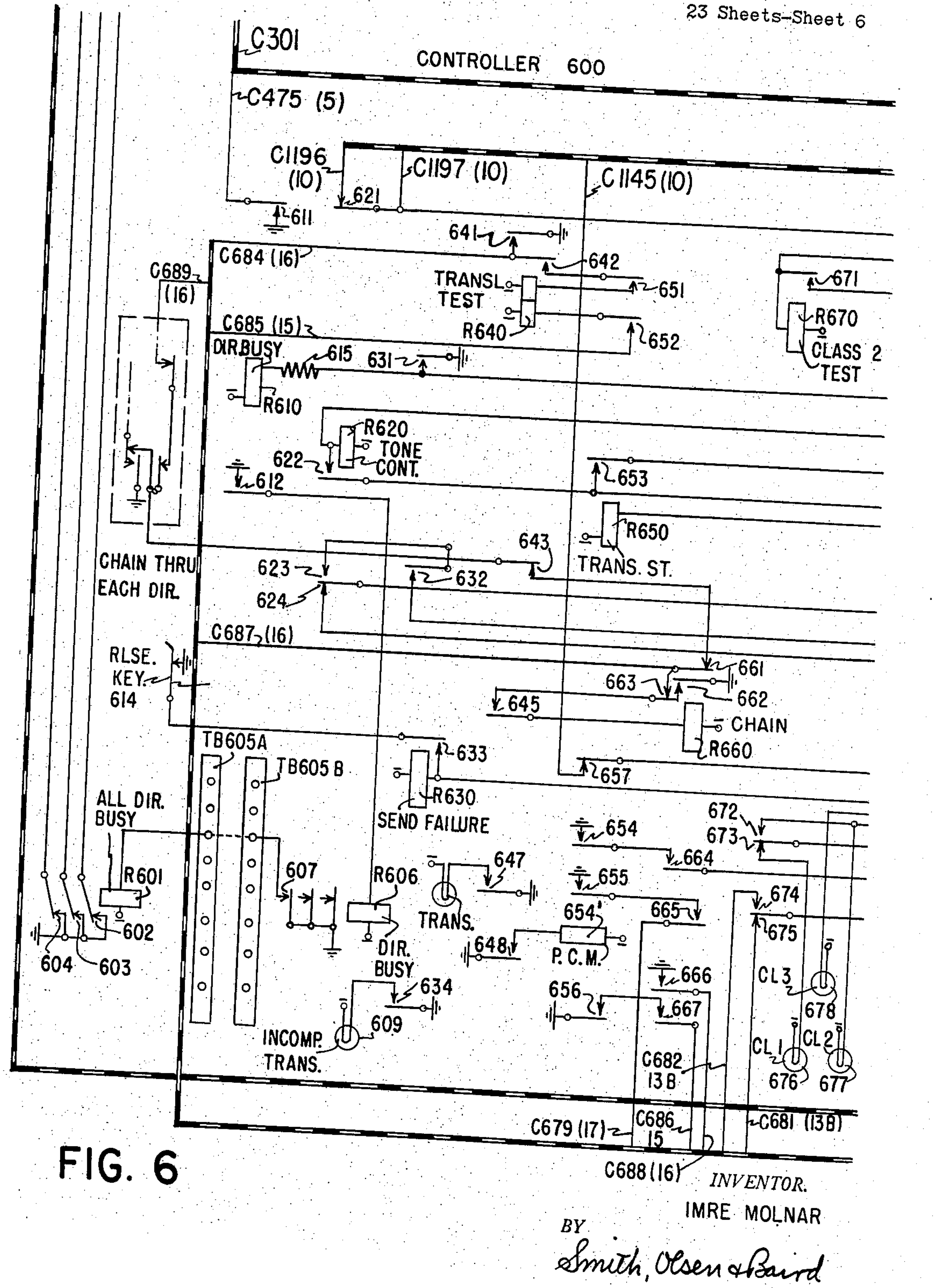

More particularly, Fig. 5 illustrates a subscriber substation 401, a line circuit 405, a line finder 440, a distributor 442, a primary selector 500 and a director hunter 450. The above apparatus, while shown schematically in Fig. 5 are shown in detail in the above-mentioned Ostline application. Consequently, for a complete understanding of the operation of the above-mentioned apparatus reference may be had to the detail description included in the said Ostline application. In addition to the foregoing, Fig. 5 also schematically illustrates a toll ticket repeater 2300, an associated toll ticket repeater selector 2700 having access to a repeater 305 terminating a two-way trunk line interconnecting the FLorida 3 exchange and the EMpire 1 exchange. Also Fig. 5 discloses an incoming selector 310, individually associated with the repeater 305, which is utilized in completing incoming calls to the FLorida 3 exchange via the local switch train to called subscriber substations. Fig. 5 also schematically illustrates a tabulator allotter 2801, a ticket repeater finder 2860, a tabulator 2800, a date and time unit U2953, a record tape punch 2967, and a ticket tape punch 2968 for the purpose of producing perforated tapes containing all of the information necessary to produce both a record and an individual ticket of the various items of information pertaining to a ticketed telephone call. Finally, Fig. 5 schematically illustrates a call recorder 2000 and an associated detector 1900 which are utilized in the event a particular call is to be ticketed, in order to ascertain the numerical portion of the directory number of a calling subscriber in the FLorida 3 exchange. As pointed out above all of the foregoing apparatus is schematically illustrated in Fig. 5 and for a complete detail description and disclosure of this apparatus reference may be had to the previously mentioned Ostline application.

Figure 15:
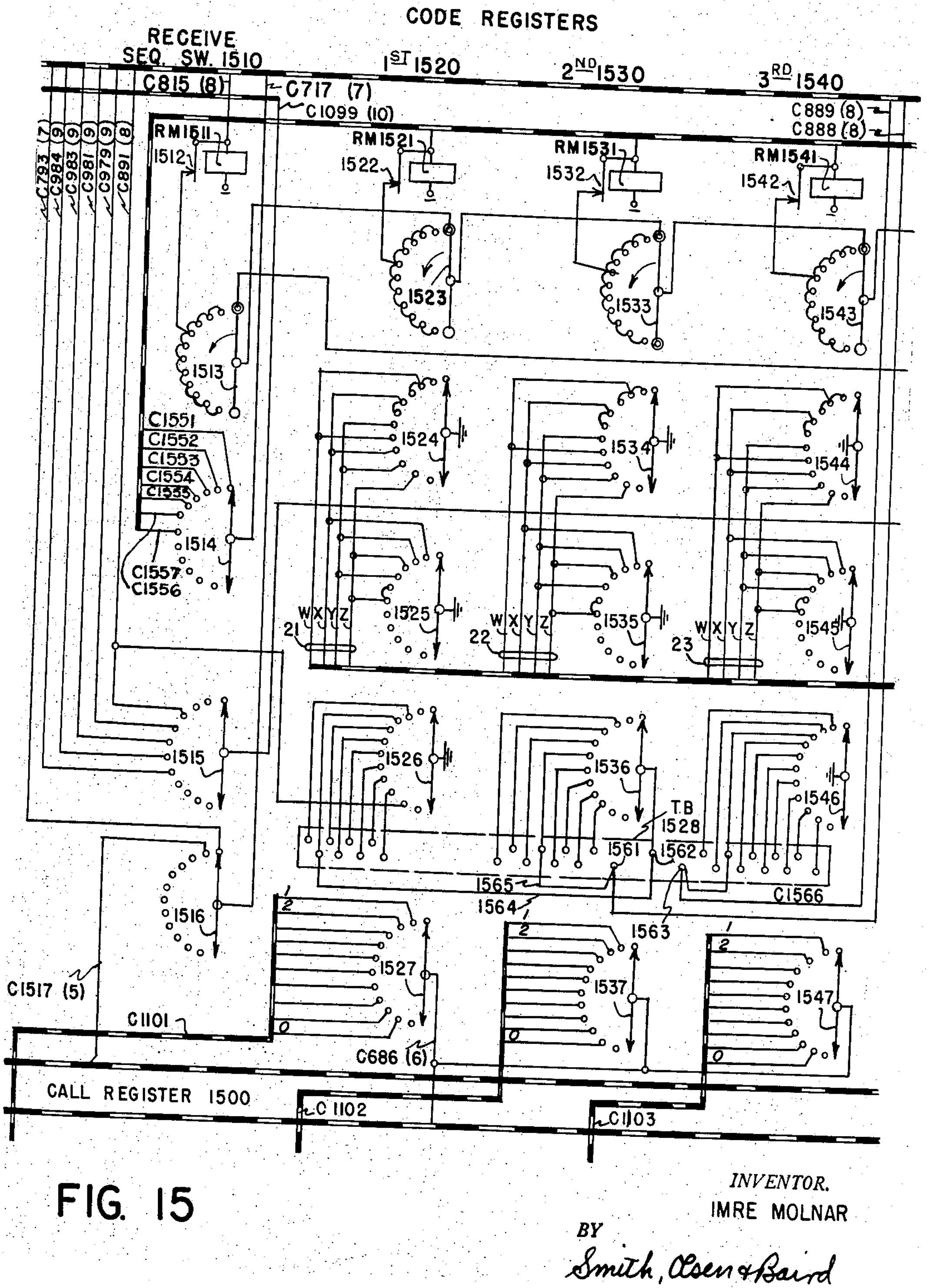
Figure 16:
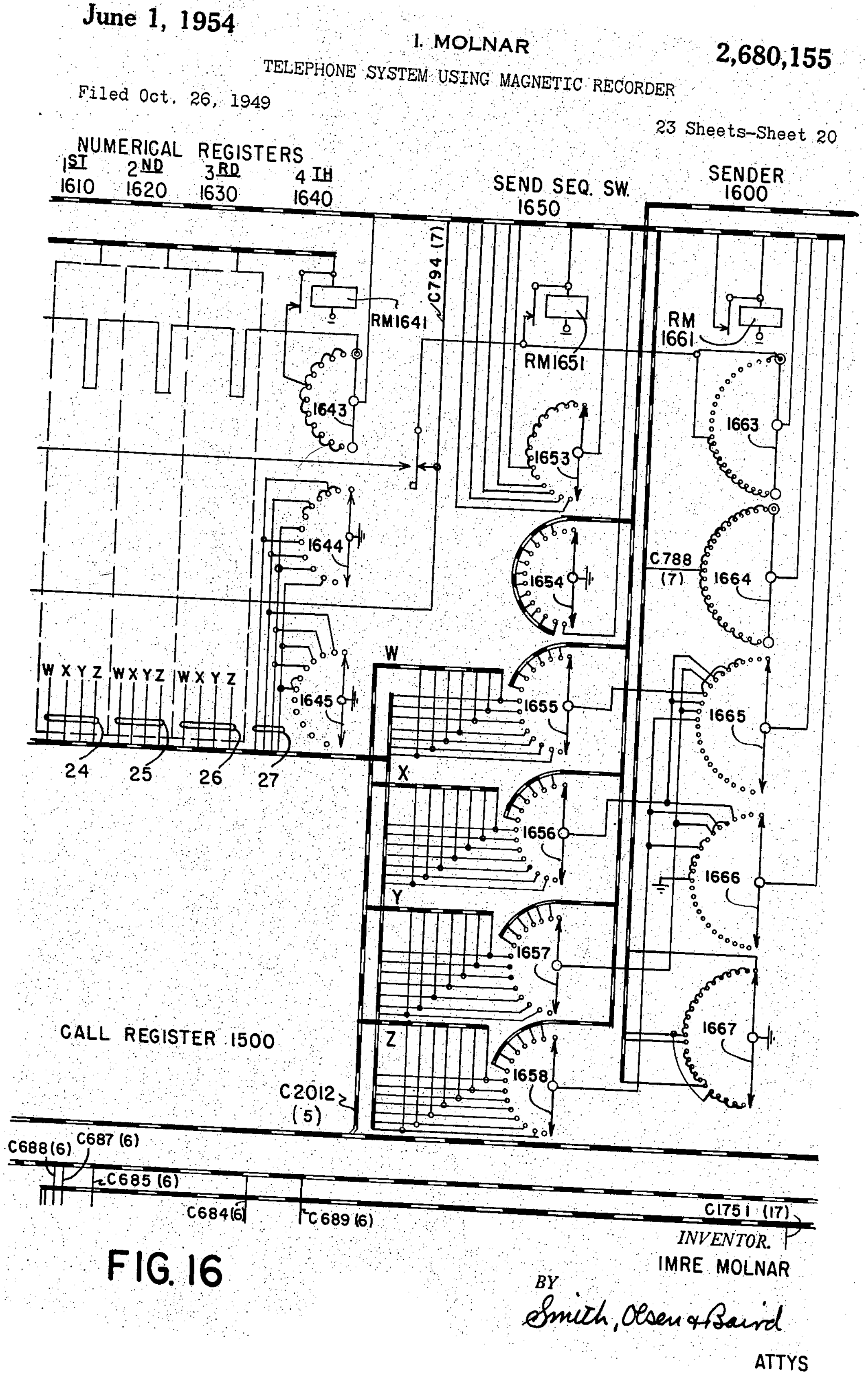
Figure 17:
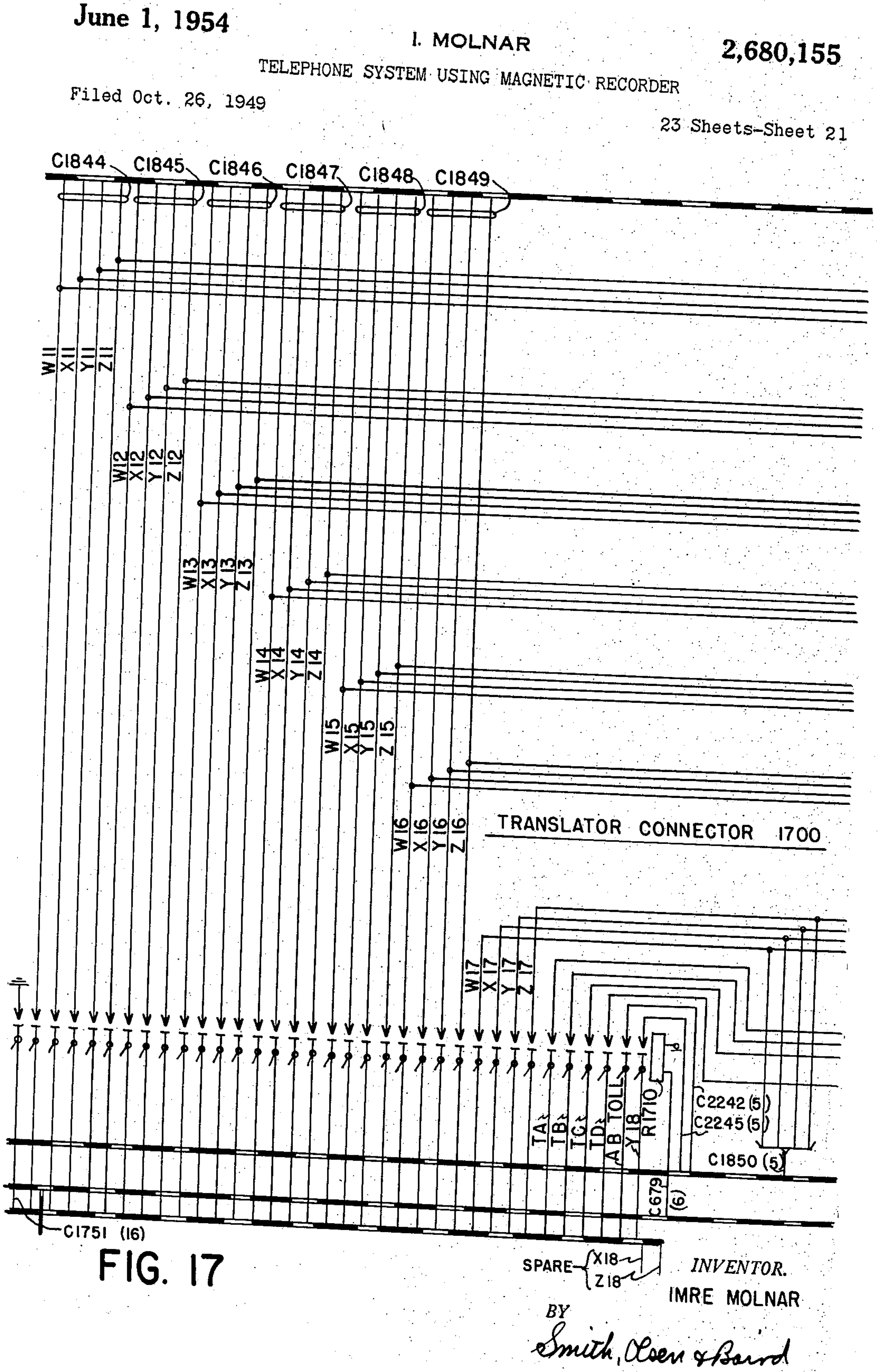
Figure 18:
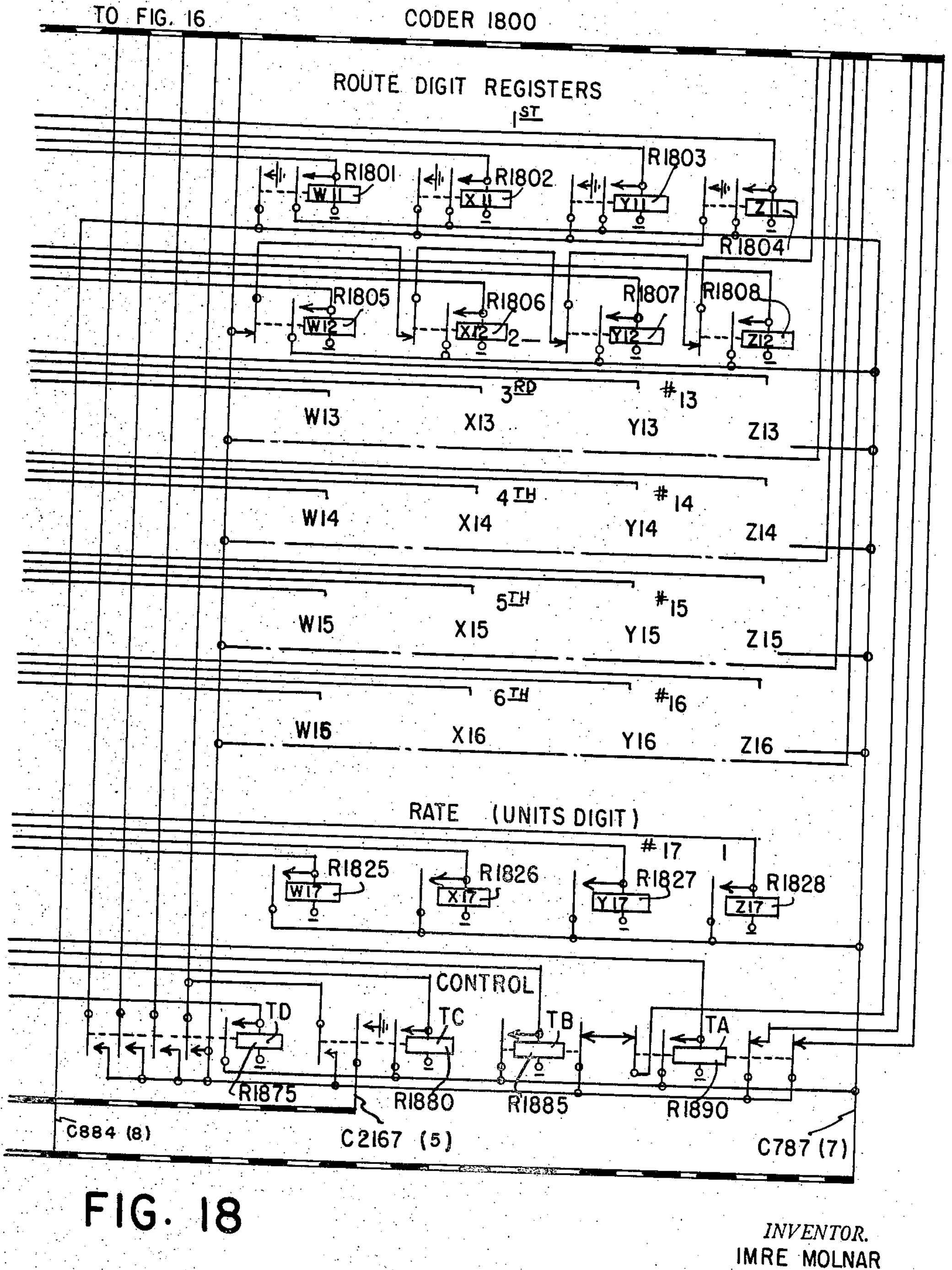

Figs. 6 to 10, inclusive, and 15 to 18, inclusive, illustrate the details of one of the directors provided in the FLorida 3 exchange. The individual units of each director provided in the exchange are as follows: Figs. 6 to 10, inclusive, disclose the details of the controller 600 portion of the director and it is used primarily for determining the operation of the various units of apparatus comprising the director including the transmission of switch setting impulses; Figs. 15 to 16 disclose the details of the call register 1500 portion of the director and it is utilized to register the digits of a called subscriber directory number which is dialed into the director by a calling subscriber, and it determines the sequence in which the routing digits and the registered dialed digits are transmitted by the director in order to complete a connection to a desired called subscriber; Fig. 17 discloses the details of a translator connector 1700 portion of the director which is utilized to interconnect the translator with the coder 1800 portion of the director; Fig. 18 discloses the details of the coder 1800 portion of the director and it is utilized to store certain items of information, including the routing digits, a digit representing the rate applicable to the call, and certain of the control operations to be performed by the director, which items are transmitted thereto by the translator. Figs. 11A, 11B, 12A, 12B, 13A, 13B, 14A and 14B disclose the details of the translator 1300, which is common to all of the directors provided in the FLorida 3 exchange. The translator 1300 may be temporarily associated with any calling director and is controlled in accordance with the called exchange code registered in the director to translate the called exchange code into appropriate routing digits and other items of information, and to register this information in the coder 1800 portion of the director. The translation is made by the translator 1300 first in accordance with both the called office code digits and the class of the calling line and, in addition to the foregoing, the translator 1300 may vary the translation depending upon the idle or busy condition of the direct trunks available over the direct trunk route extending to the desired called exchange.

*The general arrangement of the telephone system*

As disclosed in the previously mentioned co-pending Ostline application, the automatic telephone system serves a large metropolitan area and the adjacent suburban areas which are divided into a number of zones, each of which comprises one or more exchanges. This telephone system is schematically illustrated in Fig. 1 and in greater detail in Figs. 2 to 4, inclusive, and comprises zones 24, 35, 36 and 78. The zone 24 includes the CHase exchange which serves, for example, 1000 subscriber lines; the zone 35 includes the FLorida 1, 2 and 3 exchanges, each exchange serving 10,000 subscriber lines; the zone 36 includes the EMpire 1, 2 and 3 exchanges, each serving 10,000 lines; and finally, the zone 78 includes the STate 8, SUperior 4 and RUgby 2 exchanges, each serving 10,000 subscriber lines. The subscriber lines terminating in each exchange in each zone comprises private subscriber lines, party subscriber lines and paystations lines. The private subscriber lines include both local subscriber lines and extended service subscriber lines. The party subscriber lines are of the four-party type and are arranged on a terminal-per-station basis so that each of the substations on a party line are provided with different directory number.

The various exchanges in each zone are interconnected by suitable groups of trunk lines and at least one exchange in each zone is interconnected with certain of the exchanges in the other zones by suitable groups of toll lines as is clearly indicated in Figs. 1 to 4, inclusive.

In order to facilitate the setting up of various connections under control of a calling subscriber dial, a universal numbering scheme is utilized whereby all called subscriber substations in the various exchanges, except the CHase exchange, are dialed in accordance with a seven-digit directory number comprising two digits corresponding to the first two letters of the exchange name, a third digit corresponding to the numerical identification of the number of the exchange, and a four-digit number corresponding to the numerical portion of the called subscriber directory number. In the CHase exchange, however, the subscriber directory numbers are six-digits comprising two digits corresponding to the first two letters of the exchange name and a four-digit number corresponding to the numerical portion of the directory number. Accordingly, the directory number of each subscriber substation in the telephone system comprises a code portion, including either two or three digits, and a numerical portion, including four digits. In any event, the first three digits dialed by the calling subscriber are the digits which are utilized by the director to control the translator in the event a translation is to be made for the purpose of routing a call to a desired called subscriber.

At this point it may be well to note that each of the subscriber dials are arranged in the usual manner in accordance with ten finger holes corresponding to the digits "1" to "9" and "0" and that each of the digits have corresponding letters which may be dialed in accordance with the first two letters of the called exchange name. However, if the called exchange name comprises three letters, instead of the above-described two letters and a digit identifying the exchange, then the called office code digits will correspond to the first three letters of the desired called exchange. The ten digits of the dial and the corresponding letters applicable to each of the digits are as follows:

| Digits | Letters |
|---|---|
| 1 | ABC |
| 3 | DEF |
| 2 | GHI |
| 4 | JKL |
| 5 | MNO |
| 6 | PRS |
| 7 | TUV |
| 8 | WXY |
| 9 | Z (Operator) |
| 0 | |

*The apparatus incorporated in the FLorida 3 exchange*

Preferably each exchange in the telephone system comprises apparatus substantially identical to that provided in the FLorida 3 exchange, which apparatus includes automatic switching equipment serving a maximum of 10,000 terminals, as is best illustrated in Fig. 3. Three of the terminals respectively terminate the private subscriber lines TX3 and TR3 and the paystation line TP3. Four terminals commonly terminate the party subscriber line which serves the substations TS1-3 to TS4-3, inclusive. The switching equipment comprises a number of line circuits, individually associated with the above-identified subscriber lines, the line circuits 405A, 405B, 405C and 405D being respectively associated with the above-named subscriber substations. At this point it is noted that the private subscriber substation TX3 is rendered extended service facilities and is, therefore, of the class 1 type. The private subscriber substation TR3 and the four party line subscriber substations TS1-3 to TS4-3 are rendered free local service and are of the class 2 type. The substation TP3 is a paystation and is of the class 3 type which is denied automatic toll service. More particularly, the class 2 type subscriber substations are rendered free automatic local service to all subscriber substations terminating in the FLorida 1, FLorida 2 and FLorida 3 exchanges in zone 35, and they are also rendered automatic toll ticketing service to all of the other exchanges in the various zones in the metropolitan area. The extended service subscribers of the class 1 type are rendered free automatic toll service to certain exchanges in adjacent zones and automatic toll ticketing services to other exchanges in the various zones. Finally, the paystation subscribers of the class 3 type are rendered automatic local service provided the necessary coin has been deposited in the paystation telephone instrument and toll service to exchanges in the metropolitan area via the conventional manual toll operator position.

The various line circuits individual to the previously mentioned substations may be arranged in a common group and each line circuit may be individually strapped to provide the associated subscriber substation with the specific class of service to which the subscriber is entitled. The FLorida 3 exchange is provided with the switching apparatus illustrated in Fig. 3 including a group of directors. The director 300A, for example, is accessible to the various primary selectors 500A by means of a director hunter 450A. Each director comprises a controller portion 600, a call register portion 1500, and a coder portion 1800 and each of the above-named units of equipment function to provide all of the necessary operating facilities for the director 300A.

The FLorida 3 exchange is also provided with a common translator 1300A which may be associated with the calling directors in a predetermined sequence for the purpose of registering in the director certain control operations which must be performed by the director to extend a call to a desired called office depending upon the called office code digits registered in the associated director.

All of the additional apparatus included in the FLorida 3 exchange, such as the primary selector 500A, the ticket repeater 2300A, the ticket repeater selector 2700A, the tabulator allotter 2801A the tabulator 2800A, the date and time unit U2953, the ticket tape punch mechanism 2968, the record tape punch mechanism 2967, the call recorder 2000A and the detector 1900A are provided in the manner disclosed and described in the previously mentioned copending Ostline application.

Each subscriber substation in the FLorida 3 exchange is provided with the usual telephone instrument of the automatic type including a calling device or dial. The calling device provided at each of the individual subscriber substation, such as TX3, TR3 and TP3 and at each first party subscriber substation, such as TS1–3, on a party line are of conventional construction and arrangement. However, the calling device provided at each second, third and fourth party subscriber substation, such as TS2–3, TS3–3 and TS4–3, is of the construction and arrangement of that disclosed in the John E. Ostline Patent No. 2,410,520, granted November 5, 1946. The calling device of the type disclosed in the above-mentioned Ostline patent is of special construction in that it is provided with a set of special cam springs in addition to the usual set of impulsing springs. In each of the calling devices provided at the second, third and fourth party subscriber substations, the set of impulsing springs operate in a conventional manner to transmit a variable number of series of switch controlling impulses in accordance with the finger hole selected on the pull of the finger wheel. However, during the return movement of the finger wheel to transmit switch controlling impulses, a number of substation identifying ground pulses are transmitted just prior to the restoration of the finger wheel to its normal position. More specifically, when the finger wheel at the second party subscriber substation TS2–3 is actuated in accordance with the digit 2 or more, the associated cam causes the transmission of one substation identifying ground impulse over the associated party subscriber line after all of the switch control impulses have been transmitted. Similarly, when the finger wheel of the calling device at the third party subscriber substation TS3–3 is actuated in accordance with a digit 2 or more, the associated cam causes the set of cam springs to transmit two substation identifying ground impulses over the associated party line after all of the switch control impulses have been transmitted. Finally, when the finger wheel of the calling device at the fourth party subscriber substation TS4–3 is actuated in accordance with the digit 2 or more, the associated cam operates the set of cam springs to transmit three substation identifying ground impulses over the associated party line during the last portion of the return movement of the finger wheel to normal. In the last-mentioned example, the first of the series of three ground impulses is transmitted between the transmission of the next to the last and the final switch controlling impulses and the final two ground impulses are transmitted after the transmission of the last switch controlling impulse. Since the first party subscriber substation TS1–3 is provided with a conventional dial, no station identifying ground impulses are transmitted in response to the actuation of the calling device thereat. The above-described arrangement is utilized in the telephone system in conjunction with the detector 1900A for the purpose of identifying the particular directory number of any one of the calling subscriber substations on a party line.

During the operation of the telephone apparatus provided at the FLorida 3 exchange, the toll ticket repeater 2300A is individually associated during the setting up of the connection by the director 300A to store certain items of information pertaining to the telephone connection. These items of information include the called subscriber directory number, the calling subscriber directory number, the rate of charge applicable to the particular connection, the class of service of the calling subscriber substation, and the number assigned to the particular director utilized in establishing the connection. During the course of the conversation, the toll ticket repeater 2300A accumulates the conversation time and at the termination thereof has registered therein the total elapsed time of the conversational connection. After the connection has been released, the toll ticket repeater is automatically associated with the tabulator 2800A, by means of the translator allotter 2801A, and the various items of information, noted above, are transferred from the ticket repeater 2300A to the associated tubulator 2800A. In addition to the above-noted items of information, the ticket repeater 2300A also transfers to the alloter 2800A the number of the particular toll ticket repeater utilized in the telephone connection and the elapsed time of the conversation. The toll ticket repeater 2300A is thereupon restored to normal and rendered available for additional calls and the tabulator 2800A controls the record tape punch mechanism 2967 and the ticket tape punch mechanism 2968 to perforate the above-mentioned tapes in accordance with the various items of information stored in the tabulator 2800A. The disclosure and detailed description of the operation of the above briefly described mode of operation is included in the previously mentioned copending Ostline application.

It should be noted at this time that the present telephone system, as well as the system disclosed in the previously mentioned Ostline application, embody code storage registering apparatus and code marking conductors for the purpose of storing or registering various digits and for transferring such digits from one unit of apparatus to another. The combinational code embodied throughout the system is generally referred to as a WXYZ code and is of the type wherein any digit from 1 to 9, inclusive, and 0 may be either registered or transferred from one place to another by operating or marking any one or any two of four WXYZ register relays or marking conductors in accordance with the following code:

| Digit | Code |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

*The translator 1300*

Figure 11A:
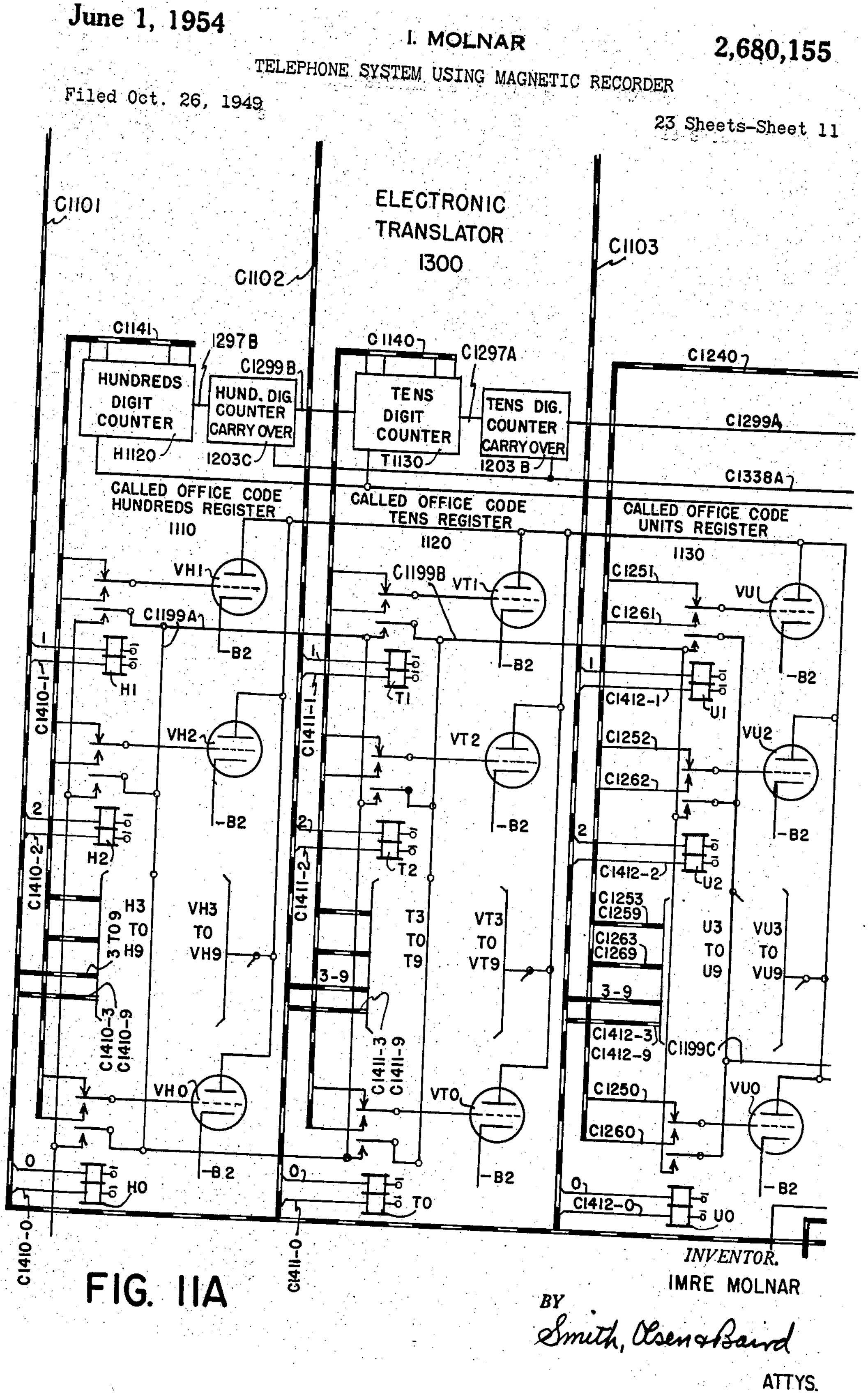

Before describing the operation of the translator 1300 and the modifications which have been made in the controller 600 and the call register 1500 portions of the director, a general description will now be given of the apparatus included in the improved translator 1300 illustrated in Figs. 11A, 11B, 12A, 12B, 13A, 13B, 14A and 14B. At the outset it should be understood that in response to the registration in the call register 1500 portion of the director of three digits representing a called office code the translator 1300 is associated with the particular director. As has been previously noted, the translator is first operated in accordance with the called office three digit code in order to mark the translator so that it will operate and register in the coder 1000 portion of the director various digits, or items of information, which are translations of the particular registered called office code. For the purpose of registering the called office code digits in the translator 1300 there is provided, as is shown in Fig. 11A, a coincidence detector 1100. The coincidence detector 1100 includes three groups of combined relay and vacuum tube registers and each group includes ten relays and ten associated vacuum tubes. More specifically, the coincidence detector 1100 includes the called office code hundreds register 1110, which comprises ten relays H1 to H0, inclusive, and ten detector tubes VH1 to VH0, inclusive, which are respectively associated with the relays H1 to H0, inclusive. The coincidence detector 1100 also includes the called office code tens register 1120, which comprises ten relays T1 to T0, inclusive, and ten detector tubes VT1 to VT0, inclusive, which are respectively associated with the ten relays T1 to T0, inclusive. Finally, the coincidence detector 1100 includes the called office code units register 1130, which comprises ten relays U1 to U0, inclusive, and ten detector tubes VU1 to VU0, inclusive, which are respectively associated with the ten relays U1 to U0, inclusive. The coincidence detector 1100 may be operated under control of the associated called register 1500 portion of the director in order to register respectively the hundreds, tens and units digits of the called office code, as dialed by the calling subscriber, in the three registers 1110, 1120 and 1130. A relay in each of the registers 1110, 1120 and 1130 will be operated in accordance with a corresponding digit of the called office code and will mark the associated detector tubes in accordance with such digits.

Figure 13A:
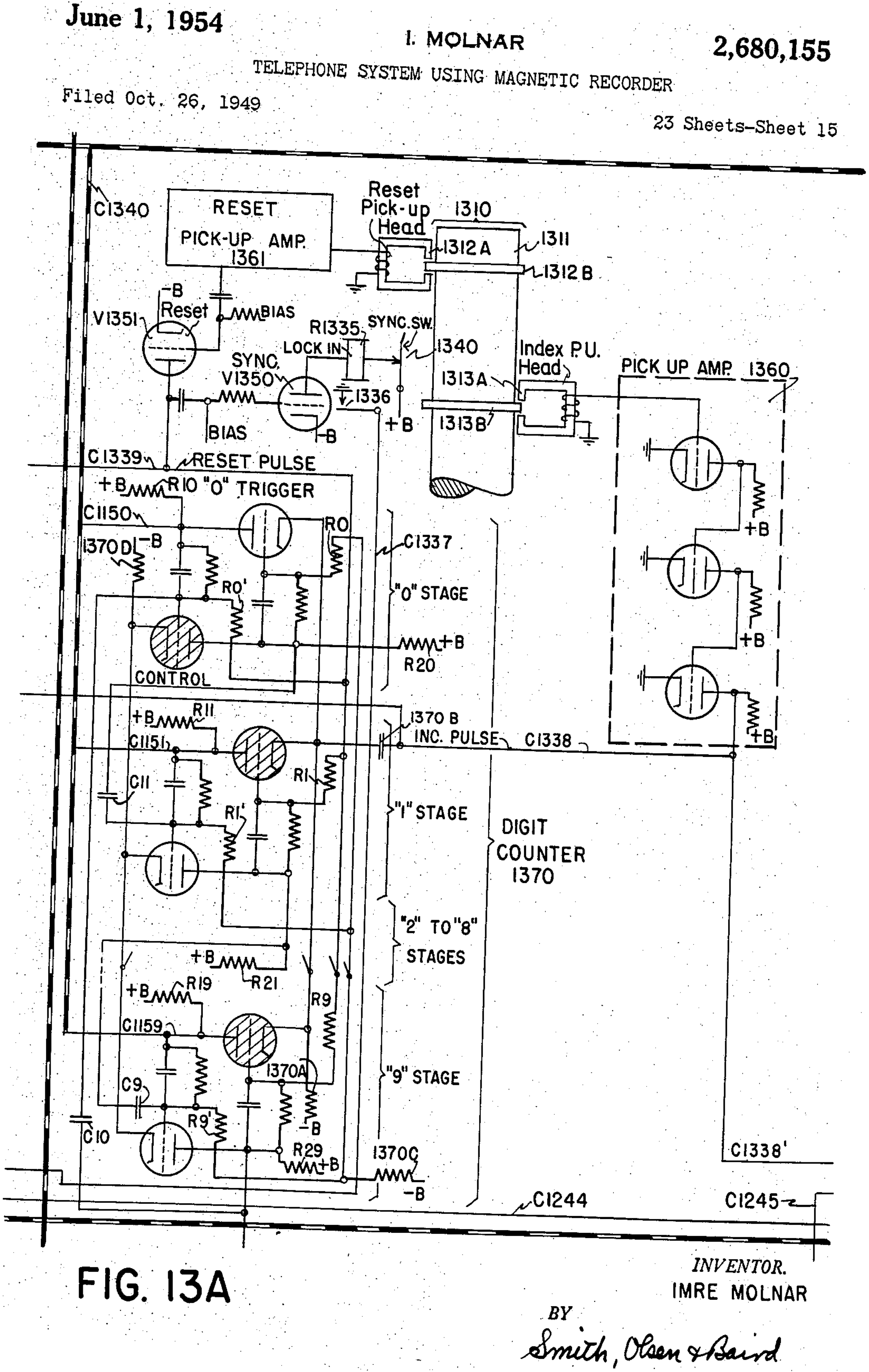
Figure 13B:
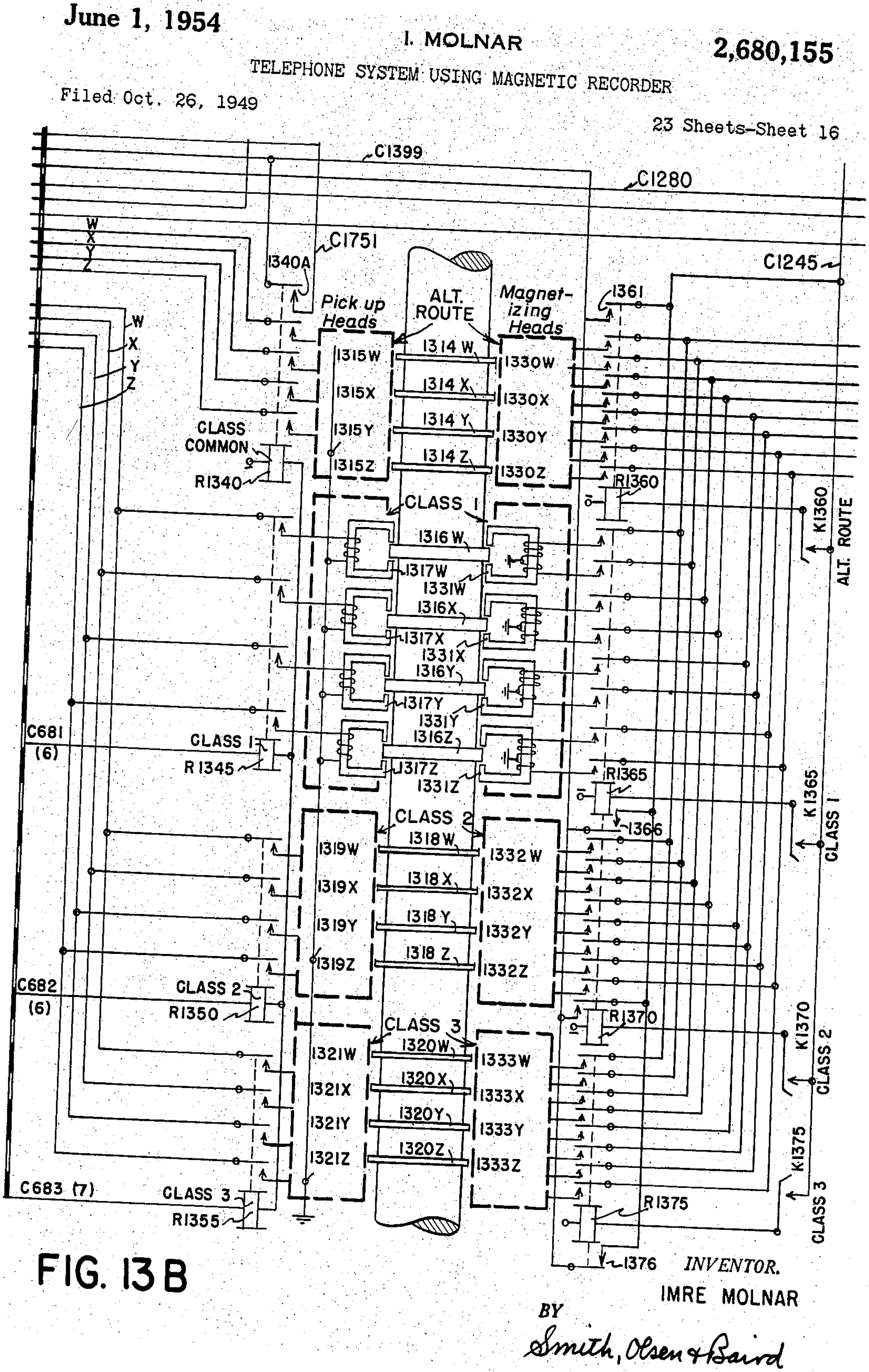
Figure 14A:
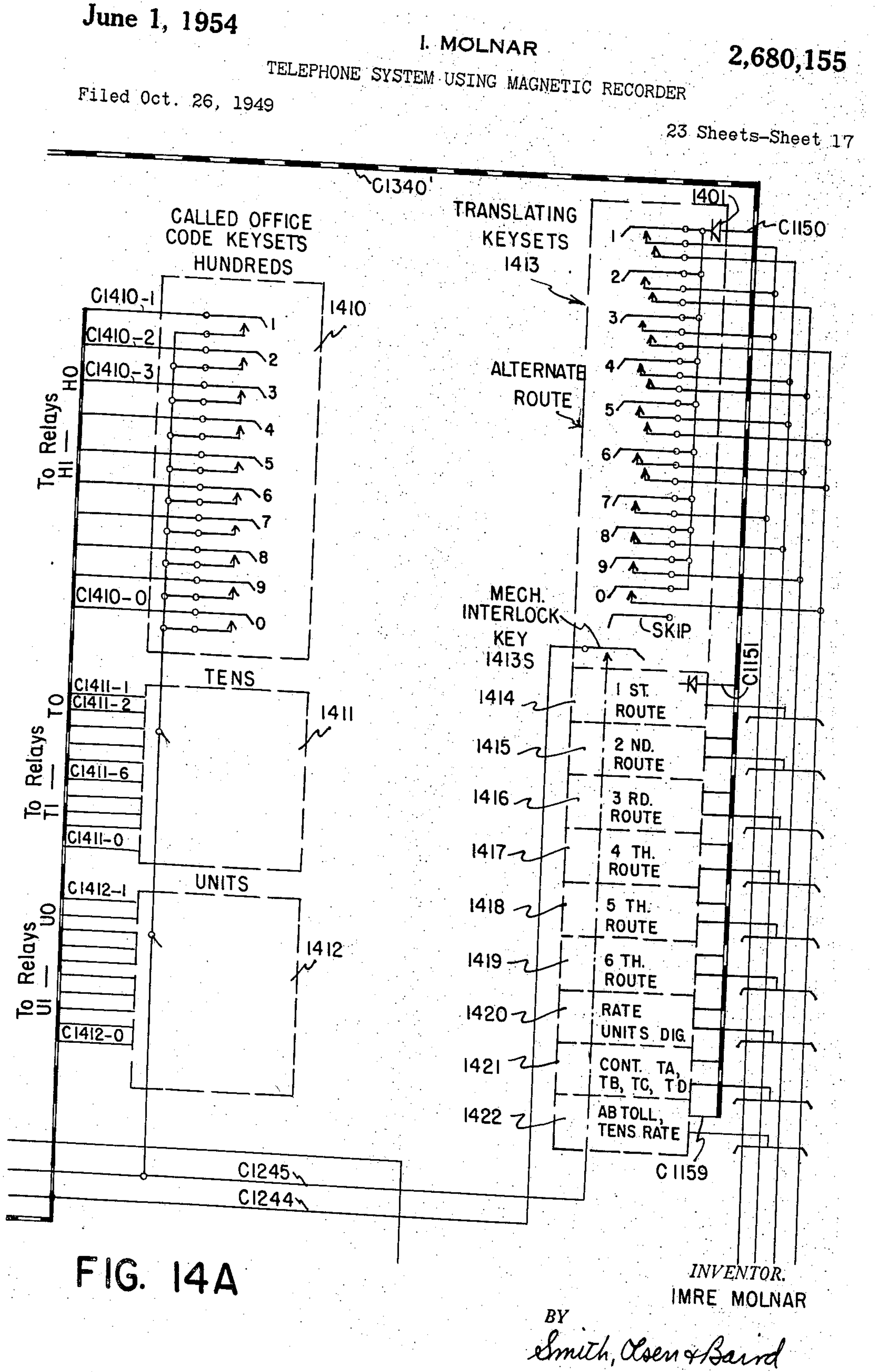
Figure 14B:
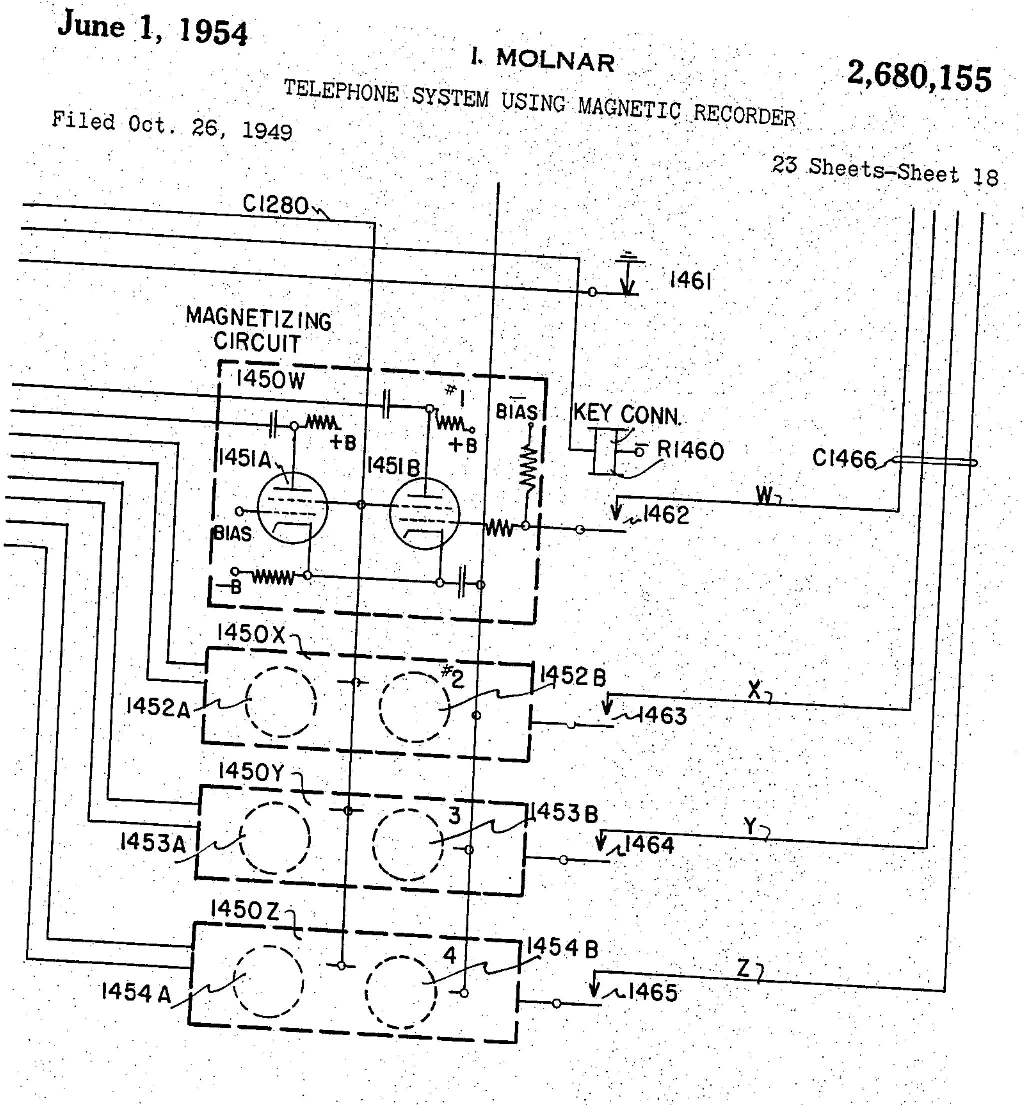

The translator 1300 also includes a magnetic storage device 1310 schematically illustrated in Figs. 13A and 13B, which includes a motor driven drum or translator marker 1311 provided with a surface of magnetic material. In the present arrangement the magnetic storage device 1310 is provided with a rotatable drum 1311 having an exterior surface throughout its length of magnetic material. It should be understood, however, that various other forms of magnetic materials may be secured to the surface of the rotating drum 1311, such as wire or tape, which can be permanently magnetized by momentarily subjecting the magnetic material to a magnetic field of a magnetizing head as the drum is rotated past the magnetic field. In the present arrangement a plurality of magnetizing heads are positioned at spaced intervals along the length of the drum 1311 to provide a corresponding number of magnetized tracks around the circumference of the drum 1311. Each magnetized track, as will be described in detail hereinafter, comprises a plurality of circumferentially spaced magnetized spots upon the magnetizing surface of the drum 1311. In the present arrangement each magnetized spot on the surface of the drum 1311 will be approximately .01" in diameter and the edges of adjacent magnetized spots will be spaced apart approximately .01".

Since the translator 1300 may register any combination of three digits in the coincidence detector 1100, it should be understood that the maximum capacity of the translator, as illustrated, will be to register any one of 1000 different called office codes. For example, if it is assumed that each called office code corresponds to a particular magnetized spot on the indexing track 1313B (Fig. 13A) of the drum 1311, a total of 1000 separate magnetized spots will be required to correspond respectively to 1000 different called office codes.

Furthermore, if each called office code is to be translated into a maximum of ten different items of information, nine additional magnetized spots must be provided between each magnetized spot corresponding to a called office code. In other words, the angular displacement on the drum 1311 corresponding to any called office code is equivalent to ten consecutive magnetized spots on the indexing track 1313B. In view of the above, it will be understood that in the present arrangement of the translator 1300, the indexing tracks 1313B of the magnetic storage device 1310 will be provided with 10,000 magnetized spots and each group of ten consecutive spots is individual to a particular three-digit code. During the rotation of the drum 1311, the indexing pick-up head 1313A will be magnetized as each spot passes the indexing head and a corresponding number of pulses will be transmitted to the pick-up amplifier 1360.

Provisions have also been made in the translator 1300 for counting each of the pulses amplified by the pick-up amplifier 1360. More specifically, the arrangement for counting the various impulses comprises a digit counter 1370, a units digit counter U1220, a tens digit counter T1130 and a hundreds digit counter H1120. Each of the above-enumerated counters comprises ten pairs of vacuum tubes arranged in a flip-flop circuit to count ten successive pulses. The digit counter 1370 counts the first ten pulses received and in response thereto causes one pulse to be carried over to the units digit counter U1220. Consequently, when the digit counter 1370 has counted one hundred impulses, the units digit counter U1220 will have counted ten of the impulses carried over from the digit counter 1370. Furthermore, when the units digit counter U1220 has counted ten impulses, a carryover pulse is transmitted to the tens digit counter T1130 and when the tens digit counter T1130 has counted ten impulses, a carryover pulse is transmitted to a hundreds digit counter H1120. With this arrangement, the counters 1370, U1220, T1130 and H1120 count the index pulses transmitted during each revolution of the drum 1311 of the magnetic storage device 1310. During one cycle of rotation of the drum 1311, the number of pulses counted and registered in the hundreds, tens and units counters H1120, T1130 and U1220 will correspond to any called office code digits which may have been registered respectively in the registers of the coincidence detector 1100. When the number of impulses counted correspond to the three digits of a registered called office code, the angular section of the drum 1311 which is individual to the registered called office code will be selected. In this selected angular section of the drum 1311, as the ten magnetized spots on the index track of this section of the drum are counted, at least ten translations may be transmitted in code form to the coder 1800 portion of the director in order to register therein appropriate items of information for routing the telephone connection to the exchange corresponding to the called office code registered in the call register 1500 portion of the director.

Although the present translator is arranged to translate each called office code registered in the coincidence detector 1100 into a maximum of ten different items for controlling the operation of an associated director, it should be understood that the number of different items for each called office code translation may be increased or decreased by appropriately varying the number of counting stages in the digit counter 1370 and the number of index magnetized spots on the track 1313B.

In order to retain the above-mentioned digit counters in synchronism with the magnetized spots provided on the indexing track 1313B, a reset magnetized track 1312B is provided which contains one magnetized spot appearing on the circumference of the drum surface at the starting point of each cycle. When this magnetized spot passes under the reset pick-up head 1312A, a pulse is transmitted to the pick-up amplifier 1361 where it is amplified for the purpose of controlling the reset vacuum tube V1351. Each time this control is exercised the digit counters are restored to their normal positions so that they may start a new count at the beginning of each cycle of rotation of the drum 1311.

The drum 1311 of the magnetic storage device 1310 is also provided with sixteen additional magnetized tracks, divided into four groups of four tracks each. Each set of four tracks has associated therewith four pick-up heads which may be controlled in accordance with the magnetized spots appearing on the associated tracks in order to transmit code signals over four separate control conductors in accordance with the previously mentioned WXYZ code. The first four tracks 1314W, 1314X, 1314Y and 1314Z and the four associated pick-up heads 1315W to 1315Z, inclusive, are provided for transmitting coded information in accordance with an alternate route corresponding to certain of the called office codes and they are effective only in the event the direct trunk routes to the certain called offices are busy at the time the translator 1300 is associated with the director. The second group of four tracks 1316W to 1316Z, inclusive, and the associated pick-up heads 1317W to 1317Z, inclusive, are provided for transmitting coded information in accordance with the translations of the called codes for completing connections in response to calls made by class 1 calling subscribers. The remaining two sets of four tracks 1318W to 1318Z, inclusive, and 1320W to 1320Z, inclusive, and the associated pick-up heads 1319W to 1319Z, inclusive, and 1321W to 1321Z, inclusive, are provided respectively to transmit over appropriate marking conductors the translations necessary to complete connections to called exchanges in accordance with the called office codes in response to calls extended from the class 2 calling subscribers or the class 3 calling subscribers.

In view of the foregoing explanation it will be understood that since each group of ten magnetized indexed spots on the track 1313B represents a different called office code, provisions must be made to prevent the alternate route and the class 1 to class 3, inclusive, pick-up heads from transmitting signals corresponding to the translations of all of the called office codes during each cycle of rotation of the drum 1311. However, when the position of the drum 1311 corresponds to the particular called office code which has been registered in the coincidence register 1100, provisions must be made to permit the translated information stored on the subsequent ten positions of the drum 1311 to be transmitted to the director and to thereafter block further transmission during the completion of the rotation of the drum 1311 back to the beginning of a new cycle of rotation. The arrangement for permitting the transmission of the translation corresponding only to the called office code registered in the coincidence detector 1100 comprises a four tube principal route gate 1250. The four vacuum tubes in the principal route gate 1250 are normally blocked in a non-conductive condition and are only rendered conductive to respond to impulses of the class 1, 2 and 3 pick-up heads only when the position of the digit counters corresponds to the digits registered in the coincidence detector 1100. The translator 1300 is also provided with an alternate route gate 1260, which is substantially the same as the principal route gate 1250, and it is rendered effective to pass translations corresponding to an alternate route when all of the direct trunks of the particular route are busy.

Figure 11B:
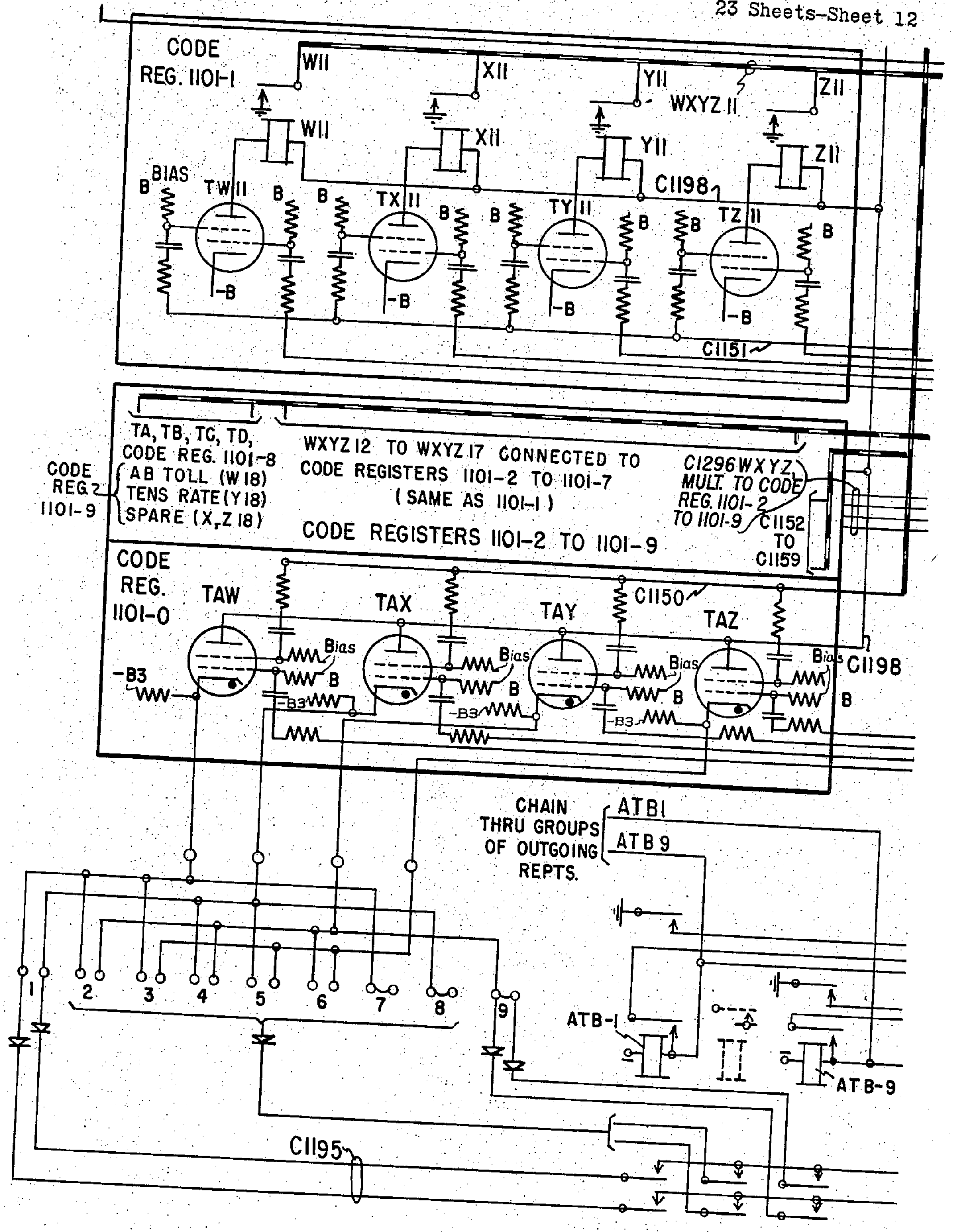

When either the alternate route gate 1260 or the principal route gate 1250 is rendered effective to pass impulses generated by the pick-up heads, they control respectively the ten code registers 1101-0 to 1101-9, inclusive, shown in Fig. 11B. The manner in which the ten code registers 1101-0 to 1101-9 are operated depends upon the combination of the pick-up heads which are effective to respond to the magnetized spots appearing on the associated tracks. Each of the relays in each of the code registers 1101-1 to 1101-9 may be operated individually or in pairs in accordance with the WXYZ code previously noted to register a maximum of nine items of information corresponding to the translation of a particular called office code. The code register 1101-0 is not provided with register relays, but it may be operated in accordance with the direct trunk route number for any particular called office code in order to test whether the alternate trunk route or the direct trunk route translations should be made. As the translated information is registered in the ten code registers 1101-0 to 1101-9 various operations are performed whereby the translated route digits of the called office code are transferred to the coder 1800 portion of the director and whereby a test is made to determine the busy condition of the direct trunk over which the connection is normally to be extended to the desired called office.

The translator 1300 is also provided with facilities for impressing magnetized spots on the various magnetizing tracks in accordance with the particular translations which must be made depending upon the different called office codes. For this purpose, the translator 1300 is provided with four sets of four magnetizing heads which correspond respectively to each of the pick-up heads, except index and reset pick-up heads 1313A and 1312A. The magnetized spots appearing on the tracks associated with the index head 1313A and the reset pick-up head 1312A are normally permanently placed upon the associated magnetized tracks and need not be changed after the magnetized spots have been placed thereon. It should be understood, however, that magnetizing heads could be provided for altering the magnetizing spots appearing on the indexing track 1313B and the reset tracks 1312B, if desired.

In order to control the magnetizing heads associated with the alternate route tracks and the class 1, 2 and 3 tracks, the translator 1300 is provided with three groups of called office code key sets 1410, 1411 and 1412 which may be respectively operated in accordance with the hundreds, tens and units digits of any particular called office code. Since each code for a called office may be translated into at least ten separate items of information, ten additional key sets 1413 to 1422, inclusive, are also provided and these key sets may be individually operated in accordance with the particular ten translations which are individual to the particular called office code registered on the called office code key sets. The contacts of the various key sets 1413 to 1422, inclusive, are connected in accordance with the previously mentioned WXYZ code to four control conductors which extend to the magnetizing head control circuit 1450W to 1450Z, inclusive. The control circuits 1450W to 1450Z are multiply connected to the various magnetizing heads through the contacts of selectively operable connecting relays in order to control the associated magnetizing heads in accordance with the information registered on the key sets 1413 to 1422, inclusive. Since the translated information which is registered on the key sets 1413 to 1422, inclusive, pertains only to one particular three-digit called office code registered respectively on the key sets 1410 to 1412, inclusive, provisions must be made for preventing the magnetizing circuits 1450W to 1450Z from controlling the various magnetizing heads until the drum 1311 has been rotated to a position which would place the first of the ten positions corresponding to the called office code under the magnetizing heads. In order to accomplish this, the key sets 1410 to 1412, inclusive, operate the called office code registers 1110, 1120 and 1130 to register therein the desired called office code. As the drum 1311 rotates, the counters 1370, U1220, T1130 and H1120 count the various index pulses. When the number of pulses correspond to the registered called office code, circuits are completed for sequentially rendering the translation keys 1413 to 1422 effective as the next ten indexing spots are counted in order to energize the selected magnetizing heads in accordance with the operated condition of the translation keys. In this manner the magnetizing heads cause the associated magnetizing tracks to be magnetized in accordance with translations set up on the translation keys 1413 to 1422, inclusive.

During the normal operation of the translator 1300, the drum 1311 of the translator marker 1310 is rotated one hundred twenty revolutions a minute under control of a motor (not shown) in a conventional manner. Therefore, the translator can count the 1000 different magnetized spots on the indexing track and transmit the ten items of translation of any particular called office code to an associated director in an exceedingly short period of time. In the above general description of the translator marker 1310 it was pointed out that the pick-up heads and the magnetizing heads associated with the drum 1311 were separate units performing respectively the pickup function and the magnetizing function. The pick-up heads and the magnetic heads have been shown separately, purely as a matter of convenience in illustrating the circuit arrangements, but it should be understood that in actual practice the circuit controlling windings of a pick-up head and an associated magnetizing head are wound on the same core structure. Accordingly, the windings on the pick-up heads 1315W to 1315Z, 1317W to 1317Z, 1319W to 1319Z and 1321W to 1321Z are effective during the rotation of the drum 1311 to respond to the various magnetizing spots appearing on the associated tracks. Furthermore, when it becomes necessary to alter the magnetic spots on the associated tracks, the windings of the magnetizing heads become effective to alter the magnetized spots upon the associated tracks in accordance with any desired new translation set up on the translating keys 1413 to 1422, inclusive.

The detailed manner in which the translator 1300 operates will be described hereinafter in conjunction with the setting up of a telephone connection from a calling subscriber in the FLorida 3 exchange to a desired called subscriber.

*The selection of an idle primary selector and an idle director*

For the purpose of describing the operation of the system, it will be assumed that a call is initiated by a subscriber at substation 401 located in the FLorida 3 exchange. It should be understood, however, that the substation 401 may be of the class 1, class 2 or class 3 type as previously noted in connection with the description of the various classes of subscriber lines shown in Fig. 3. Referring to Fig. 5 of the drawings, it will be seen that the substation 401 is connected to the line circuit 405 and that the line circuit 405 is accessible to the line finder 440. When the subscriber at substation 401 initiates a call, the line circuit 405 operates and controls the distributor 442 and the line finder 440 to find the calling subscriber line in the manner described in detail in the previously mentioned Ostline application. When the calling subscriber line is found by the line finder 440, the primary selector 500 individually associated with the line finder 44 is operated to cause the director hunter 450 to find an idle director. For the purpose of this description it will be assumed that the director comprising the controller 600, the call register 1500 and the coder 1800 is selected for use in this telephone connection.

The foregoing operations all take place in response to the removal of the receiver by a subscriber at substation 401 and it should be understood that the calling subscriber line is now connected by way of the line circuit 405, the line finder 440, the primary selector 500 and the director hunter 450 to the controller 600 portion of the director.

*Seizure of an idle director*

For the purpose of this description it will be assumed that the wipers of the director hunter 450 seized the idle director over the conductor C468 to C475, inclusive, included in the cable C301. Consequently, the calling subscriber's loop circuit is extended to Fig. 10 and then by way of the conductors C471 and C472, the windings of the party line relay R1030, the winding of the line relay R1040, the contacts 1071 and 1073, the resistor 1055 and to battery and ground respectively. The terminal shown to the left of the resistor 1055 is marked with the negative symbol (—) to indicate that the terminal is connected to the negative pole of the 48 volt exchange battery. The line relay R1040 operates over this loop circuit but the party line relay does not operate due to the fact that the windings thereof are differentially wound. The relay R1040, upon operating, at its contacts 1042, completes an obvious circuit for operating the hold relay R1050 and the latter relay, upon operating, at its contacts 1051, applies a ground potential to the conductor C1037, extending to Fig. 7 in order to cause the operation of the seizure relay R750. The seizure relay R750 operates and prepares the controller 600 portion of the director for further operation in the manner described in detail in the previously mentioned Ostline application.

Figure 7:
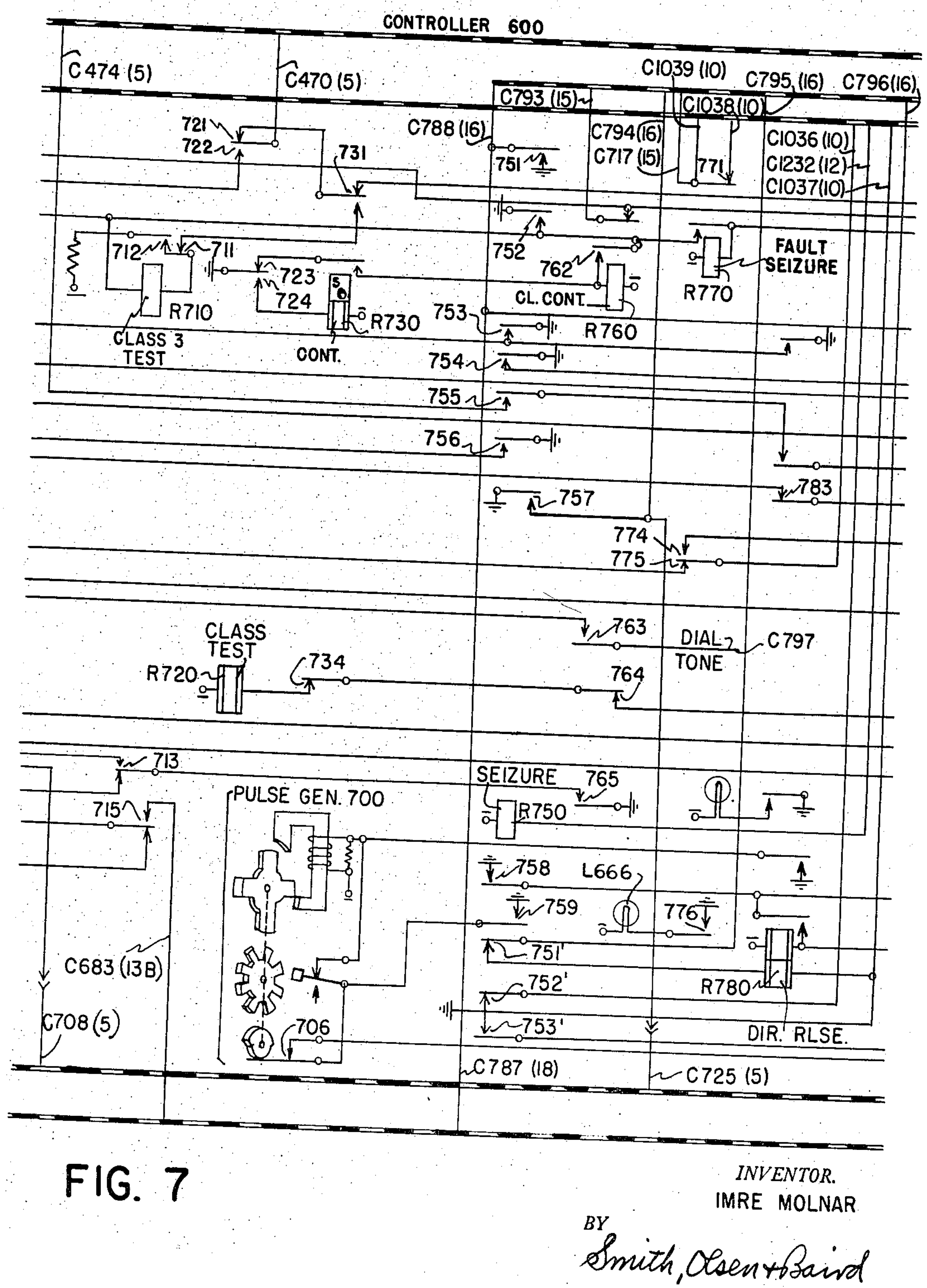
Figure 8:
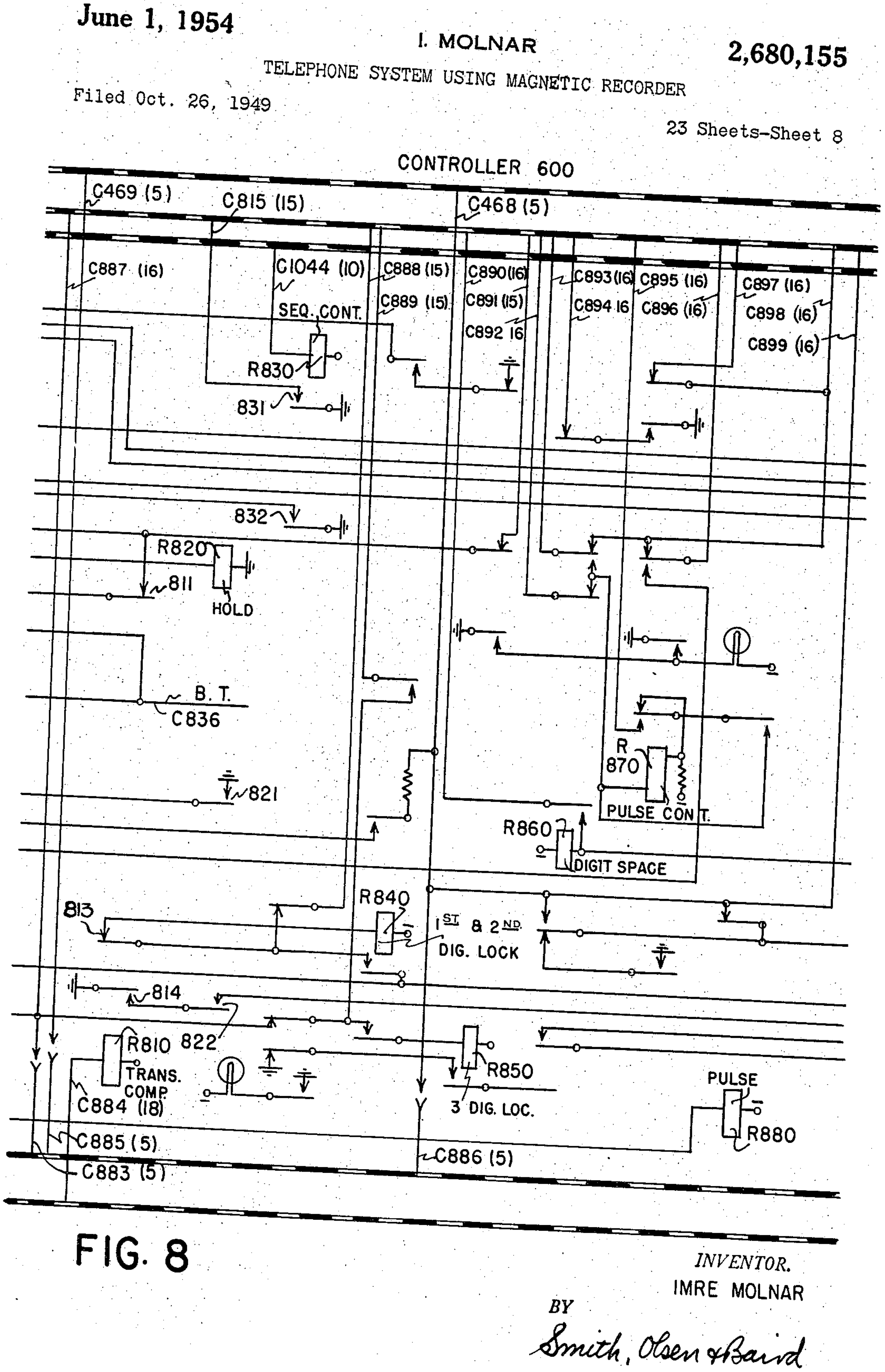
Figure 9:
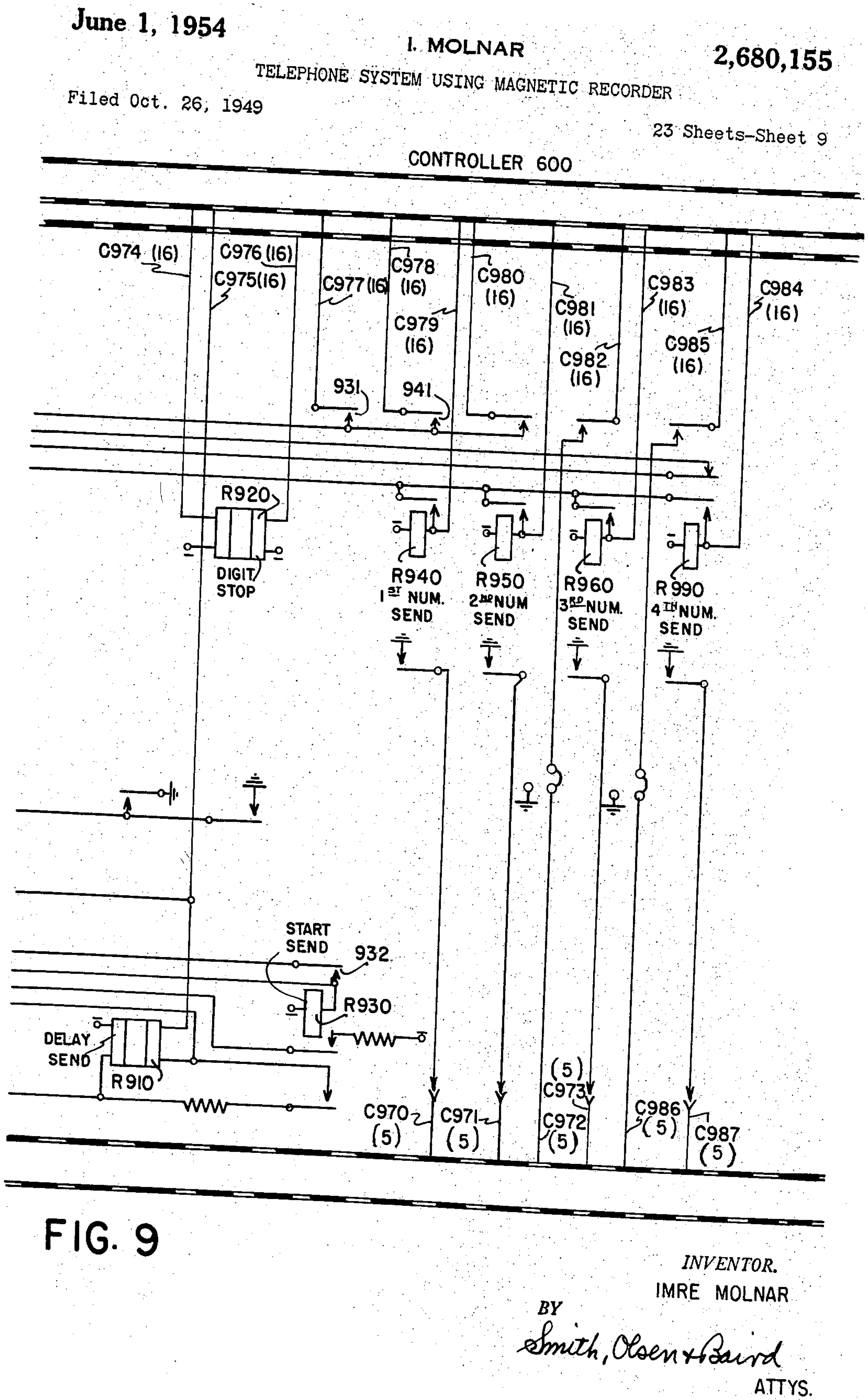
Figure 10:
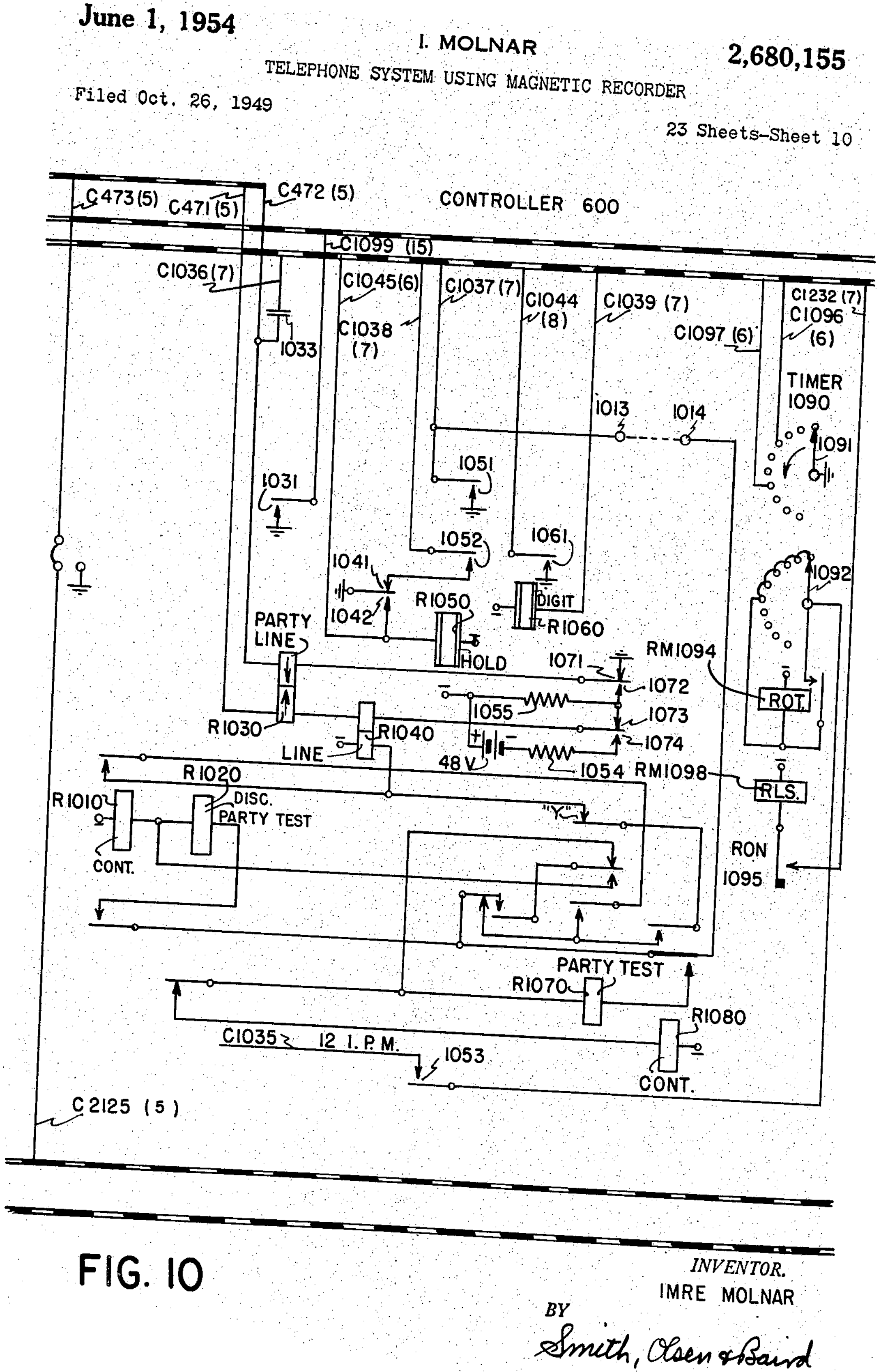

As a further result of the operation of relay R1050, at its contacts 1052, it prepares a point in an imposing circuit including the conductor C1038 extending to Fig. 7, the contacts 771, the conductor C717 extending to Fig. 15, the wiper 1514 of the receive sequence switch 1510 and the engaged contact in the associated contact bank. This impulsing circuit, as will be described hereinafter, is utilized to control the various registers in the call register 1500 to register the successive digits dialed by the calling subscriber. A branch of the above-traced impulsing circuit also includes the contacts 771, the conductor C1039 and the winding of the digit relay R1060. Inasmuch as the digit relay R1060 is of the slow-to-release type it remains in its operated position during each series of impulses and restores to normal during the interdigital pause. The digit relay R1060, at its contacts 1061, applies ground potential to the conductor C1044 extending to Fig. 8, thereby to periodically control the sequence control relay R830. The latter relay, in turn, at its contacts 831, periodically applies ground potential to the conductor C815 extending to Fig. 15 thereby to control the magnet RM1511 of the receive sequence switch 1510. In view of the foregoing it will be understood that at the termination of the impulses of each series transmitted by the calling subscriber the sequence switch 1510 is automatically controlled to transfer, at its wiper 1514, the previously described impulsing circuit to the magnets of the registers in the call register 1500 in a predetermined order. Finally, the hold relay R1050 completes, at its contacts 1053, a circuit for controlling timer 1090.

When the seizure relay R750 operates, at its contacts 751, it applies ground potential to the conductor C787 extending to the coder 1800 (Fig. 18) thereby to prepare a holding circuit for retaining any subsequently operated relay in the coder 1800 in its operated position. At its contacts 751, the relay R750 also applies ground potential to the conductor C788 extending to Fig. 16 in order to ground certain of the contacts in the bank accessible to the wiper 1664 of the sender switch 1600. At its contacts 757, the relay R750 applies ground potential to the conductor C794 extending to Fig. 16, in order to prepare the call register 1500 for further operation and it also applies ground potential to the conductor C725 extending to the start relay (not shown) in the call recorder 2000 (Fig. 5). At its contacts 755, the relay R750 connects the grounded winding of the hold relay R820 to the conductor C474 thereby to complete a holding circuit for the director test relay (not shown) in the primary selector 500 (Fig. 5). The hold relay R820 operates over this circuit and, at its contacts 821, completes an operating circuit for the class test relay R720. At its contacts 753, the relay R750 completes an obvious circuit for operating the director busy relay R810 which relay marks the director busy in the banks of all of the director hunters, such as the director hunter 450, having access thereto. At its contacts 751′ and 752′ the relay R750 interrupts points in the releasing circuits for the director and, at its contacts 753′, it biases the delay send relay R910 to prepare that relay for subsequent operation. Finally, at its contacts 759, the relay R750 completes a starting circuit for the pulse generator 700 thereby to cause the latter to generate pulses, at its contacts 706, at the rate of approximately ten pulses per second.

When the class test relay R720 operates, in the manner pointed out above, at its contacts 722, it connects the class 2 test relay R670 to the conductor C479 extending to Fig. 5, thereby to prepare the controller 600 to receive and register information in accordance with the class of the particular calling subscriber line.

Since the calling subscriber line may be provided with any one of three classes of service, the controller 600 portion of the director is arranged to operate and register the class of the calling subscriber line. In the call being described, it is noted that the line circuit 405, individual to the calling line, is provided with a terminal 428 which may be jumpered to the grounded terminal 425 or to the resistance battery terminal 426 or the jumpers may be omitted so that no potential is applied to the terminal 428. If the calling subscriber line is a class 1 line arranged for extended service facilities, no potential is applied to the terminal 428. If the calling subscriber line is a class 2 line arranged for free local service, the terminal 428 will be grounded by strapping the terminal 428 to the grounded terminal 425. Finally, if the calling subscriber line is a class 3 line, the terminal 428 is jumpered to the resistance battery terminal 426, thus indicating that the particular line is paystation line.

In view of the foregoing, it should be understood that when the class 2 test relay R670 is connected to the conductor C479, a test is immediately completed for determining whether or not the particular calling line is of the class 2 type. If the calling line is arranged for class 2 service, the direct ground applied to the terminal 428 causes the operation of the class 2 test relay R670. The relay R670, upon operating, at its contacts 672 and 674, prepares points in circuits described hereinafter for indicating that the calling line is of the class 2 type.

In the event the calling line is not a class 2 line, no ground potential will be provided for operating the class 2 test relay R670.

As a further result of the operation of relay R720, at its contacts 724, it completes an obvious circuit for operating the slow-to-operate control relay R730. Upon operating, the relay R730, at its contacts 734, interrupts the circuit of the class test relay R720 which restores to normal and, at its contacts 721 and 722 disconnects the class test conductor C470 from the class 2 test relay R670 and connects it to the class 3 test relay R710. Finally, at its contacts 723, the class test relay R720 completes a circuit for operating the class control relay R760. If the class conductor C470 has resistance battery applied thereto in accordance with a class 3 calling line, the class 3 test relay R710 will operate and, at its contacts 712, it completes a locking circuit for itself from ground at contacts 752. As a further result of the operation of the class 3 test relay, at its contacts 713 and 715, it will prepare points in the circuits for indicating that the calling line is of the class 3 type.

If neither the class 2 test relay R670 nor the class 3 test relay R710 are operated during the cycle in which these relays are successively connected to the class conductor C470, an indication will be made that the calling line is of the class 1 type.

As a further result of the operation of the class control relay R760, at its contacts 762, it locks itself in its operated position, and at its contacts 765, it completes a circuit for illuminating the class 1, 2 or 3 lamps 676, 677 or 678 corresponding to the class of the particular calling subscriber line. In the event that the calling line is of the class 2 type the circuit illuminating the class 2 lamp 677 is also extended over the conductor C708 to the call recorder 2000 (Fig. 5) thereby to mark the call recorder 2000 with an indication of the fact that the calling line is of the class 2 type.

The above described operations all take place prior to the time that the dial tone signal is transmitted to the calling subscriber to indicate that the dialing of the called subscriber directory number may be initiated. The final control exercised by the class control relay R760 is accomplished, at its contacts 763, by transmitting the dial tone signal applied to the conductor C797 by way of the contacts 624 and 775, the conductor C1036 extending to Fig. 10 and then by way of the condenser 1033 to the calling subscriber line in the well-known manner.

*Dialing the called subscriber directory number*

When the calling subscriber at substation 401 receives the dial tone signal, the dial may be operated in accordance with the called subscriber directory number. The first two digits dialed by the calling subscriber correspond to the first two letters appearing in the called exchange name and followed by a digit designating the particular called exchange. The two letters and the digit designating the called exchange are normally referred to as the called office code. Thereafter the calling subscriber dials the four numerical digits designating the particular called subscriber line terminating in the called exchange.

The detail operation of the circuits whereby the digits of the called subscriber directory number are registered in the call register 1500 is described in detail in the previously mentioned Ostline application. Accordingly, it will be assumed that the seven digits of the called subscribed directory number are registered respectively in the registers 1520, 1530, 1540, 1610, 1620, 1630 and 1640 in the call register 1500 portion of the director. After each digit is registered in the above-mentioned registers, the receive sequence switch 1510 is controlled to advance its wipers 1513 to 1616, inclusive, one step in a counterclockwise direction thereby to successively connect the impulsing circuit previously described to the conductors C1551 to C1557, inclusive, extending to the above-noted registers in the call register 1500.

At the end of the first digit dialed by the calling subscriber, the wipers 1523 to 1527 of the first code register 1520 engaged the contacts in the associated contact banks corresponding to the digit dialed. At this time the wipers 1524 and 1525 mark the code conductors WXYZ21 to register in code form the first digit dialed. The wiper 1526 also marks a particular conductor terminating in its associated contact bank for the purpose of determining whether or not the first dialed digit corresponds to the first digit of a local exchange designation. The wiper 1527 marks one of the ten conductors 1 to 0, inclusive, in the cable 1101 extending to the called office code hundreds register 1110 in order to prepare circuits for operating corresponding ones of the ten relays H1 to H0, inclusive.

Shortly following the registration of the first dialed digit, the sequence switch 1510 advances its wipers an additional step so that the second digit dialed by the calling subscriber will be registered in the second code register 1530 in the manner described above. The wipers 1534 and 1535 mark the code conductors WXYZ22 in accordance with the second digit of the called office code; the wiper 1536 marks the conductor terminated in the associated contact bank to determine whether the second dialed digit corresponds to the second digit of a local exchange designation; and the wiper 1537 selects one of the ten conductors 1 to 0, inclusive, in the cable 1102 thereby to prepare a circuit for operating one of the ten relays T1 to T0, inclusive, in the called office code tens register 1120.

Before proceeding with the description of the registration of the third called office code digit dialed by the calling subscriber it should be noted that the sequence control relay R830 which operates in response to the first pulse of the first digit dialed, at its contacts 832, completes a circuit for operating the tone relay R620. The latter relay, upon operating, locks itself in its operated position, at its contact 622, to ground at contacts 756; at its contacts 624, it disconnects the dial tone signal from the calling subscriber line; and at its contacts 621 it interrupts a point in the circuit including the control conductor C1096, which circuit is only effective in the event the calling subscriber fails to dial within fifteen seconds after the director has been seized. It should also be noted that the hold relay R1050 and the digit relay R1060 (Fig. 10) are maintained in their operated positions during the dialing of each digit. Consequently, the ground potental, at contacts 1051, is extended by way of the interconnected terminals 1013 and 1014 for operating the control relay R1080. The purpose of providing the terminals 1013 and 1014 is to permit the selective use of the functions of relays R1010, R1020, R1070 and R1080 in the event that toll ticketing facilities are provided in the telephone system and, further, in the event that some of the subscriber lines having access to the director are of the party type. The above-named relays function to change the potential applied to the windings of the party line relay R1030 and the line relay R1040 whereby the party line relay may be controlled from ground pulses transmitted by the special dial provided at the second, third and fourth party subscriber substations on party lines. The manner in which the relays R1010, R1020, R1070 and R1080 operate to render the party line relay effective only during the dialing of the second digit is described in detail in the above-mentioned Ostline application. Accordingly, it will be understood that each time the party line relay R1030 is operated by ground pulses transmitted from the special dials at either the second, third or fourth party subscriber substation on a party line, at its contacts 1031, it applies one, two or three ground pulses to the conductor C1099 extending to Fig. 15 and then by way of the wiper 1516 in engagement with the first contact, during the dialing of the second digit, to conductor C1517 extending to the call recorder 2000 in Fig. 5. In this manner the party line relay R1030 grounds the conductor C1099 one, two or three times in order to transmit the identity of the second, third or fourth subscriber substation on a four party line to the call recorder 2000. The identity of the calling party substation, as registered in the call recorder 2000, may subsequently be utilized in controlling the operation of the detector 1900 to detect and register the directory number individual to the particular calling subscriber substation on a calling party line.

Returning again to the operation of the call register 1500, it is noted that after the second digit has been registered in the second code register 1530, the sequence switch 1510 is again operated to advance its wipers an additional step whereby the pulsing circuit is extended to the third code register 1540. In response to the dialing of the third digit the wipers 1544 and 1545 register the third digit and mark the code conductors WXYZ23, accordingly. The wiper 1546 of the third code register 1540 marks a conductor terminating in its associated contact bank in accordance with the digit registered, whereby a determination is made of whether or not the third dialed digit corresponds to the third digit of a local called exchange and whether or not the director is to be released from the connection. Finally, the wiper 1547 marks one of the ten conductors 1 to 0, inclusive, in the cable 1103, thereby to prepare a circuit for a corresponding one of the ten relays U1 to U0, inclusive, in the called office code units register 1130.

From the operations described above, it will be understood that the first three digits representing a particular office code designation are registered in the call register 1500. These same code digits are subsequently registered in the called office code hundreds, tens and units registers 1110, 1120 and 1130 when the translator 1300 is connected to the calling director.

The last four digits dialed by the calling subscriber are the numerical digits of the called subscriber directory number and they are respectively registered in the first, second, third and fourth numerical registers 1610, 1620, 1630 and 1640 in the call register 1500 in the same manner the first three digits are registered in the first, second and third code registers 1520, 1530 and 1540. It should be understood, however, that in the event that the first three digits of the called office code indicate that the call is a local call, the director is released from the calling subscriber line and the last four digits dialed by the calling subscriber will directly control the local switch train and they will not be registered in the numerical registers of the call register 1500. The operation whereby the director is released in case the call is a local call are described in detail in the previously mentioned Ostline application.

*Calls to exchanges in other zones*

It wil be assumed for the purpose of the present description that the calling subscriber at substation 401 has dialed into the director the seven digits 361–1234 of the directory number of a called subscriber in the EMpire 1 exchange. In response to the dialing of the digits corresponding to the called office code EM–1 the code digits 361 are registered respectively in the first, second and third code registers 1510, 1520 and 1530 in the manner previously described. Also the four numerical digits 1, 2, 3 and 4 are registered respectively in the first, second, third and fourth numerical registers 1610, 1620, 1630 and 1640 in the manner previously explained. The above-named registers mark the WXYZ21 to WXYZ27, inclusive, code conductors in accordance with the seven registered digits and in addition to the above, the code registers 1520, 1530 and 1540 prepare circuits for marking the corresponding conductors in the three cables 1101, 1102 and 1103 extending to the translator 1300.

During the time that the first digit of the numerical portion of the called subscriber number is being registered in the first numerical register 1610, the wiper 1515 of the sequence switch 1510 engages the third contact in its associated contact bank terminating the conductor C891. As soon as the wiper 1515 engages the contact 3, a circuit is completed for operating the translator start relay R650 which may be traced from ground by way of the contacts 757 of the operated seizure relay R750 and then by way of the conductor C794 extending to Fig. 16, the wiper 1515, the engaged contact 3, the conductor C891 extending to Fig. 8, the contacts 852, 811 and 783, and the winding of the translator start relay R650, to battery. Upon operating, the relay R650, at its contacts 653, completes a locking circuit for itself which includes ground, the contacts 756, 653, 811 and 783 in order to maintain the relay in its operated position after the wiper 1515 disengages the contact 3 in its associated contact bank. From the foregoing, it will be understood that the translator start relay cannot be operated until after the first three digits of a called office code have been registered in the call register 1500. As a further result of the operation of the translator start relay R650, at its contacts 651, it prepares a point in the locking circuit for the upper winding of the translator test relay R640 and, at its contacts 652, it prepares a point in the circuit for the lower winding of the relay R640. The completion of the last-mentioned circuit is determined in accordance with the idle or busy condition of the common translator 1300.

*Operation of the translator 1300*

Referring now to the translator 1300, it will be recalled that the translator marker 1310 is rotating one hundred twenty revolutions per minute under control of a motor (not shown). The magnetic indexing track 1313B is provided with 10,000 magnetized spots (polarized in one direction) and spaced apart circumferentially on the surface of the drum 1311, in circumferential alignment. In circumferential alignment with the first or zero indexing spot on the indexing track 1313B, there is also provided a single magnetized spot on the reset track 1312B which indicates the beginning of each new revolution of the drum 1311. When the translator is first placed into operation, the position of the vacuum tube digit counters 1370, U1220, T1130 and H1120 may be out of counting step with the indexing spots during the first revolution of the drum 1311. In order to prevent a director from engaging the translator 1300 until all of the counters are brought back in synchronism with the magnetized indexing spots on the track 1313B the synchronizing switch 1340 is provided which is interlocked with the motor start circuit (not shown) of the translator marker 1310. Accordingly, the synchronizing switch 1340 is closed when the motor of the translator marker 1310 is started and the lock-in relay R1335 is prepared for operation. The relay R1335, however, cannot operate until the associated reset tube V1351 is rendered non-conductive in response to the first reset pulse from the track 1312B.

At the end of the first revolution of the drum 1311, the single reset magnetizing spot appearing on the track 1312B is centered under the core ends of the reset pick-up head 1312A. The magnetized spot generates a pulse in the pick-up head 1312A which is transmitted to the reset pick-up amplifier 1361. The single pulse thus generated in the amplifier is transmitted to the grid of the reset tube V1351. This pulse appears upon the grid of the tube V1351 as a blocking potential for the normally conducting tube V1351 and causes the tube V1351 to become non-conductive. The potential appearing on the plate of the tube V1351 during its non-conductive condition changes the bias on the grid of the synchronizing tube V1359, in a well-known manner, whereupon the gas filled tube V1350 fires and completes a circuit, including its cathode and anode electrodes, for operating the lock-in relay R1335. The relay R1335, upon operating, at its contacts 1336, applies ground potential to the conductor C1337 in order to mark the translator 1300 as being in proper working order and available to calling directors. The relay R1335 now remains in its operated position until its circuit is broken by the opening of the synchronizing switch 1340, at which time the gas filled tube V1350 is again made non-conductive.

Referring now to the digit counter 1370 (Fig. 13A) it is noted that this counter comprises ten pairs of vacuum tubes respectively designated the "0" stage and the "1" stage to "9" stages, inclusive. The two vacuum tubes of each stage of the counter comprise a trigger tube and a control tube. The cathodes of the trigger tubes of each stage are multiply connected through a relatively low resistance 1370A to a negative bias potential and they are also connected via a condenser 1370B to the incoming pulse conductor C1338. The grid electrodes of the trigger tubes in stages "1" to "9," inclusive, are connected respectively via associated resistors R1 to R9 to the common reset pulse conductor C1339. The corresponding grid of the "0" stage trigger tube is connected via an associated resistor R0 and the resistor 1370C to a negative bias potential. The grid of the control tube in the "0" stage is also connected by way of an associated resistor R0' to the reset pulse conductor C1339. The grid of the control tubes in the stages "1" to "9," inclusive, are respectively connected via associated resistors R1' to R9', inclusive, and the resistor 1370C to a negative bias potential.

From the foregoing it will be noted that grids of the trigger tubes and the control tubes in stages 1 to 9, inclusive, are connected in exactly the same manner whereas the connections to the grids of the trigger and control tubes in the "0" stage are reversed. This reversal is provided, as will be described hereinafter, to restore the digit counter 1370 to the normal "0" stage count position at the begining of each cycle of rotation of the drum 1311.

The various trigger and control tubes in the ten stages of the digit counter 1370 are connected and arranged in flip-flop relationship whereby one tube of each pair is in a conductive condition in order to render to associated tubes of each pair a non-conductive condition. More specifically, the plate electrode of the trigger tube in each of the ten stages "0" to "9," inclusive, is connected by way of an associated condenser resistance network to the grid of the associated control tube. At a junction point between the condenser resistance network and the associated plate electrode of each of the trigger tubes, a positive biasing potential is applied thereto by way of an associated biassing resistor R10 to R19, inclusive. Ten control conductors C1150 to C1159, inclusive, are respectively connected to the plate electrodes of the trigger tubes in stages "0" to "9," inclusive, and they extend via the cable C1340 to the screen grids of the group of four tubes in each of the ten code registers 1101-0 to 1101-9, inclusive, and they are also respectively connected to the ten translating keys 1413 to 1422, inclusive. The plate electrodes of the ten control tubes in each of the ten stages are connected by way of an associated condenser resistance network to the grid of the associated trigger tube. At the junction between the plate electrode and the condenser resistance network of each pair of tubes a positive biasing potential is applied thereto via an associated resistor R20 to R29, inclusive. Accordingly, it will be seen that a positive biasing potential is applied to the grid and plate electrodes of each of the trigger and control tubes in the ten counting stages of the digit counter 1370.

In order to control each successive stage of the digit counter 1370, the plate electrode of the control tube of each stage is connected via a blocking condenser to the grid of the control tube in the succeeding stage of the counter. For example, the plate electrode of the control tube in the "0" stage is connected via a condenser to the grid of the control tube in the stage "1."

The plate electrode of the control tube in the stage "1" is, in turn, connected to the grid electrode of the control tube in stage "2." Each succeeding stage, in turn, is connected in the same manner as noted above. Finally, the plate electrode of the control tube in stage "9" is connected by way of a condenser to the grid of the control tube in the "0" stage. This arrangement provides a reflex counting arrangement wherein after ten counts have been made, the circuit returns to the "0" stage to again start another counting cycle.

During the normal operation of the digit counter 1370, one of the tubes of each pair of tubes in each stage of the counter will be in a conducting condition. More specifically, the trigger tube in nine of the counting stages will be conducting and the associated control tubes will be non-conducting and in the remaining counting stages the trigger tube will be non-conducting and the associated control tube will be conducting. In order to illustrate the foregoing, it will be assumed that the digit counter 1370 is in a condition to count the number "1" pulse transmitted thereto over the incoming pulse conductor C1338. At this particular instant the "0" trigger tube will be in a non-conducting condition and the trigger tubes in stages "1" to "9," inclusive, will be in a conducting condition. Also, the control tube in the "0" stage will be in a conducting condition and the control tubes in stages "1" to "9," inclusive, will be in a non-conducting condition. Accordingly, the positive bias potential through the resistor R10 is applied to the plate electrode of the trigger tube in the "0" stage, to the grid electrode of the control tube in the "0" stage, and to the conductor C1150 in the cable C1340. These points will be at a relatively high positive potential. Accordingly, the positive bias on the grid of the control tube in the "0" stage renders the control tube conductive thereby to complete a current flow between the negative bias potential connected to the associated cathode electrode via resistor 1370D and the associated plate electrode. The application of the negative bias to the plate electrode of the control tube in the "0" stage renders the grid of the trigger tube in the "0" stage negative with respect to its associated cathode. When the grid electrode of the trigger tube in the "0" stage is at a negative potential with respect to the associated cathode, the tube is driven beyond cut-off and thereby prevents current from flowing in the associated plate circuit. In each of the stages "1" to "9," inclusive, however, the trigger tube is in a conductive condition and the associated control tube is in a non-conductive condition.

Referring to the trigger tube in stage "1" it is noted that the positive bias, including the resistor R21, renders the grid of the trigger tube positive with respect to the associated cathode. Accordingly, the trigger tube in stage "1" is rendered conductive and lowers the positive potential in its associated plate circuit. The lowering of the positive potential in the plate circuit of the trigger tube in stage "1" drives the grid of the associated control tube negative with respect to the associated cathode. Accordingly, the control tube in stage "1" is rendered non-conductive. The various other trigger and control tubes in stages "2" to "9," inclusive, are in exactly the same condition as the tubes in stage "1." In view of the foregoing, it will be understood that when the digit counter 1370 is in the "0" count position, the "0" control tube is conductive and the "0" trigger tube is non-conductive whereas the corresponding stages "1" to "9," inclusive, the trigger tubes are conductive and the control tubes are non-conductive.

When the index pick-up head 1313A encounters the next magnetized spot on the indexing track 1313B, a pulse is transmitted to the pick-up amplifier 1360 where it is amplified and applied to the incoming pulse conductor C1338. This pulse is connected via the condenser 1370B to all of the negatively biased cathodes of the ten trigger tubes of stages "0" to "9," inclusive, in the digit counter 1370. Also these cathodes are negatively biased through the resistor 1370a. The pulse applied to the cathodes is of a negative potential and thus drives the various cathodes more negative. Since the grids of the trigger tubes in stages "1" to "9," inclusive, are each at a rather high positive potential with respect to the negatively biased cathodes, these tubes remain in their conductive conditions. However, since the grid of the trigger tube in the "0" stage is at a negative potential with respect to the negatively biased cathode is made more negative, in response to the pulse applied thereto via the conductor C1338, the grid then is somewhat positive with respect to the associated cathode. At this instant the trigger tube in the "0" stage becomes conductive and causes the high bias potential in the associated plate circuit to become less positive. In fact, the potential on the grid of the associated control tube in the "0" stage is now driven to a negative potential with respect to its associated cathode. The "0" stage control tube is thereby rendered non-conductive and bias on the associated plate circuit is returned to the relatively high positive potential via the resistor R20. As soon as the control tube in the "0" stage is rendered non-conductive, the bias potential on the grid of the trigger tube in the "0" stage is rendered more positive through the positive biasing potential connected via the resistor R20. At this point it may be well to point out that the pulse applied to the conductor C1338 may now be removed from the cathodes of the trigger tubes and since the grid of the "0" trigger tube has been driven to a more positive potential, the tube remains conductive due to the fact that the grid is positive with respect to the associated cathode.

As a further result of cutting off the control tube in the "0" stage, the positive bias potential connected to the resistor R20 is extended via the blocking condenser C11 to the grid of the control tube in stage "1" of the digit counter 1370. This grid thus becomes positive with respect to the associated cathode and the tube becomes conductive. In response to the conductive condition of the control tube in stage "1" a cut-off biasing potential is applied to the grid of the trigger tube in stage "1" thereby to render that tube non-conductive. When the trigger tube in stage "1" becomes non-conductive, the positive biasing potential via the resistor R11 is applied to the grid of the control tube in stage "1" to maintain that tube in its conductive condition and to mark the conductor C1151 in the cable C1340. The relatively high positive biasing potential applied to the conductor C1151 prepares the four gas-filled tubes in the code register 1101-1 for operation.

In response to each pulse received over the incoming pulse conductor C1338, a trigger tube in the digit counter 1370 corresponding to the pulse number becomes conductive and the associated control tube becomes non-conductive. In this manner the flip-flop counting pair of vacuum tubes in each stage of the digit counter 1370 are operated to count successive pulses transmitted over the pulse conductor C1338 and in response to the tenth pulse received, the cycle is completed and the "0" stage of the counter is prepared to receive the first pulse of the next group of ten pulses.

Each of the digit counters U1220, T1130 and H1120 are wired in precisely the same manner as the digit counter 1370 and they operate in the same identical manner. However, the digit counters U1220, T1130 and H1120 in addition to the ten marking conductors corresponding to the conductors C1150 to C1159, inclusive, are also provided with ten additional marking conductors which are respectively connected to the plate electrodes of the control tubes therein. The ten marking conductors C1250 to C1259, inclusive, of the units digit counter U1220 are connected respectively via cable C1240 through break contacts of the register relays U0 to U9, inclusive (Fig. 11A), to the grids of the detector tubes VU0 to VU9, inclusive. Also the ten marking conductors C1260 to C1269, inclusive, of the units digit counter U1220 are respectively connected via cable C1240 to the make contacts of the units register relays U0 to U9, inclusive. The tens digit and the hundreds digit counters T1130 and H1120 are provided with two sets of ten marking conductors corresponding to the conductors C1250 to C1259, inclusive, and C1260 to C1269. These sets of ten conductors are respectively connected via the cables C1140 and C1141 to corresponding contacts on the tens and hundreds digit register relays T0 to T9, inclusive, and H0 to H9, inclusive. The detector tubes VT0 to VT9, inclusive, of the tens register 1120 and the detector tubes VH0 to VH9, inclusive, of the hundreds register 1110 are connected to contacts of their respective register relays in the same manner as the detector tubes in the units register 1130.

The units, tens and hundreds digit counters U1220, T1130 and H1120 are provided to count the number of groups of ten pulses that have been counted by the digit counter 1370. If it is assumed that the hundreds, tens and units digit counters U1220, T1130 and H1120 are positioned to indicate respectively the digit "0," then each time the digit counter 1370 counts ten pulses received over the pulse conductor C1338, a pulse will be transmitted to the units digit counter U1220. Accordingly, after ten pulses have been counted by the digit counter 1370, a pulse is registered in the units digit counter U1220. Furthermore, each time the units digit counter U1220 counts ten pulses carried over from the digit counter 1370, a pulse is then transmitted to the tens digit counter T1130. When the tens digit counter T1130 has counted ten pulses carried over from the units digit counter U1220, the hundreds digit counter H1120 will be operated. Finally, after the hundreds digit counter H1120 has counted ten impulses carried over from the tens digit counter T1130, all of the digit counters will then return to their "0" counting stage. This condition will exist after the digit counter 1370 has counted 10,000 pulses received over the conductor C1338.

In order to provide the previously noted reset synchronizing pick-up arrangement, the digit counters 1370, U1220, T1130 and H1120 are controlled at the end of each counting cycle of 10,000 pulses to restore the respective counters to their "0" counting stage. In the present circuit, this is accomplished over the reset pulse conductor C1339, by momentarily applying a control pulse thereto which restores all of the trigger and control tubes of each of the ten stages of each of the digit counters to a position where the digit "0" is indicated. As previously pointed out the reset track 1312B is arranged with a magnetic spot which is effective at the beginning of each cycle of rotation of the drum 1311 to cause a pulse to be transmitted via the pick-up head 1312A and the reset pick-up amplifier 1361 to the grid of the reset tube V1351. This pulse causes the normally conducting tube V1351 to become non-conductive for an instant and thereby changes the potential on the conductor C1339 so that it becomes more positive. This positive biasing potential is applied to the grid electrodes of the control tube in the "0" stage and to the grid electrodes of the trigger tubes in stages "1" to "9," inclusive, in the counters 1370, U1220, T1130 and H1120. The positive potential thus applied causes each of the above-named tubes to become conductive regardless of the conductivity of any of the other tubes in each counter thereby to restore each of the counters to the normal condition whereby the "0" counting stage is effective to mark the associated marking conductors. With this arrangement each new cycle of rotation of the drum 1311 insures that all of the digit counters, previously noted, will begin the new cycle of counting with each of the digit counters in the "0" counting stage.

Referring now to the units digit counter U1220, it is noted that when the "0" trigger tube is non-conductive and the associated "0" control tube is conductive, in accordance with a "0" count, the conductor C1250 in the cable C1240 is biased with a relatively high positive potential and this potential is extended by way of the upper break contact of the units register relay U0 to the grid of the detector tube VU0. This potential causes the detector tube VU0 to become conductive and it renders circuit including the plate electrode thereof negative. The plate circuit of each of the detector tubes in the hundreds, tens and units registers 1110, 1120 and 1130 are multiply connected by way of the resistor 1280a to a positive biasing potential. The positive biasing potential applied by way of the resistor 1280A to the conductor C1280 extends by way of resistors, such as resistors 1280B and 1280C, to the grids of the four WXYZ tubes in the alternate route gate 1260. This positive bias potential applied to the conductor C1280 also extends by way of the resistors, such as the resistors 1280D and 1280E, to the grids of the four WXYZ tubes in the principal route gates 1250. However, this positive bias of itself is insufficient to cause the various WXYZ tubes from becoming conductive. Furthermore when any detector tube in the hundreds, tens and units registers 1110, 1120 and 1130 is in a conductive state, the positive potential of the conductor C1280 is rendered negative with respect to the cathodes of the WXYZ tubes in both the alternate and the principal route gates 1260 and 1250. This negative biasing potential further prevents the tubes in the gates 1260 and 1250 from becoming conductive.

If the register relay U0 in the units register 1130 is in an operated condition, it transfers the grid of the detector tube VU0 from the marking conductor C1250 to the marking conductor C1260 in the cable C1240. When this condition exists, and assuming that "0" stage of the units digit counter U1220 is registering an "0" count, the control tube thereof is in a conducting condition and, accordingly, applies relatively low positive potential to the marking conductor C1260 in the cable C1240. This relatively low marking potential is applied by way of the make contact of the operated relay U0 to the detector tube VU0 in the units digit register 1130. This low biasing potential is negative with respect to the associated cathode and, thus, prevents the detector tube VU0 from being conductive. From the foregoing, it should be understood that as the units digit counter U1220 successively counts the impulses received thereby, the respective ten conductors C1250 to C1259, inclusive, will be successively marked with a relatively high positive biasing potential and simultaneously therewith the respective conductors C1260 to C1269, inclusive, will successively be marked with a relatively low positive biasing potential. Furthermore, the detector tubes VU0 to VU9, inclusive, in the units register 1130 will be rendered conductive successively during the counting by the digit counter U1220. However, when the number of the count received by the units digit counter U1220 corresponds to a digit registered on a corresponding one of the register relays U0 to U9, inclusive, in the units register 1130, the associated detector tube will be controlled so that it is in a non-conductive condition.

If it is now assumed that the operated register relays in both the hundreds and the tens registers 1120 and 1130 also correspond to the number of the count received by both the hundreds digit counter H1120 and the tens digit counter T1130, the thirty detector tubes VH0 to VH9, inclusive, VT0 to VT9, inclusive, and VU0 to VU9, inclusive, will be in a non-conductive condition in order to indicate that the number of pulses counted by the hundreds, tens and units digit counters correspond respectively to the hundreds, tens and units digits of the called office code registered in the relays of the registers 1110, 1120 and 1130. With all these detector tubes in their non-conductive condition, the normal positive biasing potential applied by way of the resistor 1280A is extended by way of the coincidence marker common conductor C1280 to prepare the four WXYZ tubes for operation in the alternate route gate 1260 and in the principal route gate 1250.

When the above condition has been reached in response to the counting of the successive indexing spots by the digit counter 1370, the angular position of the rotating drum 1311 is such that the first group of magnetized spots corresponding to the translations individual to the three digits registered in the registers 1110, 1120 and 1130 are positioned under various pick-up heads over which the translated information is to be transmitted via either the principal route gate 1250 or the alternate route gate 1260 to the code registers 1101–0 to 1101–9, inclusive. It should be noted at this time, however, that the next nine impulses received by the digit counter 1370 from the indexing track 1313B will not alter the position of the counters in the hundreds, tens and units counters in the hundreds, tens and units counters H1120, T1130 and U1220. The alternate route gate 1260 and the principal route gate 1250 are now in condition to pass signals received thereby from either the alternate route pick-up heads 1315WXYZ, the class 1 pick-up heads 1317WXYZ, the class 2 pick-up heads 1319WXYZ, or the class 3 pick-up heads 1321WXYZ, to the code registers 1101–0 to 1101–9, inclusive.

*Pick-up pulse circuit in the translator 1300*

As previously noted, the translator 1300 is operating continuously and, therefore, the translator marker 1310 under control of the indexing track 1313B transmits pulses to the digit counters 1370, U1220, T1130 and H1120 whether the translator 1300 is seized by a director or is available for seizure. In addition to the foregoing, the translator marker 1310 by means of the various translation magnetized tracks 1314W to Z, 1316W to Z, 1318W to Z and 1320W to Z will control the associated pick-up heads, in a manner to be described hereinafter, in an attempt to transmit various translations to the code registers 1101–0 to 1101–9, inclusive. Since the translator 1300 is operating continuously, it is possible to associate a director therewith at any stage during a single revolution of the translator marker 1310. In other words, it is possible to associate a director with the translator 1300 without waiting for the beginning of a new counting cycle at each revolution of the marker 1310. In order to prevent the association of a translator and a director at a time when the marker 1310 has transmitted several of the translations of a particular code, a pick-up pulse circuit 1201 is provided.

The pick-up pulse circuit 1201 is arranged to normally block the alternate route gate 1260 and the principal route gate 1250 in order to prevent an incomplete translation from being transmitted to the code registers 1101.

Referring now to the pick-up pulse circuit 1201 (Fig. 12B) it will be observed that the grid of the tube 1201A is supplied with a positive biasing potential via the resistor R101, which biasing potential is positive with respect to the associated cathode of the tube 1201A. Accordingly, the tube 1201A is normally in a conducting condition and lowers the biasing potential on the conductor C1280 sufficiently to block the WXYZ tubes in both the alternate route gate 1260 and the principal route gate 1250. More specifically, the potential on the conductor C1280 is reduced to a point where it drives the grid of each of the tubes in the route gates 1250 and 1260 negative with respect to the associated cathodes. Accordingly, the various tubes in the gates 1250 and 1260 cannot pass signals. With this arrangement, the gates 1250 and 1260 will be in a blocked condition until the tube 1201A is rendered non-conductive.

In order to unblock the gates 1250 and 1260 the translator 1300 must first be seized by a director and a reset pulse must thereafter be transmitted over the pulse conductor C1339. In order to control the gate blocking arrangement, the pulse pick-up circuit 1201 is provided with a gate unblocking tube 1202A. The plate of the tube 1202A is connected by way of the contacts 1214 of the control relay R1210, to the grid of the tube 1201A; the screen grid of the tube 1202A is connected to the conductor C1299; the grid electrode of the tube 1202A is connected via a resistor to the contacts 1213; and the cathode electrode is connected to a normal negative bias. Furthermore, the tube 1202A is of the gas-filled type which will remain in a conductive state after it has been fired, until its plate circuit is interrupted.

In the above-mentioned circuits, the conductor C1299 is connected to the plate circuit of the control tube in stage "9" of the digit counter 1370. As previously noted, the control tube in stage "9" of the digit counter 1370 is rendered conductive in response to the counting of every 9th pulse received from the incoming pulse conductor C1338. When the tenth count is received over the pulse conductor C1338, the control tube in stage "9" of the counter is cut off and the associated trigger tube is rendered conductive. At this instant, a pulse is generated in the conductor C1299 which drives the grid of the tube 1202A positive with respect to the associated cathode. If it is assumed that the control relay R1210 is in its energized position, to indicate that a called office code has been registered in the translator 1300, the screen grid of the tube 1202A is also positive with respect to the associated cathode and the tube 1202A is thereby rendered conductive. As soon as the tube 1202A becomes conductive, the potential in the plate circuit, including the contacts 1214 and the grid of the tube 1201A, is lowered to a point where the grid of the tube 1201A becomes negative with respect to the associated cathode. Accordingly, the tube 1201A is driven to cut off and the potential on the conductor C1280 will be raised sufficiently to permit the tubes in the gates 1250 and 1260 to respond to signals. It may be well to mention at this time however, that although the pick-up pulse circuit 1201 may have removed the blocking condition from the gates 1250 and 1260, the coincidence detector 1100 may still maintain the blocking condition on the gates 1250 and 1260 until the called office code registered in the coincidence detector corresponds to the indexing pulses counted by the digit counters.

*Seizure of the translator*

As previously pointed out, the registration of the first three digits "361" in the code registers 1520, 1530 and 1540 in the call register 1500 portion of the director caused the operation of the translator start relay R650. This relay, upon operating, at its contacts 652, connects battery by way of the lower winding of the relay R640 to the conductor C685, extending to Fig. 16, and then by way of the contacts 1221, 1231 and 1336 to ground. The ground potential applied to the conductor C685 indicates to the director that the translator 1300 is in an idle condition and available for use.

The relay R640 operates over the above-traced circuit and, at its contacts 641, completes a locking circuit for itself which includes the contacts 642 and 651 and its upper winding. Also, at its contacts 641, the relay R640, applies ground potential to the conductor C684, extending to Fig. 16, and then by way of the winding of the translator busy relay R1220, to battery. The translator busy relay R1220 now operates and, at its contacts 1221, it disconnects the ground potential from the conductor C685, thereby to prevent the operation of any translator test relay, such as the relay R640, in any other director. At its contacts 1222, the relay R1220 applies the ground potential to the conductor C687, extending to Fig. 6 and then by way of the contacts 663 and 645 and the winding of the relay R660, to battery. The relay R660 operates over the above-traced circuit and, at its contacts 662, completes a locking circuit for itself and, at its contacts 663, it interrupts its initial operating circuit.

As a further result of the operation of relay R650, at its contacts 654, it completes a circuit including the contacts 664, for applying ground potential to the class 1 conductor C681 or the class 2 conductor C682 or the class 3 conductor C683. The class conductor which is marked with the ground potential depends upon the class of the particular calling subscriber line, as is registered by the operated or unoperated conditions of relays R670 and R710, as previously described. At its contacts 655, the relay R650 completes a circuit including the contacts 665, the conductor C679, extending to Fig. 17, and the winding of the translator connector relay R1710 to battery. The relay R1710, upon operating, at its various contacts, shown to the left of the relay, connects the coder 1800 and other control conductors, to the various code registers 1101-0 to 1101-9 in the translator 1300. Finally, at its contacts 656, the relay R650 completes a circuit including the contacts 667 and the conductor C686, extending to Fig. 15, for applying a marking ground potential to the wipers 1527, 1537 and 1547 of the code registers 1520, 1530 and 1540 in the call register 1500.

When the relay R660 operated, as noted above, at its contacts 666, it applied ground potential to the conductor C688, extending to Fig. 16, and then by way of the winding of the control relay R1230, to battery. The relay R1230 now operates and removes the ground potential from the conductor C687.

*Registering the called office code in the coincidence detector 1100*

At the time the conductor C686 (Fig. 15) is grounded the three code registers 1520, 1530 and 1540 are in their operated positions registering respectively the digits "361" of the called office code. Accordingly, the ground potential applied to the wiper 1527 is extended by way of the conductor 3 in the marking cable C1101, to the upper winding of the H3 register relay in the hundreds register 1110 of the coincidence detector 1100. This relay is not shown, but it should be understood that it is identical to the illustrated relays H1, H2 and H0. The H3 register relay in the hundreds register 1110 actuates its various contacts to prepare the associated detector tube VH3 (not shown) whereby the coincidence detector 1100 will control the translator.

In addition to the foregoing, the ground potential applied to the conductor C686 is extended to the wiper 1537 and, as previously noted, this wiper is in engagement with the contact terminating the conductor 6 in the marking cable C1102. The ground potential applied to the marking conductor 6 causes the operation of the T6 register relay (not shown) in the tens register 1120 of the coincidence detector 1100 thereby to register therein the second digit "6" of the called office code.

Finally, the ground potential applied to the conductor C686 extends by way of the wiper 1547 of the third code register 1540 and then by way of the conductor 1 in the marking cable C1103 for energizing the upper winding of the relay U1 in the units register 1130 of the coincidence detector 1100.

The relay U1, upon operating, at its upper break contact disconnects the conductor C1251 in the cable C1240 from the grid of the associated detector tube VU1. At its upper make contact, the relay U1 connects the conductor C1261 in the cable C1240 to the grid of the associated detector tube VU1 thereby to indicate that the units digit "1" of the called office code has been registered. Finally, at its inner make contact, a circuit is completed for operating the control relay R1210. The circuit for operating the control relay R1210 can only be completed when one of the ten register relays in the hundreds register 1110, one of the ten register relays in the tens register 1120, and one of the ten register relays in the units register 1130 are simultaneously in their operated positions. In addition to the foregoing, the circuit for operating the control relay R1210 includes contacts of the class common relay R1340 and a contact of the translator connector relay, such as the relay R1710, of the particular director associated with the translator.

As previously noted, the relay R1710 operated when the translator 1300 was associated with the director. At its left-hand contact, the relay R1710 applies ground potential to the conductor C1751, extending to Fig. 12A, and then to the contacts 1340A of the class common relay R1340. Since contact 1340A has not been closed at this time, further operation of the translator 1300 depends upon the operation of the class common relay R1340. The class common relay R1340 is multiply connected to the windings of the class 1 relay R1345, the class 2 relay R1350 and the class 3 relay R1355. The three class relays noted above are respectively connected to the class 1 conductor C681 extending to Fig. 6, the class 2 conductor C682 extending to Fig. 6, and the class 3 conductor C683 extending to Fig. 7. The three class conductors may be selectively marked with a ground potential in accordance with the class of a particular calling subscriber line in the manner previously described. In view of the foregoing, it will be understood that if a class 1 line is calling, the conductor C681 will be grounded and the class 1 relay R1345 will operate in series with the class common relay R1340; or if a class 2 line is calling, the conductor C682 will be grounded and the class 2 relay R1350 will operate in series with the class common relay R1340; or if a class 3 line is calling, the conductor C683 will be grounded and the class 3 relay R1355 will operate in series with the class common relay R1340.

For the purpose of this description, it will be assumed that the calling line is a class 1 line and that the class 1 relay R1345 and the class common relay R1340 are operated. Since the class common relay R1340 has operated and closed its contacts 1340A, the ground potential applied to the conductor C1751 is extended by way of the conductor C1399 to each of the inner make contacts on the ten register relays H1 to H0, inclusive. The H3 relay is in its operated position, as previously noted, and the make contact thereof is closed so that the ground potential is further extended by way of the conductor C1199A to the inner multiply connected make contacts of the ten relays T1 to T0, inclusive. The T6 relay is in its operated position and the ground potential is further extended to the conductor C1199B. This conductor is multiply connected to all of the inner make contacts on the register relays U1 to U0, inclusive, of the units register 1130. The units register U1, being in its operated position to register the digit "1," closes its inner make contact thereby further to extend the ground potential to the conductor C1199C. The ground potential applied to the conductor C1199C completes the circuit for operating the control relay R1210.

The operation of the control relay R1210 prepares the pick-up pulse circuit 1201 for subsequent operation by the next pick-up pulse transmitted thereto from the digit counter 1370. More specifically, at its contacts 1213 and 1214, the relay R1210 connects the grid of the gate unblocking tube 1202A to the positive biasing potential and it connects the plate of said tube to the circuit of the grid of the gate blocking tube 1201A. The gate blocking tube 1201A remains in its conductive condition until the pick-up pulse is applied to the conductor C1299 in order to prevent the route gates 1250 and 1260 from responding to incoming signals. As a further result of the operation of the relay R1210, at its contacts 1211, it completes a multiple locking circuit for the control relay R1230 and the ATB control relay R1260. These relays are now maintained in their operated positions under control of the control relay R1210.

It may be well to mention at this time that the ATB control relay R1260 was initially operated at the time ground potential was applied to the conductor C688. When the relay R1260 operated, it prepared, at its contacts, circuits for the nine all-trunks-busy relays ATB1 to ATB9, inclusive. Finally, at its contacts 1215, the relay R1210 applies a positive biasing potential to the conductor C1198. This conductor, as shown in Fig. 11B, is connected to the windings of the WXYZ11 register relays of the code register 1101-1. The other side of the winding of each of the above-mentioned register relays are respectively connected to the plate electrode of the four gas-filled tubes TW11 to TZ11, inclusive. The code register 1101 is provided with eight additional sets of WXYZ register relays and gas-filled tubes and each set is designated respectively 1101-2 to 1101-9. The above-noted eight sets of code registers designated 1101-2 to 1101-9 are connected and arranged in the same manner as the register 1101-1. The tenth register is designated 1101-0 and comprises the four gas-filled tubes designated TAW to TAZ, inclusive. The plate electrode of each of the above-mentioned tubes is connected to the conductor C1198.

The translator 1300 has now been controlled to register the three digits "361" of the called office code dialed by the calling subscriber in the coincidence detector 1100. The coincidence detector 1100 will now function in conjunction with the various digit counters H1120, T1130 and U1220 to determine whether the number of counted indexing pulses correspond to the three called office code digits registered in the coincidence detector 1100.

Since the pick-up pulse amplifier 1360 is transmitting each indexing pulse over the conductor C1338, the digit counter 1370 counts and registers each of the said pulses in the manner previously described. Accordingly, the ninth impulse of each ten pulse count is registered in stage "9" of the digit counter 1370 and when the tenth pulse of each series is received, the trigger tube in the ninth stage is rendered conductive and the associated control tube is rendered non-conductive, whereupon the tenth pulse is registered in the "0" stage in the manner previously described. During the time the ninth pulse is registered in the stage "9" of the counter 1370, the control tube is conductive and changes the potential on the conductor C1299 so that it is negative with respect to the cathodes of the gate unblocking tube 1202A. However, as soon as the tenth pulse is transmitted over the pulse conductor C1338 to the digit counter 1370, the trigger tube of stage "9" is rendered conductive and the associated control tube is non-conductive. In response to this change in stage "9" of the counter 1370, a relatively high bias potential is applied to the conductor C1299 thereby to drive the screen grid of the gate unblocking tube 1202A positive with respect to the associated cathode. Since relay R1210 is in its operated position and the proper biasing potentials have been applied to the grid and the plate electrodes of the tube 1202A and it now fires and changes the bias on the grid of the gate blocking tube 1201A. More specifically, the positive bias potential applied by way of the resistor R101 to the grid of the tube 1201A is normally sufficiently positive with respect to the associated cathode to retain the tube in a normally conductive condition. However, with the relay R1210 in its operated position and the tube 1202A in a conductive condition, the plate circuit of the last-mentioned tube effectively lowers the normal positive bias on the grid of the gate blocking tube 1201A so that it becomes sufficiently negative with respect to the associated cathode to drive the tube 1201A to a cut-off condition. The tube 1201A is now non-conductive and it no longer applies a blocking potential to the conductor C1280. However, the last-mentioned conductor may have a blocking potential thereon if the number of pulses which have been counted by the digit counters 1370, U1220, T1130 and H1120 do not correspond to the three code digits registered in the coincidence detector 1100.

The pick-up pulse applied to the conductor C1299 each time stage "9" of the digit counter 1370 receives the tenth impulse of a series transmitted over the pulse conductor C1338, a positive biasing potential is also applied to the grid of the digit counter carryover tube 1203. The grid of the last-mentioned tube is normally biased negatively to prevent the tube from becoming conductive and is driven positive with respect to the associated cathode in response to each pick-up pulse applied to the conductor C1299.

The units digit counter carryover tube 1203A is provided to repeat every tenth pulse received by the digit counter 1370 to the units digit counter U1220. The plate electrode of the tube 1203A is connected via conductor C1297 to the cathodes of the trigger tubes in the units digit counter U1220 and it controls the ten trigger tubes of the units digit counter U1220 in precisely the same manner that the pulses appearing on the conductor C1338 control trigger tubes in the digit counter 1370.

At this point it should be noted that the pulse conductor C1338 is connected by way of the conductor C1338A to the cathode of the units digit counter carryover tube 1203A. Accordingly, each pulse appearing on the conductor C1338 and the conductor C1338A drives the cathode of the tube 1203A more negative than it normally is when the pulses are not received. However, the variation in the negative potential applied to the cathode of the tube 1203A has no effect on the tube unless the associated grid is driven positive with respect to the cathode by a pick-up pulse applied to the conductor C1299. Accordingly, when the pick-up pulse appears on conductor C1299 and a pulse is simultaneously applied to the conductor C1338A, the units digit counter carryover tube 1203A momentarily becomes conductive thereby to change the potential applied to the conductor C1297 so that the cathodes of the trigger tubes in the units digit counter U1220 are driven more negative. Since the units digit counter U1220 comprises ten pairs of tubes which are connected and arranged in the same manner as the corresponding tubes in the digit counter 1370, it should be understood that the counter U1220 will count each pulse received over the conductor C1297 in the same manner as has been described above in connection with the operation of the digit counter 1370. Briefly stated, the units digit counter U1220 will count and register one pulse for every ten pulses counted by the digit counter 1370. Furthermore, each time the units digit counter U1220 received ten pulses over the conductor C1297, it is restored to its initial "0" stage in the manner previously described to start the count of the succeeding ten pulses. Furthermore, each time the units digit counter U1220 counts ten pulses, it transmits over the conductor C1299A a single pulse to the tens digit counter carryover tube 1203B. The carryover counter 1203B is precisely the same as the units digit counter carryover tube 1203A and operates in precisely the same manner to transmit a pulse over the conductor C1297A to the tens digit counter T1130. In view of the foregoing, it should be understood that the tens digit counter T1130 will be operated to register each tenth pulse transmitted by the units digit counter U1220 over the conductor C1299A.

The tens digit counter T1130 and the hundreds digit counter H1120 are wired and connected in the same manner as the units digit counter U1220. Also the tens digit counter carryover tube 1203B and the hundreds digit counter carryover tube 1203C are connected and arranged in the same manner as the units digit counter carryover tube 1203A. Accordingly, a pulse is transmitted over the conductor C1299A in response to every count of ten by the units digit counter U1220 and this pulse is repeated by the tens digit counter carryover tube 1203B to the conductor C1297A and is registered by the tens digit counter T1130 in substantially the same manner as the pulses transmitted over the conductor C1297 and C1338 are registered by the units digit counter U1220 and the digit counter 1370. Finally, each time the tens digit counter T1130 counts ten pulses, a pulse is transmitted over the conductor C1299B to the hundreds digit carryover tube 1203C. The tube 1203C repeats each pulse received thereby over the conductor C1297B to the hundreds digit counter H1120.

In the above-described manner, the hundreds digit counter H1120, the tens digit counter T1130, and the units digit counter U1220 are arranged to register, at any instant, the hundreds, tens and units digits indicating the number of pulses transmitted to the units digit counter U1220 from the digit counter 1370. Accordingly, 1000 different combinations of three-digit codes may be indicated by the hundreds, tens and units digit counters H1120, T1130 and U1220. With this arrangement in mind, it will be appreciated that the digit counter 1370 can count ten pulses after each three digit code number is registered in the hundreds, tens and units counters before any further change is made in the registration of the hundreds, tens and units digit counters. The ten counts registered by the digit counter 1370 successively mark the ten marking conductors C1150 to C1159, inclusive, in the order in which the ten pulses are received. These conductors, as previously noted, are successively marked with a substantially high positive biasing potential when the trigger tube to which the conductor is connected is in a non-conductive condition. The trigger tube is in a non-conductive condition when the pulse received corresponds to the number of the stage in the counter 1370. Thus, the conductor C1150 is marked with a relatively high bias potential when a "0" count is registered and the remaining nine conductors C1151 to C1159, inclusive, are at that instant marked with a rather low positive potential.

Assuming that a "0" count is registered in the digit counter 1370, the high positive bias potential applied to the conductor C1150 is extended by way of the cable C1340 to the screen grid electrodes of the four gas-filled tubes TAW to TAZ, inclusive, in the code register 1101-0. These tubes are now conditioned to be controlled respectively by signals transmitted over the four WXYZ leads C1296 from either the alternate route gate 1260 or the principal route gate 1250. As signals are transmitted over these conductors, the four gas-filled tubes in the code register 1101-0 will be operated individually or in pairs in any combination to register respectively any digit from "1" to "0" in accordance with the previously illustrated WXYZ code. The code register 1101-0 is always controlled in accordance with a digit ("1" to "9") indicating a direct route provided with alternative routing facilities or a digit ("0") indicating that the direct trunk route is not provided with alternative routing facilities.

When the next pulse is received by the digit counter 1370, the conductor C1151 has a relatively high positive bias potential applied thereto to indicate count "1" and the high positive bias is removed from the "0" count conductor C1150. The high positive bias potential applied to the conductor C1151 extends to the screen grid electrodes of the four WXYZ tubes in the code register 1101-1. Accordingly, the tubes in the code register 1101-1 are now conditioned to respond to WXYZ code signals transmitted thereto over the four WXYZ marking conductors C1296. The remaining eight code registers 1101-2 to 1101-9 are successively prepared for operation as the digit counter 1370 counts the corresponding pulses 2 to 9, inclusive.

*Transmission of translations by the pick-up heads*

It will now be assumed that the hundreds digit counter H1120 has been operated to count and register therein the hundreds digit "3"; that the tens digit counter T1130 has been operated to count and register the tens digit "6," and that the units digit counter U1220 has been operated to count and register the units digit "1." These digits, it will be recalled, correspond to the three digits "361" of the called office code registered in the code registers 1520, 1530 and 1540 of the call register 1500 portion of the director, and also registered in the coincidence detector 1100, by the operation of the H3 relay in the hundreds register 1110, by the operation of the T6 relay in the tens register 1120 and by the operation of the U1 relay in the units register 1130.

Referring now to the units register 1130 it will be recalled that the U1 relay, in its operated position, registers the units digit "1" and, at its upper make contact connects the conductor C1161 to the grid of the detector tube VU1. The register relays in the hundreds register 1110 and the tens register 1120 are also operated to register respectively the digits "3" and "6" and, consequently, the grid of the associated detector tubes are connected in the same manner as described above with reference to the units register relay U1. Considering the coincidence detector 1100 as a whole, it will be understood that when the hundreds digit counter H1120 has counted to the digit "3" and the tens digit counter T1130 has counted to the digit "6," the digits represented the tubes in the hundreds register 1110 and the tens register 1120 will be matched since these registers register respectively the digits "3" and "6." When the hundreds and tens digit counters H1120 and T1130 register the digits "3" and "6," as noted above, and the units digit counter U1220 registers the digit "0," then when the next operation of the units digit counter U1220, in response to a pulse transmitted over the conductor C1297, applies a potential to the conductor C1261 in the cable 1240. This conductor terminates in the upper make contact of the units register relay U1 and applies the potential to the grid of the VU1 detector tube. This potential is negative with respect to the associated cathode and renders the tube non-conductive. Also, at this instant the remaining conductors C1250 and C1252 to C1259, inclusive, are marked with a potential which prevents the conductivity of the associated detector tubes VU2 to VU0, inclusive, in the units register 1130. Accordingly, all ten of the detector tubes in the units register 1130 are in a non-conductive condition. The ten detector tubes VT1 to VT0 and VH1 to VH0 in the tens register 1120 and the hundreds register 110 are also in a non-conductive condition at this time inasmuch as the digits registered in the corresponding digit counters are the same as the digits registered on the register relays in the respective registers 1120 and 1110. When all of the detector tubes in the coincidence detector 1100 are cut off, as described above, the full positive biasing potential through the resistor 1280A is applied to the conductor C1280. This positive biasing potential is connected by way of resistors, such as the resistors 1280B, 1280C, 1280D and 1280E to the grids of the WXYZ tubes in the principal route gets 1250 and the alternate route gate 1260. The voltage drop across the previously noted resistors maintains the associated grid electrodes slightly negative with respect to the cathodes to prevent the respective tubes from being conductive at this time but conditions the tubes for operation.

Referring to the alternate route gate 1260, it will be seen that the screen grid electrodes of the WXYZ tubes are each connected by way of an associated resistor to the cathode of the gate control tube GT1291 in the gate control circuit 1290 and to a negative biasing potential by way of the resistor GR1293. This circuit normally maintains the screen grids of the WXYZ tubes in the alternate route gate 1260 negative with respect to their associated cathodes in order normally to block the conductivity of the respective tubes. On the other hand, the screen grid electrodes of the WXYZ tubes in the principal route gate 1250 are connected by way of associated resistors to the plate electrode of the tube GT1292 in the gate control circuit 1290 and to a positive biasing potential via a resistor GR1294. This biasing potential as applied to the screen grids of the WXYZ tubes in the principal route gate 1250 is sufficiently positive with respect to the associated cathodes to condition the tubes to respond to signals received from the principal route amplifier 1280.

In the foregoing description it was pointed out that the translator marker 1310 was rotating the drum 1311 and that the indexing spots on the magnetized track 1313B were successively counted as each spot passed under the index pick-up head 1313A. The portion of the drum 1311 shown in Fig. 13B is the same drum as is shown in Fig. 13A and has been separately shown on the two figures of the drawing for convenience. Fig. 20 illustrates the manner in which the drum 1311 is magnetized for ten translations of the three digit codes "247" and "361" based on class 1, 2 or 3 calling lines and alternate routing for code "247."

From the previous description it will be understood that when the various counters have been operated to count three thousand six hundred ten (3610) indexing spots, the hundreds, tens and units digit counters H1120, T1130 and U1220 will register respectively the digits "361" and the digit counter 1370 will register the digit "0." Since the angular position of the drum 1311 corresponding to "3610" indexing pulses has been reached, the translation magnetized spots corresponding to the first of ten translations for the called office code "361" are positioned under the sixteen pick-up heads shown in Fig. 13B.

As previously noted, the class 1 relay R1345 is in its operated position and, at its four upper make contacts, it completes four separate circuits for the class 1 pick-up heads 1317W to 1317Z, inclusive. The magnetized spots on the associated tracks 1316W to 1316Z which are placed, at this instant, directly under class 1 pick-up heads, are in accordance with the previously described WXYZ code. In the first or "0" position corresponding to the called office code "361," the magnetized spots appearing on the tracks 1316W to 1316Z determine whether or not the first translation to be made is to be in accordance with an alternate trunk route or a direct trunk route to the desired called office "361."

If it is assumed that a called to the called office "361" (EMpire 1) does not have alternate routing facilities, a positive magnetizing spot on the track 1316Z generates a pulse in the pick-up head 1317Z. The negative magnetizing spots appearing on the tracks 1316W, X and Y under the pick-up heads 1317W, X and Y generate negative pulses. The four pulses simultaneously control four separate amplifiers in the principal route amplifier 1280 in accordance with the previously noted WXYZ code. The negative pulses generated by the pick-up heads 1317W, X and Y are not amplified by the associated principal route amplifiers 1280 but the positive pulse generated in the pick-up head 1317Z is amplified by the amplifier 1280 in a well-known manner. In view of the above, it should be understood that the grids of the W, X and Y tubes in the principal route gate 1250 are still retained at a negative potential with respect to the associated cathodes and that the positive pulse amplified by the principal route amplifier 1280 drives the grid of the tube Z in the principal route gate 1250 positive with respect to its associated cathode. The tube Z is thus rendered conductive. The plate electrode of this tube is connected by way of the Z conductor in the cable C1296 and a series condenser resistor network to the grid of each of the corresponding Z tubes in the code registers 1101-0 to 1101-9, inclusive, thereby to render the grids positive with respect to the associated cathodes. Each of the above-mentioned gas-filled tubes would normally fire at this time except that all but one of the respective screen grids of these tubes are provided with biasing potentials for preventing operation at this time. The TAZ tube in the code register 1101-0, however, will fire inasmuch as the screen grid electrode thereof has a positive biasing potential applied thereto via the conductor C1150 extending to the digit counter 1370. In the digit counter 1370 the "0" digit count is registered therein and, therefore, the conductor C1150 has a relatively high positive potential applied thereto. The remaining four gas-filled tubes TAW, TAX and TAY do not fire at this time due to the fact that the W, X and Y conductors in the cable C1296 have no corresponding signals applied thereto. The fired or conductive condition of the gas-filled tube TAZ registers the digit "0" which, in this particular case, indicates that no alternative trunk facilities are provided for a call to be extended to a called office having the code "361."

*Alternate route facilities*

In the present system it has been assumed that there are nine separate groups of trunks that are provided with alternative routing facilities and that these trunk groups are respectively indicated as trunk groups 1 to 9, inclusive. If it is assumed that the trunk group over which a call is normally extended to the called exchange "361" is the trunk group "1," the class 1 pick-up heads 1317W to 1317Z will be controlled to transmit control signals over the principal route amplifier 1280 to control the principal route gate 1250 in accordance with the digit "1." More specifically, the pick-up heads 1317W and X will each transmit a positive pulse over the W and X conductors to the amplifiers 1280 in order to render the W and X tubes in the principal route gate 1250 conductive. These tubes, in turn, will transmit a signal over the W and X conductors in the cable C1296 thereby to fire the gas-filled tubes TAW and TAX in the code register 1101-0. These tubes were fired in accordance with the digit "1" indicative of the trunk group 1 over which a call will be extended provided a trunk is available. If there is an available trunk in the direct trunk group 1, the subsequent operations will take place in a normal manner under control of the class 1 pick-up heads, the principal route amplifiers 1280 and the principal route gate 1250. If, however, the direct trunks over which the call would normally be routed are all busy at the time the digit "1" is registered in the register 1101-0, a chain circuit including the outgoing repeaters of the direct route "1" will complete a circuit for operating the all-trunks-busy relay ATB1. Upon operating, the relay ATB1, at its upper make contact, completes a locking circuit for itself by way of the contacts 1261 and the winding of the ATB1 relay. At its lower pair of make contacts, the relay ATB1 connects the control conductors C1195 to the screen grid and the grid of the tube GT1291 and the tube GT1292 in the gate control circuit 1290. Inasmuch as the TAW and TAX gas-filled tubes in the register 1101-0 are conducting, a positive biasing potential is applied to the conductors C1195 thereby to render the screen grid and the grid electrodes of the tubes GT1291 and GR1292 positive with respect to the associated cathodes. This causes the above-mentioned tubes to become conductive. The tube GT1291 thereupon applies the positive potential on its plate electrode to the screen grids of the WXYZ tubes in the alternate route gate 1260 in order to condition these tubes to be controlled by signals repeated thereto via the alternate route amplifier 1270. Simultaneously therewith, the tube GT1292, upon becoming conductive, applies a cut off biasing potential to the screen grids of the WXYZ tubes in the principal route gate 1250. The tubes WXYZ in the principal route gate 1250 are thereby prevented from responding to further signals repeated thereto via the principal route amplifier 1280.

From the foregoing, it should be understood that any translations on the alternate route tracks 1314W to 1314Z, inclusive, will be picked up by the alternate route pick-up heads 1315W to 1315Z and repeated by the alternate route amplifier 1270 thereby to control the alternate route gate 1260. The translations appearing on the alternate route tracks will be in accordance with routing digits necessary to control the director to route the call to the desired called exchange over an available alternate routing path.

*Registering the translations of the called office code digits "361" in the code registers 1101-0 to 1101-9, inclusive*

As previously pointed out the calls to be extended to the called office "361" are always completed over direct trunk routes provided no alternate trunk routes are available. Accordingly, the code register 1101-0 was controlled, as previously described, to register the first translation digit "0" which indicates to the translator 1300 that the principal route gate 1250 will be further controlled in accordance with the magnetized spots appearing on the tracks 1316W to 1316Z. The magnetizing spots that caused the registration of the digit "0" in the register 1101-0 appeared on the magnetized tracks 1316W to 1316Z at the angular position in the rotation of the drum 1311 that corresponded to the indexing pulse "3610" received over the incoming pulse conductor C1338. The next indexing pulse received is indexing pulse number "3611" which controls the digit counter 1370 in the manner previously described so that the trigger tube in stage "1" thereof is in a non-conductive condition and the associated control tube is in a conductive condition. Also this pulse controlled the "0" trigger tube in the "0" stage to be conductive and the control tube in the "0" stage to be non-conductive. The action of the "0" trigger tube, upon becoming conductive, reduces the relatively high positive marking potential on the conductor C1150 sufficiently to prevent the gas-filled tubes in the code register 1101-0 from subsequently firing. However, due to the fact that these tubes are of the gas-filled type, the tube that was previously fired remains in its conductive condition until the circuit including the plate electrode thereof is subsequently interrupted. When the trigger tube in stage "1" is rendered non-conductive a relatively high biasing potential is applied to the conductor C1151 thereby to raise the potential on the grids of the four gas-filled tubes TW11 to TZ11 in the code register 1101-1 sufficiently to prepare the tubes to be fired in response to signals appearing on the WXYZ conductors in the cable C1296.

Since the rotating drum 1311 of the translator marker 1310 has moved sufficiently to transmit the indexing pulse "3611" over the pulse conductor C1338, the magnetizing spots appearing on the tracks 1316W to 1316Z now are positioned under the class 1 pick-up heads 1317W to 1317Z. In this position the tracks 1316W to 1316Z are marked with magnetizing spots in accordance with the previously mentioned WXYZ code and the digit marked thereon is in accordance with the first routing digit necessary to extend the call being described over a proper direct trunk route toward the called exchange. In the present example, the routing digit marked in code in position "3611" is the digit "8" and therefore the track 1316X is provided with a positive magnetized spot which will control the class 1 pick-up head 1317X to transmit a pulse. The remaining pick-up heads W, Y and Z also transmit pulses but they are of a negative polarity which will be blocked by the principal route amplifier 1280. The positive pulse transmitted by the class 1 pick-up head 1317X is transmitted over the associated X conductor to the principal route amplifier 1280 and the amplifier, in turn, drives the grid of the X tube in the principal route gate 1250 positive with respect to the associated cathode. The tube is now rendered conductive and applies a signal to the X conductor in the cable C1296 which drives the grid of the tube TX11 in the code register 1101-1 positive with respect to the associated cathodes. At this instant, a relatively high positive bias potential is applied to the conductor C1151, at stage "1" of the digit counter 1370 and it drives the screen grid electrode of the four gas-filled tubes TW11 to TZ11 positive with respect to the associated cathodes. Since the tube TX11 in the register 1101-1 is the only tube of the four tubes mentioned that has the screen grid and grid electrodes thereof at a positive potential with respect to the associated cathode, it fires and thereby controls over its plate electrode a circuit for operating the associated register relay X11. The circuit for operating the register relay X11 in the register 1101-1 includes the space current path between the cathode and plate electrodes of the tube TX11, the winding of the relay X11, the conductor C1198, the contacts 1215, and the positive bias potential connected thereto. At its upper make contacts the register relay X11 applies ground potential by way of the X11 conductor in the cable WXYZ11 extending to Fig. 17 and then by way of the closed contacts of the multi-contact relay R1710 and the winding of the X11 relay R1802, to battery. The relay R1802 is included in the group of four relays R1801 to R1804, inclusive, which are provided in the coder 1800 portion of the director to register the first route digit which is to be transmitted under control of the director. These four relays may be operated individually or in pairs to register any digit from 1 to 0, inclusive, in accordance with the previously described WXYZ code. The relay R1802, upon operating, registers the route digit "8" and, at its inner left-hand make contact locks itself in its operated position to the grounded conductor C787.

As the drum 1311 of the translator marker 1310 continues to rotate, it transmits the index pulse "3612" over the pulse conductor C1338 to the digit counter 1370 in the manner previously described. Accordingly, the digit counter 1370 removes the marking potential from the conductor C1151 thereby to prevent subsequent operation of any of the unoperated gas-filled tubes in the register 1101-1, it being understood, however, that the fired gas-filled tube TX11 remains conductive until the circuit including its plate electrode is interrupted. Also, the digit counter 1370 having counted the pulse "3612" has caused stage "2" of the counter to become effective to register this pulse. Accordingly, marking potential is applied to the conductor C1152 in order to prepare the gas-filled tubes in the code register 1101-2 to respond to signals transmitted thereto from the principal route gate 1250. The angular position of the drum 1311 is such that the second route digit marked in code form by magnetized spots on the tracks 1316W to 1316Z are positioned under the class 1 pick-up heads 1317W to 1317Z. This route digit, if one is necessary in this position, is transmitted in the manner previously described in code form via the principal route amplifier 1280, the principal route gate 1250, the WXYZ conductors in the cable C1296 to control one or more of the four gas-filled tubes TW12 to TZ12 in the code register 1101-2. If one or more of the gas-filled tubes in the register 1101-2 is fired, the associated W12 to Z12 register relays are operated, in the same manner as has been described above in connection with the operation of the code register 1101-1. The operated register relays, in turn, mark the associated W12 to X12 conductors in the cable WXYZ12 in order to transfer a routing digit to the second route digit register comprising respectively the relays R1805 to R1808, inclusive, in the coder 1800 portion of the director.

The coder 1800 portion of the director is provided with six registers for registering a maximum of six routing digits. The manner in which the first two routing digits may be registered in the coder 1800 portion of the director has been described above. If four additional routing digits are required they will be registered in the third, fourth, fifth and sixth route digit registers in the coder 1800 portion of the director in the manner previously described. It should be noted, however, that these routing digits are placed in code form as magnetizing spots on the tracks 1316W to 1316Z in positions on the arc of the drum 1311 corresponding respectively to the indexing pulses "3613" to "3616," inclusive. As these indexing pulses are counted, the digit counter 1370 successively renders the code registers 1101-3 to 1101-6 over the conductors C1153 to C1156 effective in synchronism with the signals transmitted thereto via the principal route gate 1250 as determined by the magnetized spots controlling the pick-up heads 1317W to 1317Z, inclusive.

When the indexing pulse "3617" is received by the digit counter 1370, the angular position of the drum 1311 is such that the magnetizing spots under the pick-up heads 1317W to 1317Z may now control the principal route gate 1250 and the gas-filled tubes in the code register 1101-7. The information transmitted in this position of the drum 1311 is determined by the units digit of rate of charge applicable to a telephone connection to be extended to the called office "361." Accordingly, the rate in this particular case can comprise any one of the digits 1 to 0, inclusive, and the magnetizing spots appearing on the tracks 1316W to 1316Z will be such that the digit representing the units digit of the rate of charge for the call will be transmitted in code form to control the gas-filled tubes TW17 to TX17 in the code register 1101-7. One or more of the tubes will be fired in accordance with the rate digit and the associated register relays will operate to mark the WXYZ17 conductors in the same manner as has been previously described. These conductors terminate respectively in the windings of the WXYZ relays R1825, R1826, R1827 and R1828 in the coder 1800 portion of the director and these relays are operated in accordance with the WXYZ code to register the units digit of the rate applicable to the call.

As the drum 1311 of the translator marker 1310 rotates, the indexing pulse "3618" is transmitted over the conductor C1338 to the digit counter 1370. The digit counter 1370, upon counting this pulse, appropriately marks the conductor C1158 in the cable C1340 extending to the code register 1101-8 (Fig. 11B). Simultaneously therewith, the digit counter 1370 removes the marking potential from the conductor C1157 in the cable C1340. As a result of the foregoing removal of marking potential from the conductor C1157, the gas-filled tubes in the register 1101-7 which were fired to register the signal or signals received from the principal route gate 1250 remain in their conductive conditions. Also the marking potential applied to the conductor C1158 prepares the four gas-filled tubes in the register 1101-8 to respond to signals transmitted thereto over the WXYZ conductors C1296 from the principal route gate 1250.

The four WXYZ gas-filled tubes in the register 1101-8 and the associated WXYZ marking relays are connected and arranged in the same manner as the gas-filled tubes and marking relays in the register 1101-1. The marking conductors controlled by the WXYZ marking relays in the register 1101-8 are respectively designated TA, TB, TC and TD. These marking conductors terminate in correspondingly marked contacts of the translator connector relay R1710 and are connected respectively to the TA, TB, TC and TD control relays R1890, R1885, R1880 and R1875 in the coder 1800 portion of the director.

The magnetic markings appearing on the tracks 1316W to 1316Z in position "3618" in the arc of the drum 1311 are now in a position to control the associated class 1 pick-up heads 1317W to 1317Z and to transmit code markings by way of the principal route amplifier 1280 to the WXYZ tubes of the principal route gate 1250. These tubes are controlled in the manner previously described to repeat these signals over the WXYZ conductors in the cable C1296 to the WXYZ gas-filled tubes in the code register 1101-8. The last-mentioned gas-filled tubes respond to the signals, in accordance with the previously described WXYZ code markings, and cause the operation of the associated WXYZ marking relays in the register 1101-8. The operated marking relays, in turn, respectively mark the TA, TB, TC and TD conductors in accordance with the previously noted WXYZ code in order to cause the operation of any one or more of the control relays R1890, R1885, R1880 and R1875. These control relays are provided to determine the subsequent operation of the director in sending out the routing digits and other items of information stored therein, in order to complete the connection to the desired called subscriber and in order to store certain items of information for recording purposes.

In order to clearly understand the functions of the TA, TB, TC and TD control relays R1890, R1885, R1880 and R1875, it should be understood that the TA relay R1890, when individually operated, in accordance with the digit "7" of the WXYZ code, controls the sender portion of the director to send out the routing digits stored in the first to the sixth route digit registers in the coder 1800. The route digit registers may store a minimum of one routing digit and a maximum of six routing digits. Also, the TA relay R1890, when operated individually, controls the sender portion of the director to then send out the seven digits of the called subscriber directory number as they are registered respectively in the seven registers of the call register 1500.

If the TB relay R1885 is operated, in accordance with the digit "8" of the WXYZ code, it controls the director to first send out the routing digit or digits registered in the coder 1800 by the translator 1300 and then to skip the first and second digits registered in the call register 1500 portion of the director and, finally, to send the last five digits registered in the call register 1500 portion of the director in order to extend the connection to the called subscriber line.

When the TC relay R1880 is operated, in accordance with the digit "9" of the WXYZ code, it controls the director to indicate that the called subscriber directory number is a six-digit number instead of the normal seven-digit number. This relay however, is normally operated in conjunction with the TA relay R1890 or the TB relay R1885. Accordingly, if the TA relay R1890 and the TC relay R1880 are operated in accordance with the digit "2" of the WXYZ code by the translator 1300, they control the sender portion of the director to first send the routing digits registered in the coder 1800, then to send all six digits of a six-digit called subscriber directory number, as registered in the first six registers of the call register 1500 and finally to skip the last or seventh register in the call register 1500. If, on the other hand, the TB relay R1885 and the TC relay R1880 are operated in accordance with the digit "4" of the WXYZ code, they control the director to first send out the routing digits, then to skip the digits registered in the first and second registers of the call register 1500, then to send the four digits registered in the third, fourth, fifth and sixth registers of the call register 1500, and finally, to skip the seventh register in the call register 1500. Finally, the TD relay R1875 is provided to control the sender to skip the digits registered in the fourth, fifth, sixth and seventh registers of the call register 1500. When this relay is operated, in accordance with the digit "0" of the WXYZ code, it controls the sender to first transmit the routing digits registered in the coder 1800 and to cause the sender portion of the director to skip all seven registers in the call register 1500. Accordingly, it will be seen that the TD control relay R1875 would cause the director to route a call in accordance with only the routing digits which were translated by the translator 1300 in accordance with a called office code. Under normal conditions, this relay would not be operated on any call unless the call being extended is to be routed to (1) an intercepting operator position or (2) to a manual toll operator position. The call will be routed to an intercepting operator position if the subscriber attempts to extend an unauthorized call. Also, the call will be routed to a toll operator position if a paystation subscriber, for example, attempts to extend a toll call. The manner in which the four control relays R1875, R1880, R1885 and R1890 control the director to perform the operations outlined above is shown and described in detail in the previously mentioned copending Ostline application.

When the next indexing spot appears under the index pick-up head 1313A, the pulse "3619" is transmitted to the digit counter 1370 over the pulse conductor C1338. This pulse causes the digit counter 1370 to remove the marking potential from the conductor C1158 and to apply a marking potential to the conductor C1159 in the cable C1340. The removal of the marking potential from the conductor C1158 has no effect upon the WXYZ gas-filled tubes in the register 1101-8 but the application of the marking potential to the conductor C1159 prepares the four WXYZ gas-filled tubes in the code register 1101-9 for operation. This code register is wired and connected in the same manner as the code register 1101-1 and is provided with the four marking relays and four marking conductors extending to the contacts of the translator connector relay R1710. In the present arrangement, only two of the four marking conductors are utilized. The W marking conductor in the register 1101-9 corresponds to the AB Toll conductor terminating in the second contact shown to the left of the translator connector relay R1710. The X and Z conductors are not used but the Y conductor terminates in the first contact shown to the left of the translator connector relay R1710 and has been designated Y18. The AB Toll conductor is provided in the director to initiate the operation of the call recorder 2000 (Fig. 5) whereby the associated detector 1900 is controlled to find the numerical portion of the calling subscriber directory number. Finally, the Y18 conductor is provided to mark the tens digit of the rate of charge for a call in the event a tens digit is required. The manner in which these conductors control the call recorder 2000 (Fig. 5) and the associated detector 1900 is shown and described in detail in the previously mentioned copending Ostline application.

When the indexing pulse "3619" is transmitted to the digit counter 1370, as noted above, the angular position of the drum 1311 of the translator marker 1310 is such that the magnetized spots on the tracks 1316W to 1316Z which control the markings to be applied to the above-described AB Toll conductor and the tens digit rate conductor Y18 are under the class 1 pick-up heads 1317W to 1317Z. Accordingly, signals are transmitted via the principal route amplifier 1280, the principal route gate 1250 and the WXYZ conductors in the cable C1296 to control the WXYZ gas-filled tubes in the code register 1101-9. If the W gas-filled tube is fired in accordance with the digit "7" of the WXYZ code, the associated W marking relay will operate and apply a ground potential to the AB Toll conductor terminating in the contacts of the connector relay R1710. This ground potential is then extended by way of the conductor C2242 to the call recorder 2000 (Fig. 5) thereby to initiate operation of the call recorder 2000 to cause the detection to be made of the calling subscriber directory number. If this conductor is not grounded in the manner described above, it will indicate that the call recorder 2000 and the detector 1900 are not required in conjunction with the call being set up and that no toll ticket will be made for the call.

If the Y gas-filled tube in the code register 1101-9 is fired in response to the transmission thereto of a signal corresponding to the digit "9" of the WXYZ code, the associated Y marking relay will be operated in the manner previously described and apply a marking ground potential to the Y18 marking conductor terminating in the contact of the translator connect relay R1710. This ground potential is extended by way of the conductor C2245 to the call recorder 2000 (Fig. 5) in order to operate therein a tens digit rate relay (not shown). In its operated position, the tens digit rate relay will cause a record to be made during the subsequent operation of the director and associated apparatus of the tens digit "1" of the rate of charge applicable to the connection. If the Y18 conductor is not grounded, the tens digit rate relay in the call recorder 2000 (Fig. 5) will not operate and the director will subsequently operate to cause a record to be made of the tens digit "0" of the rate of charge. Since the units digit of the rate of charge applicable to the connection will be registered by the translator in the units digit rate relays R1825 to R1828, inclusive, it will be understood that at least twenty different rate of charge indications may be made by the toll ticketing apparatus arranged and connected in the manner described in the copending Ostline application previously noted. These twenty different rates may, for example, be "00" to "09," inclusive, and "10" to "19," inclusive. It should be mentioned at this time that if both the AB Toll conductor and the Y18 conductor are to be grounded simultaneously, the W and Y relays in the code register 1101-9 must be operated in accordance with the digit "2" of the WXYZ code.

Since the X and Z gas-filled tubes and the associated X and Z marking relays in the code register 1101-9 perform no function in the circuit as shown and described, the corresponding marking conductors X18 and Z18, for example, may be utilized to control the director and call recorder 2000 (Fig. 5) to increase the number of rate of charge designations from twenty to forty or, on the other hand, to perform other controls in the director in substantially the same manner as has been described above.

When the foregoing operations have been completed by the translator 1300 in transferring the translated information on the various magnetized tracks 1316W to 1316Z, inclusive, as the ten indexing spots "3610" to "3619" are counted, the ten possible translations for the called office code "361" will have been transferred and registered in the director in the manner described above. Accordingly, the next indexing pulse "3620" controls the digit counter 1370 to remove the marking potential from the conductor C1159 and to cause the "0" stage of the counter to become effective and apply a marking potential to the conductor C1150. In addition to the above, the indexing pulse noted controls the unit digit counter carryover tube 1203A to transmit the next units pulse over the conductor C1297 to the units digit counter U1220. This counter now changes its position to register the units digit "2" in the manner previously described and to remove the registration therein which indicated the units digit "1" corresponding to the units digit of the called office code "361." At this instant, the trigger tube in stage "1" of the units digit counter U1220 becomes conductive and the associated control tube becomes non-conductive. The former lowers the positive bias potential applied to the conductor C1251 in the cable C1240 but this is without effect at this time inasmuch as the register relay U1 in the called office code units register 1130 is in its operated position. The associated control tube in stage "1" of the units digit counter U1220, upon becoming non-conductive increases the positive bias potential upon the conductor C1261 in the cable C1240. The increased positive potential on the conductor C1261 is extended by way of the make contact of the units register relay U1 to the tube VU1 which now becomes conductive.

As a further result of the non-conductivity of the control tube in stage "1" of the unit digit counter U1220, the grid of the control tube in stage "2" of the counter is driven positive thereby to render the control tube in stage "2" conductive. The control tube in stage "2" upon becoming conductive drives the grid of the trigger tube in stage "2" of the counter U1220 to cut off thereby terminating the conductive condition of the trigger tube in stage "2." The marking conductors C1252 and C1262 (not shown) are connected respectively to the plate electrodes of the trigger tube and the control tube in stage "2" of the units digit counter U1220 and they are marked respectively with a high and low positive bias potential. The low positive bias potential on the conductor C1262 terminates in the make contact of the U2 register relay in the units register 1130 and it is without effect at this time since this relay is in its non-operated position. However, the high positive bias potential applied to the conductor C1252 is extended by way of the upper break contact of relay U2 to the grid of the associated tube VU2 which becomes conductive. At this time two of the detector tubes, for example, the detector tubes VU1 and VU2, in the coincidence detector 1100 are in a conductive condition and, consequently, the positive bias potential applied to the common marking conductor C1280 is lowered sufficiently to drive the grids of the WXYZ tubes in the alternate and principal route gates 1260 and 1250 to cut off. Therefore, the tubes in the gate circuits are prevented from responding to further signals transmitted thereto by any of the pick-up heads 1315, 1317, 1319 and 1321 W to Z, inclusive.

The alternate and principal route gates 1260 and 1250 are cut off at this time because the indexing pulse "3620" counted by the digit counters corresponds to the office code "362" and, therefore, does not coincide with the called office code digits "361" registered in the coincidence detector 1100.

From the foregoing it should be understood that the alternate route gate 1260 or the principal route gate 1250 are conditioned to respond to signals transmitted thereto when the digit counters have counted a number of indexing pulses that correspond to the three digits of a called office code registered in the coincidence detector 1100. Also, it should be understood that the alternate route gate or the principal route gate remain effective to pass signals for ten successive indexing pulses after the number of pulses counted and the digits of the called office code coincide. After the ten pulses have been received by the digit counter, coincidence between the digit counters and the digits registered in the coincidence detector 1100 no longer exists. As soon as the lack of coincidence exists between the digit counters and the digits registered in the detector 1100, the alternate route gate 1260 and the principal route gate 1250 are placed in a blocking condition to prevent the pick-up heads from transmitting signals to any of the code registers 1101-0 to 1101-9, inclusive.

The translator 1300 has now translated the called office code "361" and has transferred the translations to the coder 1800 portion of the director and may now be disconnected from the calling director and rendered available to other calling directors. It should be noted, however, that the counting of the indexing pulses by the digit counters 1370, U1220, T1130 and H1120 continues as the successive indexing pulses on the drum 1311 pass under the index pick-up head 1313A.

*Disconnecting the translator 1300 from the coder 1800 portion of the calling director*

The above-described operation of the translator 1300 whereby it translates the called office code "361" and transfers the translations to the coder 1800 portion of the calling director occurs at an extremely high rate of speed inasmuch as the drum 1311 of the translator marker 1310 is rotating approximately one hundred twenty revolutions per minute. Accordingly, when the first routing digit is registered in the first route digit register of the coder 1800, circuits are completed for causing the translator to be disconnected from the director, and due to the speed of operation of the translator 1300, it is virtually impossible to disconnect it from the director until at least ten succeeding indexing pulses have been counted thereby thus completing the full portion of a cycle of operation for transferring the translated items of information to the coder 1800.

Referring now to the coder 1800 (Fig. 18) it will be noted that as soon as the first route digit is transferred from the code register 1101-1 to the first route digit register relays R1801 to R1804, inclusive, one or more of the above-named register relays will be operated. The operated relays will close the left-hand inner make contacts in order to complete locking circuits, including the grounded conductor C787, for retaining the relays in their operated positions. Also the operated relay or relays R1801 to R1804, inclusive, at the outer left hand make contacts applies ground potential to the conductor C884 extending to Fig. 8 in order to operate the translation complete relay R810. The operation of the relay R810 indicates to the director that the translator 1300 has performed its translation function and may be disconnected from the coder portion of the director and rendered available for use by other calling directors.

From the above description it will be understood that the signal for indicating that the translator 1300 may be disconnected from the calling director is transmitted in response to the registration of the first code digit in the coder 1800. As previously noted, the speed at which the translator 1300 operates is such that it will complete all its translating functions before the translation complete relay R810 can cause the disassociation of the translator 1800 from the calling director. However, if it is deemed necessary to provide an interlocking arrangement which would prevent the operation of the translation complete relay R810 until the last translated item of information is transferred to the calling director, the circuit for controlling the relay R810 may be extended via a pair of make contacts on a relay which is controllable by the translator 1300. For example, the Z18 gas-filled tube and associated register relay in the code register 1101-9 may be operated by a signal sent over the Z conductor in the cable C1296 in the manner previously described. When the Z18 relay is operated in the register 1101-9 it could cause the operation, in the coder 1800 portion of the director, of a corresponding Z18 relay and the latter relay would close a pair of make contacts in order to complete the circuit including the conductor C884 for operating the translation complete relay R810. In other words, the circuit for the relay R810 would be prepared in response to the registration of the first route digit in the coder 1800 and it will be completed in response to the operation of the proposed Z18 relay in the coder 1800. In this manner, the translation complete signal would not be given until the last translated item of information is registered in the coder 1800 by the translator 1300.

When the translation complete relay R810 operates, it controls its various contacts 811, 813 and 814 in order to perform various circuit controlling functions in the controller 600 portion of the director, as is described in detail in the previously mentioned copending Ostline application. At the contacts 811, the relay R810 in the present circuit arrangement interrupts the circuit of the translation start relay R650 which now restores to normal. When the translator start relay R650 restores to normal, it interrupts, at its contacts 651 and 652, the circuits for the upper and lower windings respectively for the translator test relay R640 which also restores to normal. As a further result of the restoration of relay R650, at its contacts 654, it removes the marking ground potential from either the class 1 conductor C681, the class 2 conductor C682 or the class 3 conductor C683 depending upon the class of the particular calling line.

In the call being described, the ground potential is removed from the class 1 conductor C681 extending to Fig. 13B thereby causing the restoration of the class 1 relay R1345 and the class common relay R1340 in the translator 1300. The last-mentionel relays, upon restoring, disconnect respectively, the alternate route pick-up heads 1314W to 1314Z from the alternate route amplifier 1270 and the class 1 pick-up heads 1317W to 1317Z from the principal route amplifier 1280. At its contacts 655, the relay R650 disconnects the ground potential from the conductor C679, extending to Fig. 17 thereby to interrupt the circuit of the translator connect relay R1710. The translator disconnect relay R1710, upon restoring, disconnects the coder 1800 portion of the calling director from the various control leads terminating in the code registers 1101-1 to 1101-9 in the translator 1300. Also, relay R1710, upon restoring, removes ground potential from the conductor C1751 extending to Fig. 12A thereby to interrupt the circuit, including the multiply connected contacts of the operated register relays in the hundreds, tens and units registers 1110, 1120 and 1130 and the translator control relay R1210. The relay R1210 now restores to normal. Finally, at its contacts 656, the relay R650 removes ground potential from the conductor C686 extending to Fig. 15 in order to remove the controlling ground potential from the wipers 1527, 1537 and 1547 of the first, second and third registers 1520, 1530 and 1540 in the call register 1500. The removal of ground potential from the above named wipers interrupts the circuits for the operated register relays in the hundreds, tens and units registers 1110, 1120 and 1130 in the coincidence detector 1100.

In the present call, it was assumed that the H3 relay in the hundreds register 1110 was operated in accordance with the first called office code digit "3," the T6 register relays in the tens register 1120 was operated in accordance with the second called office code digit "6," and the U1 relay in the units register 1130 was operated in accordance with the third called office code digit "1." These register relays now restore to normal and place the grid electrodes of all of the thirty detector tubes in the circuit including the break contacts of their respective register relays.

When the translator test relay R640 in the controller 600 portion of the director restores to normal, at its contacts 641, it removes ground potential from the conductor C684 extending to Fig. 16 thereby to restore the translator busy relay R1220 to normal. When the translator busy relay R1220 restores to normal, at its contacts 1221, it prepares a point in the chain circuit including the conductor C685 for subsequently controlling another calling director. However, if another director in the group of directors is in a calling condition, the relays therein corresponding to the relays R650 and R640 will be in their operated positions and a ground potential will be maintained on the conductor C684 of the translator 1300 thereby to retain the translator busy relay R1220 in its operated position. In other words, as long as any director in the group of directors requires the use of the translator 1300, the translator busy relay R1220 is retained in its operated position. As a further result of the restoration of the relay R640, at its contacts 645, it interrupts the locking circuit for the relay R660 which also restores to normal. The relay R660, at its contacts 661, prepares a point in the circuit for controlling a relay, similar to the relay R660, in the next calling director in the chain. Finally, at its contacts 666, the relay R660 removes ground potential from the conductor C688 extending to Fig. 16 thereby to remove the operating ground potential from the winding of the control relay R1230 and the winding of the ATB connect relay R1260 in the translator 1300. Since the translator control relay R1210 is also in its restored position at this time, the locking ground for the relays R1230 and R1260 is removed at the contacts 1211, the relays R1230 and R1260 restore to normal. Upon restoring, the relay R1231 reapplies ground potential to the conductor C685 which is common to all of the directors of the system. However, if another director in the group of directors is in a calling condition, the translator busy relay R1220 is retained in its operated position, as previously noted, whereupon the ground potential is connected to the conductor C687 instead of to the conductor C685. This ground potential is further extended by way of the contacts 661 and 643 and then by way of a chain circuit extending through each of the directors of the group to a relay in the next calling director which is similar to the relay R660 of the director illustrated. The relay R660 in the next calling director is thereupon controlled to cause the association of the translator 1300 therewith.

The translator 1300 may now be operated in the manner previously described to receive the registration of the called office code as registered in the succeeding calling director and to translate the called office code in the same manner as has been described.

The operation of the illustrated director and the schematically illustrated switching apparatus including the call recorder 2000, the detector 1900 and the toll ticketing apparatus is the same as has been illustrated and described in detail in the previously noted copending Ostline application.

In the foregoing description of operation of the translator 1300 it was assumed that the call originated at a class 1 subscriber substation and that the class 1 relay R1345 and the class common relay R1340 were operated. The alternate route pick-up heads 1315W to 1315Z, inclusive, and the class 1 pick-up heads 1317W to 1317Z, inclusive, were rendered operative to respond, respectively, to the magnetized tracks 1314W to 1314Z, inclusive, and 1316W to 1316Z, inclusive. Since the call described was one that was not provided with alternate routing facilities, the signals picked up by the alternate route pick-up heads, noted, above, and amplified by the alternate route amplifier 1270 were without effect due to the fact that the alternate route gate 1260 remained in a blocked condition. Also, the manner in which the alternate route gate 1260 was unblocked and the principal route gate 1250 was blocked in the event alternate trunk routing facilities were included and all of the direct trunks in the direct trunk route were busy was previously described. In the latter event, it should be understood that the magnetized tracks 1314W to 1314Z associated with the alternate route pick-up heads 1315W to 1315Z would be magnetized in accordance with the WXYZ code to control the code registers 1101-1 to 1101-9, inclusive, whereby appropriate routing information and controls would be transmitted to the coder 1800 portion of the director in substantially the same manner as has been previously described.

In view of the foregoing, it will also be understood that if a class 2 calling subscriber originated the call, the class 2 relay R1350, intsead of the class 1 relay R1345, would have been operated in series with the class common relay R1340. In this manner, the relay R1350 renders the class 2 pick-up heads 1319W to 1319Z effective to be controlled by magnetized spots appearing on the associated tracks 1318W to 1318Z, inclusive. These magnetized spots may be arranged in accordance with the previously mentioned WXYZ code whereby different routing digits and control operations may be transferred to the coder 1800 portion of the director in the manner previously described.

Finally, if a class 3 subscriber originated the call, the class 3 relay R1355 would have been operated in series with the class common relay R1340 thereby to render the class 3 pick-up heads 1321W to 1321Z effective to respond to the magnetized spots appearing on the associated tracks 1320W to 1320P, inclusive. In the case of a class 3 call, the translator is informed that the call is from a paystation and it should be routed to a toll operator's position for recording purposes. Therefore, if a class 3 subscriber dials, for example, the called office code "361," the routing digits transferred to the coder 1800 portion of the director by the translator will cause the director to automatically route the call to a toll operator's position for recording purposes. In this case, the toll operator will supervise the connection, make out the usual toll ticket and request that the paystation subscriber deposit the necessary coins for the particular call.

*Operation of the translator 1300 to magnetize the tracks in accordance with translations of called office codes*

In order to impress the magnetizing spots upon the various tracks, the WXYZ magnetizing heads 1330 to 1333, inclusive, are provided respectively for the WXYZ pick-up heads 1315, 1317, 1319 and 1321. The windings for the various magnetizing heads are shown separate and distinct from the windings of the corresponding pick-up heads, but it should be understood, as previously explained, that these windings in fact are upon the same core windings as the pick-up head windings. Also it should be noted that all of the pick-up heads 1312A, 1313A, 1315W to 1315Z, 1317W to 1317Z, 1319W to 1319Z and 1321W to 1321Z are all in exact alignment parallel to the axis of the drum 1311. At the outset it will be assumed that the effective magnetized spots are represented by a spot which is magnetized beyond saturation in a positive direction and that ineffective spots will be magnetized beyond saturation in a negative direction. It should also be noted that the alternate route amplifier 1270 and the principal route amplifier 1280 are designed to pass only such signals as are picked up by the associated pick-up heads when the spots appearing under the associated pick-up heads are magnetized in a positive direction whereas the signals generated by spots which are magnetized in a negative direction will not be passed by the amplifier 1270 or 1280.

As illustrated in the drawings, the windings on the cores of the magnetizing heads are arranged so that when the lower winding is energized, the spot that is magnetized on the associated track is in a negative direction and when the circuit is completed for the upper windings, which has twice as many turns as the lower winding and is in a reverse direction from the lower winding, the spot will be magnetized in a positive direction. In other words, the upper winding contains twice as many turns as the lower winding and is wound on the core so that energization thereof will result in a flux that will saturate the spot in a positive direction in order to create an effetcive magnetized spot.

In order to impress the code translations on the magnetizable tracks of the drum 1311, ten translation key sets 1413 to 1422 are provided. Each key set comprises ten keys 1 to 0 arranged to mark four WXYZ marking conductors in the cable C1466 in accordance with the previously described WXYZ code to register any one of ten digits from "1" to "0." Since ten key sets are provided, ten different digits may be selectively marked in code on the ten key sets 1413 to 1422, inclusive. It should be noted that each of the key sets 1413 to 1422 are mechanically interlocked so that only one key in any key set can be retained in an actuated position at any one time.

In addition to the ten translating keys 1413 to 1422, the translator 1300 is provided with three called office code key sets 1410 to 1412, inclusive, for registering respectively the hundreds, tens and units digits of any three-digit called office code. Each key set comprises ten individual keys respectively designated "1" to "0," inclusive, and they are each interlocked so that only one of the ten keys in any one key set 1410 to 1412, inclusive, may be retained in an actuated position at any one time. The ten keys of the hundreds key set 1410 are respectively connected via the conductors C1410-1 to C1410-0 to the lower windings of the ten register relays H1 to H0, inclusive, in the hundreds register 1110 of the coincidence detector 1100. The tens key set 1411 is wired and connected in the same manner as the key set 1410 and the ten conductors C1411-1 to C1411-0 are respectively connected to the lower windings of the tens register relay T1 to T0 in the tens register 1120 of the coincidence detector 1100. The units key set 1412 is wired and connected in the same manner as the hundreds key set 1410 and the ten conductors C1412-1 to C1412-0, inclusive, are respectively connected to the lower windings of the units register relay U1 to U0, inclusive, in the units register 1130 of the coincidence detector 1100.

The ten lever springs of the ten keys in the translating key set 1413 are multiply connected by way of a unidirectional copper oxide rectifier 1401 to the marking conductor C1150 of the "0" stage in the digit counter 1370. Each of the ten lever springs in each of the nine remaining translating key sets 1414 to 1422, inclusive, are respectively connected via the marking conductors C1151 to C1159, inclusive, to the respective stages "1" to "9," inclusive, in the digit counter 1370 in the same manner as disclosed in connection with the translating key set 1413.

From the foregoing, it will be understood that a particular three-digit office code may be manually registered respectively on the called office code key set 1410, 1411 and 1412 and that the previously noted ten items of translation for that code may be respectively registered on the ten translating key sets 1413 to 1422, inclusive. The translations which are set up on the key sets 1413 to 1422, inclusive, are those which are applicable to the particular three-digit called office code which is manually registered on the called office code key sets 1410 to 1412, inclusive. Since each called office code may be translated into different routing digits and controls, depending upon the three different classes of calling lines and also depending upon the alternate routing facilities, four selecting keys K1365, K1370, K1375 and K1360 respectively to the three classes of lines and the alternate routing are provided to select the corresponding magnetizing heads associated with the magnetizing tracks for the class 1, 2 or 3 translations and the alternate route translation.

If the translating keys 1413 to 1422, inclusive, are manually controlled to set up the translating information of a particular called office code which corresponds to the alternate routing of a particular called office, the alternate route key K1360 is operated in order to control the associated alternate route connect relay R1360. The last-mentioned relay is provided with eight sets of make contacts for connecting the upper and lower windings of the alternate route magnetizing heads 1330W to 1330Z, inclusive, to the corresponding magnetizing circuits 1450W to 1450Z, inclusive. With this arrangement only the magnetizing heads for the alternate route translations may be controlled by the magnetizing circuits in accordance with the information keyed up on the translating keys 1413 to 1422, inclusive. The class 1, 2 and 3 keys K1365, K1370 and K1375 are connected and arranged in substantially the same manner as the alternate route key K1360. These keys may be selectively operated to connect up the respective class 1, 2 and 3 relays R1365, R1370 and R1375 in order to associate the corresponding class pick-up heads to the magnetizing circuits 1450W to 1450Z, inclusive. In addition to the eight pairs of make contacts for connecting the magnetizing heads to the magnetizing circuits, the relays R1360, R1365, R1370 and R1375 are each provided with additional make contacts 1361, 1366, 1371 and 1376 which are utilized to connect the marking conductor C1399 and the marking conductor C1245 in a manner to be described hereinafter.

For the purpose of this description, it will be assumed that the exchange attendant desires to magnetize the tracks 1316W to 1316Z in accordance with the translations required in response to a call from a class 1 subscriber calling line to the EMpire 1 exchange having the called office code digits "361." Accordingly, the attendant operates the called office code key set 1410 in accordance with the hundreds digit "3" of the office code, the tens key set 1411 in accordance with the tens digit "6" of the office code, and the units key set 1412 in accordance with the units digit "1" of the office code. Since each of the key sets 1410 to 1412, inclusive, are provided with locking keys, the digits "361" will be marked on the associated conductors C1410-3, C1411-6 and C1412-1. In this manner, the called office code is first registered on the called office code key sets of the translator.

The exchange attendant must now operate the translating keys 1413 to 1422, inclusive, in accordance with the translating digits which are to be utilized to magnetize the tracks on the drum 1311 of the translator marker 1310 in accordance with the previously noted WXYZ code.

It will also be assumed that the translations to be impressed upon the magnetizing tracks are based on a call from a class 1 calling subscriber line and, therefore, the translating keys 1413 to 1422 must be actuated in accordance with predetermined routing digits and controls whereby the directors involved in any particular connection would route a call from a class 1 calling line to a subscriber in the EMpire 1 exchange when the called office code digits "361" are registered in any director. Consequently, the exchange attendant now actuates the class 1 key K1365 which remains in its actuated position in order to prepare a circuit, traced hereinafter, for controlling the class 1 connect relay R1365. In the particular trunking arrangement shown in Figs. 2, 3 and 4 a call from a class 1 calling subscriber, for example, the subscriber TX3 in the FLorida 3 exchange may be extended to a called subscriber in the EMpire 1 exchange having the called office code digits "361" via the primary selector 500A, the repeater 305, the interconnecting trunk line 335, the repeater 290, the incoming toll selector 205 and the local switch train in the EMpire 1 exchange including the selecter 210, the selector 215 and the connector 220. In view of the foregoing, the translator 1300 must control the director in the FLorida 3 exchange to register the single routing digit "8" in the coder 1800 and must operate the TB control relay R1885 in the coder 1800 whereby the director will set up the connection to the desired called subscriber by sending out the routing digit "8" to the primary selector 500A followed by the last five digits of the seven-digit called number as is registered in the director by the calling subscriber.

The exchange attendant by referring to a chart is informed that the key set 1413 must be operated in accordance with a digit "1" to "9" corresponding to the direct trunk route to any called exchange which may be registered in code on the called office code key set. In the present example, the EMpire 1 exchange, code "361," is not provided with alternate routing facilities when calls are extended thereto from the FLorida 3 exchange. The attendant then actuates the "0" key of the key set 1413 which indicates that no test will be made to determine whether or not an alternate routing test is to be made by the translator on a call from the FLorida 3 exchange to the EMpire 1 exchange.

The translating keys 1414 to 1419, inclusive, are provided to register respectively a maximum of six possible routing digits. In the present example, the single routing digit "8" is registered on the translating key set 1414 by actuating the corresponding key provided therein. The remaining routing digit key sets 1415 to 1419, inclusive, are not required to be operated in accordance with any routing digits and in the present example, the attendant actuates the skip key Skip. The translating key set 1420 is provided to register the units digit of the rate of charge for a call from FLorida 3 exchange to the EMpire 1 exchange. However, in the present example a class 1 subscriber in the FLorida 3 exchange pays a higher rate of service charge for his connections than the subscribers of other classes of lines and, therefore, may make free calls to the EMpire 1 exchange. Accordingly, in the present example, the exchange attendant actuates the skip key Skip in the key set 1420 thereby to indicate that the present call is a free call and no rate digit is to be registered in the rate register of the coder 1800.

The key set 1421 is provided to register appropriate controls whereby the TA, TB, TC or TD relays R1890, R1885, R1880 and R1875 in the coder 1800 may be controlled in the manner previously noted. In the present example, the TB control relay R1885 in the coder 1800 should be operated so that the director in sending out the digits for setting up the connection will skip the first two called office code digits "36" registered in the call register 1500 and will thereafter send the third code digit "1" of the called office followed by the four numerical digits of the called subscriber number. In order to impress this translation on the drum 1311, the attendant actuates the translating key set 1421 in accordance with the digit "8."

Finally, the translating key set 1422 is provided to register the translations necessary to determine whether or not the call recorder 2000 (Fig. 5) and the detector 1900 are required in the translation of the code "361" when the call is from a class 1 subscriber line.

In the call being described the class 1 subscribers have free calls to the EMpire 1 exchange having the code digits "361" and, therefore, the call recorder 2000 and the detector 1900 are not operated and no toll ticket is made for the call. Accordingly, the exchange attendant actuates the skip key Skip in the translating key set 1422.

As previously noted, each of the key sets 1413 to 1422, inclusive, are mechanically interlocked and are provided with a key, such as the key 1413S, shown in detail with the keys of the key set 1413. It should be understood that when any one of the ten keys "1" to "0" or the skip key Skip in any key set 1413 to 1422, inclusive, is actuated, the associated mechanical interlocking key will be actuated to close its contacts.

Figure 12A:
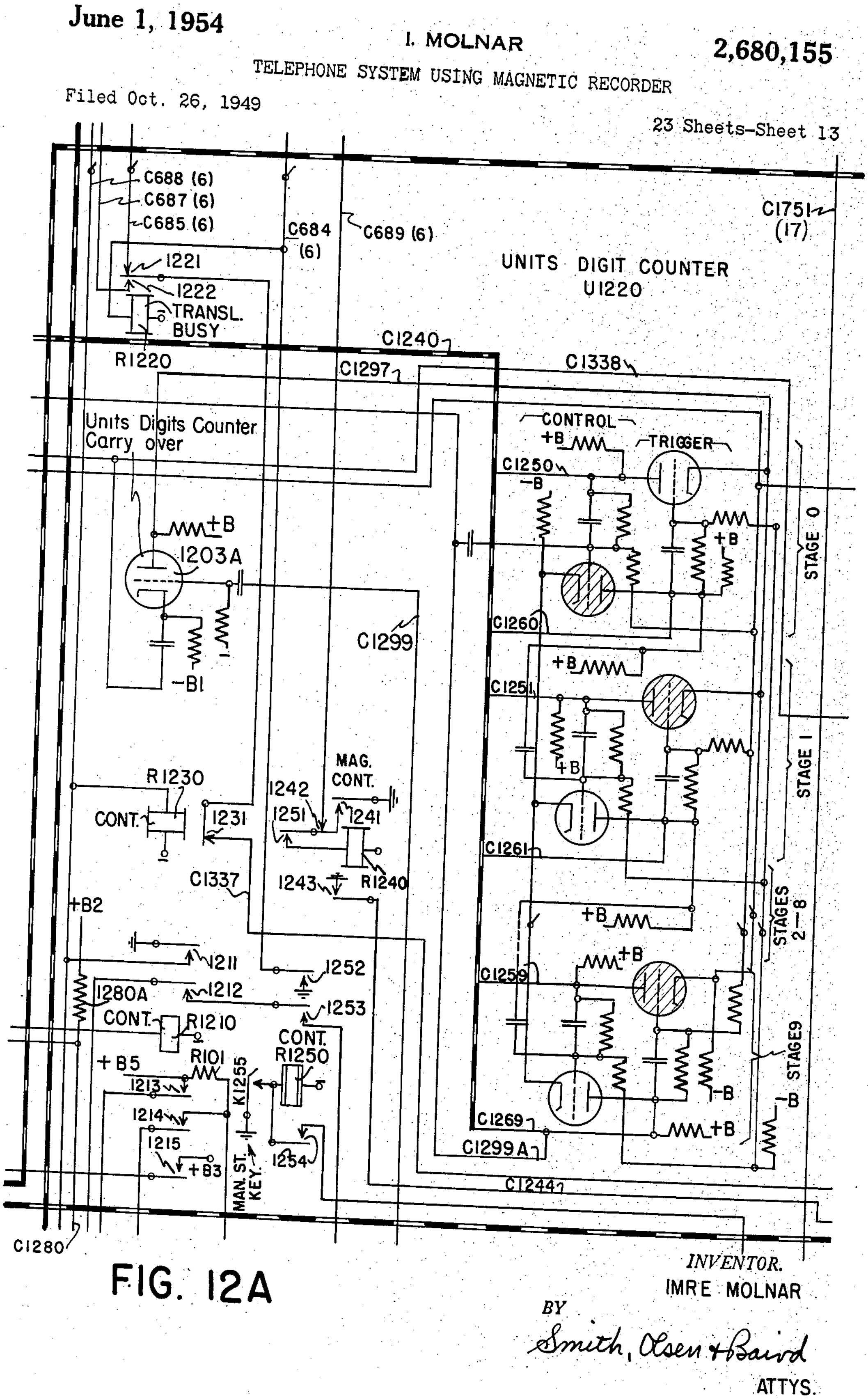
Figure 12B:
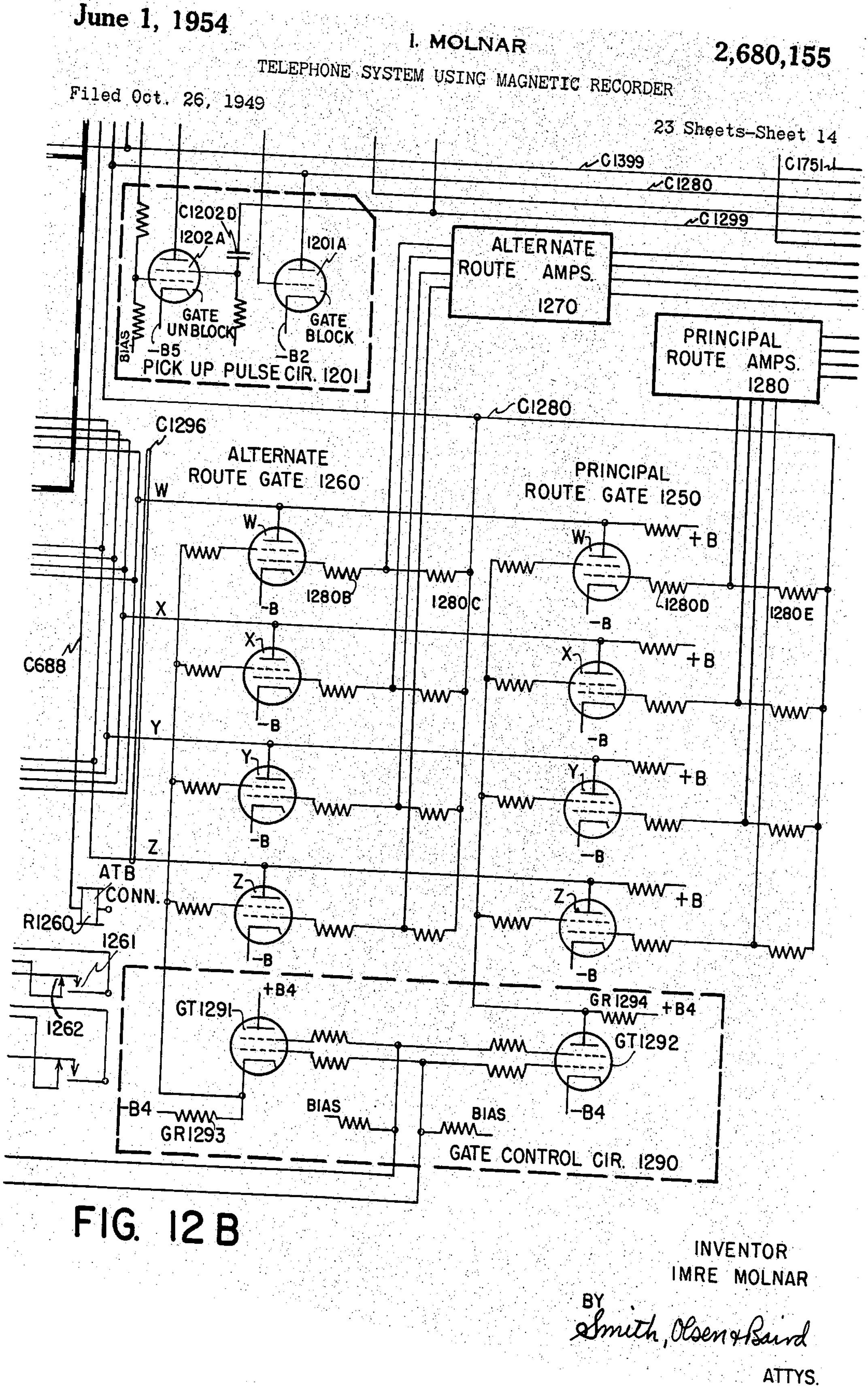

In view of the foregoing description, in the present example each of the mechanical interlocking keys, such as the key 1413S, in the translating key sets 1413 to 1422, inclusive, has been actuated to close its contacts. When the called office code key set and the translating key sets and the class 1 key K1365 have been actuated in the manner described above, the translator 1300 is in condition to place appropriate translations on the magnetizing tracks 1316W to 1316Z, inclusive, associated with the class 1 magnetizing heads. When these operations have been performed by the attendant, he then momentarily actuates the non-locking manual start key K1255 (Fig. 12A). When the start key K1255 is actuated, it closes an obvious circuit for operating the control relay R1250. The relay R1250, upon operating, at its contacts 1254, locks itself in its operated position to ground at the contacts 1461 of the non-operated key connect relay R1460. Also the relay R1250, upon operating, at its contacts 1252, completes an obvious circuit for operating the translation busy relay R1220. At this time the translator 1300 should operate in the manner previously described whereby the coincidence detector 1100 is controlled in accordance with the called office code set up on the key sets 1410 to 1412, inclusive. However, the circuits for the translator 1300 whereby the magnetizing heads are controlled in accordance with the operated conditions of the translating key sets 1413 to 1422, inclusive, will not be completed until all of the directors requiring the use of the translator 1300 are taken care of and the translations made in the manner previously described.

The electrical interlocking circuits for preventing the control of the magnetizing heads until the translator 1300 is in an idle condition includes a chain circuit through all of the directors having access to the translator 1300. Accordingly, when the translator 1300 is idle, and no directors require the use of the translator, a circuit is completed for operating the magnetized control relay R1240 (Fig. 12A) over a circuit which may be traced from battery and then by way of the winding of the relay R1240, the contacts 1251 and 1242, the conductor C689 extending to Fig. 6, the chain circuit including contacts in each of the directors, the contacts 643 of the controller 600 portion of the first director in the chain, the contacts 661, the conductor C687 extending to Fig. 16, the contacts 1222 of the operated translator busy relay R1220, the contacts 1231, the conductor C1337 and the contacts 1336, to ground. The relay R1240 operates over the above-traced circuit and, at its contacts 1241, completes a locking circuit for itself which is independent of the above-described chain circuit. Also, at its contacts 1243, the relay R1240 applies ground potential to the conductor C1244. The ground on conductor C1244 is then extended through each of the mechanical interlocking keys, such as the key 1413S, to the conductor C1245. One branch of the grounded conductor C1245 includes one spring of each of the pairs of springs of the tens keys provided in each of the key sets 1410 to 1412, inclusive. Since the digit "3" is registered on the key set 1410, the ground potential on the conductor C1245 is further extended to the conductor C1410–3 thereby to operate the H3 register relay (not shown) in the hundreds register 1110 over a circuit including its lower winding. The tens key set 1411 has been operated to register the digit "6" and, consequently, the ground potential on the conductor C1245 is applied to the conductor C1411–6 in order to operate the T6 register relay in the tens register 1120. The units key set 1412 has been actuated in accordance with the digit "1" consequently, the ground potential on the conductor C1245 is applied to the conductor C1412–1 in order to operate the register relay U1 in the units register 1130.

From the foregoing, it will be understood that the register relays in the hundreds, tens and units registers 1110, 1120 and 1130 are operated under control of the called office key sets 1410, 1411 and 1412 in precisely the same manner as they were operated in response to the registration of the called office code "361" in the call register 1500. In other words, the register relays in the coincidence detector 1100 control the associated detector tubes in identically the same manner whether they are operated in response to the translator being associated with a calling director or in response to the registration of a called office code on the key sets 1410 to 1412, inclusive.

The ground potential applied to the conductor C1245 is also extended via the actuated class 1 key K1365 and the winding of the class 1 connecting relay R1365, to battery. This relay operates and, at its eight upper make contacts connects the windings with a class 1 magnetizing head 1331W to 1331Z, inclusive, to the plate electrodes of the pair of tubes in the magnetizing circuits 1450W to 1450Z, inclusive. The ground potential applied to the conductor C1245 is now extended by way of the contacts 1366 of the operated relay R1365 to the conductor C1399. As soon as the ground potential is applied to the conductor C1399, a circuit is completed for operating the translator control relay R1210 over the series circuit including the make contacts on the operated register relays H3, T6 and U1 in the coincidence detector 1100, in the manner previously described. As soon as the relay R1210 operates, at its contacts 1212, it completes a circuit for operating the key connect relay R1460 over a circuit which may be traced from the grounded conductor C1399, the contacts 1212 and 1253 and the winding of the key connect relay R1460, to battery. Upon operating, the relay R1460, at its contacts 1462 to 1465, inclusive, connects the WXYZ conductors in the cable C1466 to the grid electrodes of the respective tubes 1451B, 1452B, 1453B and 1454B in the magnetizing circuit. Normally, the grid electrodes of the above-mentioned tubes are negatively biased with respect to the associated cathodes to prevent the tubes from being conductive. The grid electrodes of these tubes will be driven positive in accordance with the WXYZ code of the digits registered in the various key sets 1413 to 1422, inclusive, whereby the connected magnetizing heads 1331W to 1331Z, inclusive, are controlled to magnetize spots on the associated magnetizing tracks as previously noted.

However, as long as the called office code registered in the coincidence detector 1100 fails to coincide with the digits registered on the hundreds, tens and units digit counters H1120, T1130 and U1220, a blocking biasing potential appears on the conductor C1280 to drive the screen grid electrodes of the tubes in the magnetic circuits 1450W to 1450Z, inclusive, negative with respect to the associated cathodes in order to prevent the said tubes from becoming conductive. Referring now particularly to the magnetizing circuit 1450W, it is noted that the cathodes of the tubes 1451A and 1451B are connected via a resistor to a negative biasing potential. The grid of the tube 1451A is normally biased negatively with respect to the associated cathode. Consequently, when the screen grid electrode is biased negatively with respect to the associated cathode, the tube 1451A remains non-conductive. This condition exists even though the cathode of the tube may be periodically driven more negative in response to pulses transmitted by the pick-up amplifier 1360 over the conductor C1338'. The same conditions exist with respect to the screen grid and the grid electrodes of the tube 1451B. From the foregoing, it should be understood that the conductor C1280 connected to the screen grid electrodes of the tubes in the magnetizing circuits 1450W to 1450Z, inclusive, maintain the magnetizing circuits in a blocked condition until the number of indexing pulses counted and registered by the counters H1120, T1130, U1220 and 1370 coincide with the called office code digits registered in the coincidence detector 1100.

The manner in which the counters operate in response to the indexing pulses transmitted over the conductor C1338 is exactly the same as has been described hereinbefore. Accordingly, when the impulses counted and registered in the hundreds, tens and units digit counters H1120, T1130 and U1220 coincide with the called office code digits "361" registered in the register relays of the coincidence detector 1100, all of the detector tubes will be in a non-conductive condition in order to change the bias on the conductor C1280 in the manner previously described. At this instant, the bias on the conductor C1280 becomes positive and thereby alters the potential on the screen grids of the tubes in the magnetizing circuits 1450W to 1450Z, inclusive. The screen grids of the tube 1451A become positive with respect to the associated cathode but the grid electrode of the tube is still negative with respect to the associated cathode and thus prevents the tube from becoming conductive.

It will be recalled that the digit counter 1370 responds to each indexing pulse received over impulse conductor C1338 and when the tenth pulse of any series was received, the stage "9"

of the digit counter 1370 caused a pulse to be transmitted to the units digit counter U1220 and to the "0" stage of the digit counter 1370. If at that instant, the hundreds, tens and units digit counters H1120, T1130 and U1220 are actuated to coincide with the called office code digits "361," the "0" stage of the counter 1370 was also rendered conductive to mark the conductor C1150 therein with a relatively high positive bias potential. The indexing pulses transmitted over the impulse conductor C1338 by the pick-up amplifier 1360 are simultaneously applied via the conductor C1338' to the cathodes of all of the tubes in the magnetizing circuits 1450W to 1450Z, inclusive. Each pulse received in this manner drives the cathode of the tube 1451A more negative and, therefore, the associated grid electrode becomes positive with respect to the cathode. The tube 1451A would normally become conductive under this condition provided the screen grid electrode thereof also is positive with respect to the associated cathode. As pointed out above, the screen grid electrode is made positive only when the digits registered and the pulses counted coincide. When the coincidence occurs, the tube 1451A becomes conductive thereby completing a circuit including its space current path and the lower winding of the magnetizing head 1331W. The magnetizing head 1331W due to the direction of the current flow through the lower winding magnetizes a spot on the track 1316W in a negative direction. The tubes 1452A, 1453A and 1454A respond in the same manner as has been described above in connection with the tube 1451A and they respectively control the lower windings of the magnetizing heads 1331X, 1331Y and 1331Z. From the foregoing, it should be understood that when the screen grids of the above-mentioned tubes are made positive with respect to the associated cathodes, each pulse thereafter received over the conductor C1338' alters the potential on the cathode so that the four tubes become conductive and simultaneously energize the lower windings of the pick-up heads 1331W to 1331Z, inclusive. The spots appearing on the associated tracks are of a negative polarity as previously noted and are ineffective to transmit signals via the associated pick-up heads.

Referring now to the magnetizing circuit 1450W it is noted that the potentials applied respectively to the screen grid electrode and the cathode of tube 1451B are identical and occur at the same time as these potentials are applied to the corresponding elements of the tube 1451A. The main difference occurs in the circuit elements connected with the grid electrode of the tube 1451B. The grid of the tube 1451B is normally biased negatively via a pair of series connected resistors. The negative bias appearing on the grid is sufficiently negative to prevent the associated cathode from being made more negative than the grid electrode when pulses appear on the conductor C1338'. This particular circuit arrangement prevents the tube 1451B from responding to each indexing pulse received over the conductor C1338' whereas the tube 1451A responds to each impulse. The plate electrode of the tube 1451B is connected to a circuit including the upper winding of the magnetizing head 1331W. As long as the tube 1451B is retained in a non-conductive condition, the upper winding of the pick-up head 1331W is not energized and, consequently, the conductivity of the tube 1451A will cause the lower winding of the magnetizing head 1331W to generate a flux which will cause a negative spot to be magnetized on the tape 1316W.

In order to describe the manner in which the tube 1451B is rendered conductive, it will be assumed that a positive pulse appears on the W conductor of the cable C1466 at the same instant that an indexing pulse appears on the conductor C1338'. This positive pulse drives the grid of the tube 1451B positive with respect to the associated cathode thereby causing the tube 1451B to become conductive. Therefore, the tubes 1451A and 1451B in their conductive conditions simultaneously complete circuits for the upper and lower windings of the magnetizing head 1331W. The upper winding of the magnetizing head 1331W contains twice as many turns as the lower winding thereof and it is wound on the core of the magnetizing head in a direction to produce a flux in the opposite direction from that created by the lower winding. Since there are twice as many turns in the upper winding, the flux generated completely cancels out any flux generated by the lower winding with the net result that a magnetized spot in a positive direction produced on the track 1316W. From the foregoing it will be understood that the magnetizing circuits 1450W to 1450Z, inclusive, operate in the manner described above to produce an ineffective negative magnetized spot or effective positive magnetized spot on the various tracks in accordance with the WXYZ code markings appearing on the WXYZ conductors in the cable C1466.

At the time coincidence occurs between the digits of the registered called office code and the digits registered in the hundreds, tens and units digit counters, the conductor C1150 in the "0" stage of the digit counter 1370 was marked with a relatively high positive marking potential. It will be recalled that this positive marking potential was applied to the screen grid electrodes of the four gas-filled tubes in the code register 1101-1 in order to prepare these tubes to respond to any signal that may be transmitted thereto from the pick-up heads in the translator 1300. The various code registers 1101-0 to 1101-9 are prepared for operation, as noted above, as the digit counter 1370 counts the pulses "0" to "9," inclusive. However, when the magnetizing heads of the translator marker 1310 are being utilized to mark the tracks on the drum 1311, the pick-up heads are ineffective to respond to magnetizing spots appearing on the tracks and, therefore, the operations which take place to successively condition the code registers 1101-1 to 1101-9, inclusive, for operation are of no consequence. The conductor C1150 to C1159, inclusive, of the digit counter 1370 are also respectively connected to the ten translating key sets 1413 to 1422, inclusive. Therefore, the positive bias potential appearing on the conductor C1150 is connected by way of the rectifier 1401 and then to each of the main lever springs of the ten keys "1" to "0" of the translating key set 1413.

The translating key set 1413 is provided, as previously noted, to register a digit corresponding to a particular alternative route trunk group. In the present example, however, it was assumed that alternate trunking facilities are not provided for calls to be extended from the FLorida 3 exchange to the EMpire 1 exchange having the code digits "361." Therefore, the "0" key was actuated to indicate that no alternate route test should be made by the translator 1300. With the "0" key in its actuated position, the positive potential appearing on the conductor C1150 is connected via the actuated "0" key to the Z conductor in the cable C1466. The positive potential appearing on the Z conductor is further extended via the contacts 1465 to the grid electrode of the tube 1454B in the magnetizing circuit. At this instant, the pulse appearing on the conductor C1338' causes the tubes 1451A to 1454A, inclusive, and 1454B to become conductive. The three tubes 1451B to 1453B remain in their non-conductive conditions since no marking potentials appear on the associated W, X and Y conductors in the cable C1466. Accordingly, the conductive condition of the tubes 1451A to 1453A, inclusive, complete circuits whereby the magnetizing heads 1331W to 1331Y are energized over circuits including their lower windings to cause an ineffective negative spot to be magnetized on the tracks 1316W, 1316X and 1316Y. Inasmuch as the tubes 1454A and 1454B are in their conductive conditions both windings of the magnetizing head 1331Z are energized in order to produce a positive magnetized spot on the track 1316Z. The angular position of the drum 1311 corresponds to the indexing pulse "3610," that is, the "0" position of the code "361" and the magnetized spots impressed on the tracks 1316W to 1316Z in this position are in accordance with the digit "0" of the previously noted WXYZ code.

The drum 1311 continues to rotate in the manner previously described and when the next indexing pulse "3611" is counted, stage "1" of the digit counter 1370 becomes effective to apply a positive marking potential to the conductor C1151 and the marking potential on the conductor C1150 is removed. The positive marking potential on the conductor C1151 completes a circuit by way of the contacts of the actuated key and the translating key and the translating key set 1414 to mark the WXYZ conductors C1466 in code form in accordance with the particular actuated key. In the present example, the digit registered on the key set 1414 is the digit "8" corresponding to the first routing digit of the translation of the called office code "361." The positive marking potential on the conductor C1151 is extended by way of the contacts of the actuated key 8 to the X conductor in the cable C1466. The marking potential on the X conductor marks the WXYZ conductors in the cable C1466 in accordance with the digit "8." The magnetizing circuits 1450W to 1450Z, inclusive, are controlled in the manner previously described to cause the pick-up heads 1331W to 1331Z to be energized to produce respectively a non-effective negative spot on the tracks 1316W, Y and Z and an effective positive magnetizing spot on the track 1316X.

The following eight indexing pulses "3612" to "3619" counted by the digit counter 1370 cause the conductors C1152 to C1159, inclusive, to be successively marked with a positive marking potential in the manner previously described. In this manner, the marking potentials are successively connected via the key sets 1415 to 1422, inclusive, in order successively to mark the WXYZ conductors in the cable C1466 in code form in accordance with the digits registered on the key sets 1415 to 1422, inclusive. In view of the foregoing, it will be understood that as the drum 1311 moves in accordance with the indexing pulses "3612" to "3619," the magnetizing heads 1331W to 1331Z will magnetize the associated tracks 1316W to 1316Z in accordance with the code markings appearing on the WXYZ conductors in the cable C1466 in the manner described above.

It may be well to mention at this time, however, that any previous magnetized spots are automatically erased by the magnetizing heads 1331W to 1331Z and the new spots magnetized thereupon in accordance with the operated conditions of the translating key sets 1413 to 1422, inclusive. For example, if the old spot magnetized on a track is in a positive direction and the magnetizing head is energized in a direction to create a flux that would cause the track to be magnetized in a negative direction, the strength of the magnetizing flux is sufficient to cancel the positive magnetized spot and to substitute in place thereof a negative spot. It should be understood, however, that the windings on the magnetizing heads are strong enough to generate sufficient flux to saturate the spot on the magnetizing track in either a positive or a negative direction.

When the digit counter 1370 impresses the last marking potential on the conductor C1159, that is, the tenth indexing impulse counted after coincidence has been reached, the magnetizing heads 1331W to 1331Z, inclusive, are controlled by the magnetizing circuits 1450W to 1450Z, inclusive, in accordance with the code markings of the digit registered by the actuated condition of the keys in the key set 1422. Accordingly, the last translated item for the called office code "361" will be marked on the tracks 1316W to 1316Z, inclusive. The next indexing pulse "3620" received by the digit counter 1370 causes the units digit counter U1220 to take an additional step thereby to register the called office code digits "362." Simultaneously therewith, the digit counter 1370 is controlled so that the "0" stage thereof is effective to mark the conductor C1150 in the manner previously described. As soon as the units digit counter U1220 is marked in accordance with the units digit "2" the coincidence between the hundreds, tens and units digit counters H1120, T1130 and U1220 and the operated hundreds, tens and units register relays in the coincidence detector 1100 no longer exists. As soon as lack of the coincidence occurs, at least one of the detector tubes in the coincidence detector 1100 becomes conductive and thereupon alters the biasing potential appearing on the conductor C1280 so that the screen grid electrodes of the tubes in the magnetizing circuits 1450W to 1450Z, inclusive, are negative with respect to the associated cathodes. All of the above-mentioned tubes are, therefore, cut off and cannot become conductive.

At this time, the translations which have been registered on the key sets 1413 to 1422, inclusive, have been placed on the tracks 1316W to 1316Z, inclusive, and the translator 1300 may again be rendered available to calling directors. The release of the translator 1300 for use by calling directors occurs in response to the operation of the key control relay R1460. The relay R1460, it will be recalled, was operated to connect the marking conductors in the cable C1466 to the magnetizing circuits. When the relay R1460 originally operated, at its contacts 1461, it removed the holding ground potential from the circuit including the winding of the slow-to-release control relay R1250. The relay R1250 now slowly restores to normal and due to its slow-to-release characteristics, it does not fully restore to normal until the drum 1311 on the translator 1310 has made at least one complete revolution.

When the relay R1250 finally restores to normal, at its contacts 1253, it interrupts the circuit for the key connecting relay R1460 which also restores to normal. At its contacts 1251, the relay R1250 interrupts the locking circuit of the relay R1240 which also restores to normal. Finally, at its contacts 1252, the relay R1250 opens the previously described operating circuit for the translator busy relay R1220 which now restores to normal. When the relay R1240 restores, it removes at its contacts 1243, the ground potential from the conductor C1244. As soon as ground potential is removed from the conductor C1244, the operated register relays H3, T6 and U1 in the hundreds, tens and units registers 1110, 1120 and 1130 restore to normal; the connecting relay R1365 restores to normal and the connecting relay R1210 restores to normal. As soon as the relay R1210 restores, at its contacts 1211, it interrupts the circuits for the control relays R1230 and R1260 which relays, upon restoring return the translator 1300 to its normal position so that it may now be selected for use by a calling director.

In the above description of the operation of the translator 1300 whereby the tracks 1316W to 1316Z, were magnetized, it was assumed that the particular translations impressed upon the magnetizing tracks were in accordance with routing digits and controls required to route a call to the EMpire 1 exchange having the coded digits "361" when the call is originated by a class 1 subscriber in the FLorida 3 exchange. Therefore, only the magnetizing heads 1331W to 1331Z were rendered effective to respond to the magnetizing circuits 1450W to 1450Z by the selective operation of the class 1 key K1365 and the class 1 connect relay R1365. If it is desired to impress translations on the magnetizing tracks in accordance with the same called office code "361" and based on a call originating on a class 2 line, the class 2 key K1370 instead of the class 1 key K1365 is operated in order to cause the class 2 connect relay R1370 to operate. The relay R1370 selectively connects the class 2 magnetizing heads 1332W to 1332Z to the magnetizing circuits 1450W to 1450Z, inclusive. The translating key sets 1413 to 1422, however, will be selectively operated by the exchange attendant in accordance with the particular translations that should be impressed upon the tracks whereby the magnetizing spots on the class 2 tracks 1318W to 1318Z would be such that a call will be appropriately routed by a director to the desired called exchange and whereby the appropriate rate of charge digits and director control operations will be performed. On this particular class of call, the call recorder 2000 and detector 1900 will also be called into operation for ticketing purposes and, therefore, this translation must also be set up on the key set 1422.

Briefly stated, the exchange attendant will operate the called office code key sets 1410 to 1412, inclusive, in the manner previously described to register the called office code digits "361," the translating key set 1413 will be actuated in accordance with the digit "0" since alternative trunk facilities are not provided on this type of call; the translating key sets 1414 and 1415 will be actuated in accordance with the first and second routing digits "48"; the translating key sets 1416 to 1419, inclusive, will be actuated in accordance with the skip key Skip since only two routing digits are required in this translation; the translating key set 1420 will be actuated in accordance with the units digit "1" of the rate of charge; the translating key set 1421 will be actuated in accordance with the digit "8"; and the translating key set 1422 will be actuated in accordance with the digit "7." In view of the previous description of the operation of the translator 1300 it will be understood that the tracks 1332W to 1332Z, inclusive, will be appropriately magnetized in accordance with the translations registered by the translating key sets 1413 to 1422, inclusive, in the ten successive positions in the arc on the drum 1311 that corresponds to the called office code digits "361."

If the attendant desires to impress translations on the class 3 magnetizing tracks 1333W to 1333Z, inclusive, based on the called office code digits "361," the operations to be performed by the attendant are precisely the same as has been described above except that the class 3 key K1375 is actuated in order to control the class 3 connect relay R1375 to connect the class 3 magnetizing heads 1333W to 1333Z, inclusive, to the magnetizing circuits 1450W to 1450Z, inclusive. Also the attendant may actuate the translating keys 1413 to 1422 in accordance with the predetermined digits for the translations which are required for appropriately routing a class 3 call to the called exchange having the code digits "361."

In the case of alternate route translations, it should be understood that the translations impressed on the magnetizing tracks 1314W to 1314Z only become effective in the event that a called office code registered in the translator 1300 is one which is individual to an exchange provided with alternative routing and all of the trunks in the direct trunk route are busy.

In the previous description it was pointed out that the first translation based on any called office code registered in the translator, regardless of the class of service of the calling subscriber, is such that the code register 1101-0 is controlled. In the present translator, the circuits have been wired so that nine different direct trunk routes are provided in the telephone system and these trunk routes have arbitrarily been designated "1" to "9," inclusive. The designations, however, have no relationship between the called office code digits or the calling exchange switching apparatus. It can be assumed, however, that each time a particular three-digit office code is registered in the translator 1300 that a call to the registered office will always be extended over a predetermined one of the above-mentioned nine trunk routes in accordance with the translated routing digits. If, for example, it is assumed that the called office code registered in the translator is such that the routing digit translated by the translator 1300 would cause the call to be routed over the trunk route 1, the translator 1300 will first be controlled to test whether all of the trunks in the direct trunk route 1 are busy. If any trunk in the group is idle, the direct trunk route routing digits will be translated and if all of the direct trunk routes are busy, the translations will be such that the routing digits will cause the call to be routed over the alternative trunk route to the registered called office. The operations of the translator which take place during the testing of the direct trunk routes has been previously described in connection with the operations of the alternate route gate 1260 and the principal route gate 1250.

Accordingly, it will be understood that when the exchange attendant desires to impress routing digits in accordance with an alternate trunk route to any particular called office, the called office code key sets 1410 to 1412, inclusive, will be operated in accordance with the particular called office code and the translating key sets 1413 to 1422, inclusive, will be operated in accordance with the routing digits required to route the call to the particular called office over the alternative trunk route. In addition to the foregoing, the exchange attendant will operate the alternate key K1360 in order to associate the alternate route magnetizing heads 1330W to 1330Z with the magnetizing circuits 1450W to 1450Z. The translating key set 1413 will be actuated by operating the skip key Skip whenever an alternative trunk route translation is to be impressed on the magnetizing tracks 1314W to 1314Z, inasmuch as the first translating position on the above tracks is not effective on any translation for alternate routing because after coincidence is reached between the registered called office code and the counted indexing pulses, the code register 1101-0 is always controlled by either the class 1, the class 2 or the class 3 pick-up heads in order to test the idle or busy condition of the direct trunk route corresponding to the registered called office code and determine whether the alternate route translations are to be used. If the all-trunks-busy condition is encountered, the alternate route gate 1260 is rendered effective to respond to signals generated by the alternate route pick-up heads 1315W to 1315Z. It is for this reason that the translating key set 1413 is not actuated in accordance with any digit when the alternate route magnetizing heads 1330W to 1330Z are connected to the magnetizing circuits. The remaining translating key sets 1413 to 1422, inclusive, are actuated in the manner previously described whereby appropriate routing digits and other previously described control digits are impressed on the magnetizing tracks 1314W to 1314Z as the drum 1311 of the translator marker 1310 transmits the corresponding indexing pulses to the digit counter 1370 and the magnetizing circuits 1450W to 1450Z.

*Operation of the director in response to the translation*

It will be recalled that when the translator 1300 registered in the coder 1800 the routing digits required to route a call to a desired called exchange, the translation complete relay R810 in the controller 600 portion of the director operated. The relay R810, in turn, caused the restoration of the relays R650, R640 and R660 in the order named thereby to disconnect the translator 1300 from the calling director. In addition to the foregoing, the relay R810 also completes a circuit, at its contacts 814, for operating the start send relay R930, which relay, at its contacts 932, locks itself in its operated position. The operation of the start send relay R930 controls the various portions of the director to send out the routing digits which have been stored in the coder 1800 and certain of the dialed digits which are stored in the code and numerical registers in the call register 1500. The relay R930, at its contacts 931, grounds the conductor C977 in order to initiate the operation of the send sequence switch 1650. The send sequence switch 1650 and the sender 1600 cooperate to transmit impulses corresponding to the routing digits registered in the route registers of the coder 1800, to transmit impulses corresponding to selected ones of the digits registered in the first, second and third code registers 1520, 1530 and 1540 and all of the digits registered in the numerical registers 1610, 1620, 1630 and 1640 in the call register 1500.

The various operations of the controller 600, the call register 1500 and the coder 1800 portions of the director and other apparatus involved in the setting up of telephone connections and recording items of information pertaining to such telephone connections is described in detail in the previously mentioned copending Ostline application.

*Extension of an unauthorized call by a class 3 line*

Occasionally a paystation subscriber of the class 3 type will either inadvertently or deliberately attempt to complete a short haul toll call beyond the telephone area assigned for class 3 calls. In order to prevent a class 3 subscriber from extending unauthorized calls, the director and associated apparatus in the FLorida 3 exchange functions automatically to intercept such calls by extending the connection from the calling class 3 line to an intercepting operator position. For the purpose of describing the operations which would take place under this condition, it will be assumed that a class 3 paystation line in the FLorida 3 exchange has attempted to extend a connection to the subscriber TR1 in the EMpire 1 exchange whose directory number is EMpire 1-1234. The three code digits "361" designating the EMpire 1 exchange will be registered in the call register 1500 portion of the director in the first, second and third code registers 1520, 1530 and 1540 in the manner previously described. The translator 1300 is automatically connected to the director in the manner previously described and the called office code digits "361" will be registered in the coincidence detector 1100. Also, the class of the calling line will be registered in the translator 1300 by the operation of the class 3 relay R1355. As the indexing pulses are counted by the digit counter 1370 during the rotation of the drum 1311 of the translator marker 1310, the hundreds, tens and units counters H1120, T1130 and U1220 will register the same in the manner previously described. When the angular position of the drum 1311 is such that the translations corresponding to the called office code "361" are positioned under the various pick-up heads, the translator 1300 functions in the manner previously described to render the class 3 pick-up heads 1321W to 1321Z effective to respond to the magnetizing spots appearing on the associated tracks during the next ten counts of the digit counter 1370. Since the class 3 subscriber is prohibited from extending calls to the EMpire 1 exchange without the aid of the toll operator, the translations appearing on the tracks 1320W to 1320Z for the called office code "361" are such that the call will be automatically routed to an intercepting operator position. Accordingly, the code registers 1101-1 to 1101-9, inclusive, respond to the signals in accordance with such translations and control the coder 1800 portion of the director in the manner previously described. In the present example, the route digits "50" will be registered respectively on the first and second route digit registers in the coder 1800 and the TD control relay R1875 therein will be operated. The remaining third, fourth, fifth and sixth route digit registers, the units digit rate register, the AB Toll marking conductor and the Y18 tens digit rate marking conductor will not be operated or grounded in the present call. With the route digits "50" registered in the coder 1800 portion of the director and the TD control relay R1875 in its operated position, the director functions to transmit impulses corresponding to the routing digits "5" and "0" and to skip the digits registered in the various registers of the call register 1500.

Referring now to Figs. 2 and 3, it will be understood that the director (Fig. 3) will transmit the first routing digit "5" to the primary selector 500A and the primary selector will raise its wipers step-by-step in the well-known manner to the fifth level of the associated banks and will rotate its wipers over the contacts of the selected level to search for and seize an idle special second selector, such as the selector 340. The second routing digit "0" is now transmitted by the director to control the selector 340 to raise its wipers to the tenth level of its associated bank and to rotate its wipers over the selected tenth level to find and seize an idle trunk extending to the intercepting operator position.

The director and the translator 1300 are released from the connection and a connection is thereby completed from the calling class 3 paystation line through the finder 440A, the primary selector 500A and the special selector 340 to the intercepting operator position. The intercepting operator, upon answering the call, will inform the subscriber at the paystation telephone that he is not permitted to directly dial calls to subscribers located outside of the local calling exchange area and that the subscriber should hang up and dial the toll operator whose directory number is, for example, "100."

The above arrangement for causing the translator 1300 to register routing digits to route a call to an intercepting operator position may be employed for all called office codes designating exchanges outside of the local calling area so that whenever a class 3 paystation line subscriber dials such called office code digits, the magnetized tracks associated with the class 3 pick-up heads will cause the coder 1800 portion of the director to be operated in the manner described above. Accordingly, such unauthorized calls from calling paystation lines will always be routed to the intercepting operator position.

*Calls to the toll operator "100"*

If any subscriber in the FLorida 3 exchange desires to extend a connection to the toll operator whose directory number is "100," the digits "1" "0" "0" as dialed will be registered on the first, second and third registers 1520, 1530 and 1540 in the call register 1500 portion of the director and the translator 1300 will be called into use in the manner previously described. When the angular position of the drum 1311 of the translator marker 1310 corresponds to the registered code digits "100," the class 1, 2 or 3 pick-up heads 1317W to 1317Z, 1319W to 1319Z or 1321W to 1321Z will be effective depending upon the class of the calling line to translate the three-digit code "100" into the single routing digit "0" and to register this digit in the first route digit register of the coder 1800 and also to operate the TD control relay R1875.

The director will operate to transmit impulses corresponding to the routing digit "0" and the TD control relay, in its operated position, will control the director to prevent it from transmitting any of the digits which are registered in the call register 1500. The single digit "0" transmitted by the director will control the primary selector 500A (Fig. 3) to raise its wipers to the tenth level and to rotate its wipers over the tenth level to search for an idle trunk extending to the toll operator position. The toll operator, upon answering the call, may complete the connection to the desired called subscriber in a conventional manner and will ticket the call in order to appropriately charge the calling subscriber.

*Dialing the code representing a non-existing office*

In the above description of the mode of operation of the director and the translator 1300, it was pointed out that when a class 3 line attempted to complete a connection to an exchange located beyond the local zone, the call was automatically routed to an intercepting operator position. In the event that any subscriber, regardless of class, dials code digits representing a non-existing exchange, the translator 1300 will be utilized to translate the particular called office codes into the routing digits "50" in the manner described above so that the connection will be automatically routed to the intercepting operator position.

However, if it is not feasible to provide translations on the magnetized tracks of the translator marker 1310 for all codes representing a non-existing office, the director may be permitted to time out and automatically transmit a busy signal to the calling subscriber. Under this arrangement, the translator 1300 will attempt to operate in its normal manner, but since no translations appear on the magnetized tracks corresponding to the non-existing called office code, the coder 1800 portion of the director will not be operated and, consequently, the translation complete relay R810 will remain in its unoperated position. After approximately thirty seconds, the timer 1090 (Fig. 10) will apply ground potential to the conductor C1097 and cause the operation of the false seizure relay R770 in the controller 600 portion of the director in the manner described in the previously mentioned copending Ostline application. The false seizure relay R770, at its contacts 774, will thereupon transmit a busy tone signal to the calling subscriber. When the calling subscriber hangs up the receiver of his associated telephone instrument, the director and the translator 1300 will automatically restore to normal.

*Toll call from the FLorida 3 exchange to the CHase exchange*

All of the telephone exchanges included in the system are identified by a three-digit code except the CHase exchange which is identified by the two-digit code "24." The individual subscriber line numbers in each of the above exchanges including the CHase exchange constituting a four-digit number in accordance with conventional practice. If a subscriber in the FLorida 3 exchange initiates a call to a subscriber in the CHase exchange, the first digit "2" will be registered in the first code register 1520, the second digit "4" will be registered in the second code register 1530 of the call register 1500 in the manner previously described. If it is assumed that the called subscriber in the CHase exchange has the telephone number "7234," the digit "7" will be registered in the third code register 1540, all in the manner previously described. When the three digits "247" are registered in the call register 1500, the translator 1300 is called into use, as previously described, and the digits are registered in the coincidence detector 1100. The remaining digits "2," "3" and "4" of the called subscriber directory number are registered respectively on the first, second and third numerical registers in the call register 1500.

When the indexing pulses counted by the digit counter 1370 and registered on the hundreds, tens and units digit counters H1120, T1130 and U1220 correspond to the digits "247" registered in the coincidence detector 1100 the angular position of the drum 1311 is such that the magnetized translations for the called office code "247" are in a position to control the class 1, 2 or 3 pick-up heads to be utilized in translating the magnetized spots into signals for controlling the coder 1800 portion of the director, depending upon the class of the calling subscriber line, as previously noted. Fig. 20 illustrates the manner in which the drum 1311 is magnetized for the ten translations of the three digit code "247" based on class 1, 2 or 3 calling lines and alternative routing. In the present example, it will be assumed that the calling subscriber is of the class 1 type and that the class 1 relay R1345 is in its operated position to connect up the class 1 pick-up heads 1317W to 1317Z, inclusive. The magnetic translations on the tracks 1316W to 1316Z for the called office code "247" are such that the code registers 1101-1 to 1101-9, inclusive, will be operated to register the route digits "45" in the first and second route digit registers of the coder 1800, the units digit "5" of the rate of charge will be registered on the units rate register relays R1825 to R1828, the TB and TC control relays R1885 and R1880 will be operated and the AB Toll conductor will be grounded to indicate that the particular connection is one that should be toll ticketed.

The director thereupon transmits impulses corresponding to the first and second routing digits "4" and "5" and then the numerical portion of the called subscriber directory number comprising the digits "7234" in the register 1540, 1610, 1620 and 1630 in the call register 1500. In this particular connection, the called office code digits "24" registered in the first and second code registers 1520 and 1530 of the call register 1500 are skipped and not transmitted to set up the connection. Accordingly, the director transmits impulses corresponding to the translated routing digits "45" and the digits "7234" of the called subscriber number.

Referring to Figs. 2, 3 and 4, it will be understood that the primary selector 500A will respond to the first digit "4" and selects an idle toll ticket repeater 2300 A. The ticket repeater selector 2300A, individually associated with the ticket repeater 2300A, is operated under control of the second routing digit "5" to select an idle repeater 379 terminating a trunk extending to the CHase exchange. The next digit "7" transmitted by the director controls the incoming selector 381 in the CHase exchange to select an idle local selector 374. The three remaining digits "2," "3" and "4" are transmitted over the previously described path whereby the digit "2" controls the selector 374 to select an idle connector 375 and the digits "34" control the connector 375 to complete the connection to the desired called subscriber substation in the CHase exchange, whose directory number is CHase 7234.

During the setting up of this connection, the toll ticket repeater 2300A transmits a signal to the call recorder 2000A and, thus, initiates the operation of the call recorder to transfer to the toll ticket repeater 2300A various items of information pertaining to the telephone connection which are subsequently to be utilized in producing a record of the call.

During the setting up of the connection, the call recorder 2000A will transfer all of the items of record information to the ticket repeater 2300A and when the connection is completed to the called subscriber line, the director and the call recorder 2000A will be released from the connection and rendered available for additional calls. The remaining operations, including the timing of the call, the release of the connection, the operations of the toll ticket repeater 2300A, the tabulator 2800A and the record and tape punch mechanisms 2967 and 2968 to produce a record of the items of information pertaining to the above call are described in detail in the previously mentioned copending Ostline application.

The above-described telephone connection between the calling subscriber in the FLorida 3 exchange and the called subscriber in the CHase exchange was established over a direct trunk route between the exchanges. If, at the time the translator 1300 was associated with the calling director, all of the trunks in the direct trunk route are busy, the corresponding one of the all-trunks-busy relays ATB1 to ATB9 would be in its operated position. The operated position of the all-trunks-busy relay would cause the gate control circuit 1290 to block the principal route gate 1250 and to render the alternate route gate 1260 operative to respond to signals. Accordingly, the alternate route pick-up heads 1315W to 1315Z would be rendered effective to respond to the translations of the alternate routings appearing upon the associated magnetized tracks and the translations of the direct trunk routings transmitted to the principal route amplifier 1280 by either the class 1, 2 or 3 pick-up heads would be rendered ineffective. In this connection, it will be recalled that when the angular position of the drum 1311 of the translator marker 1310 is such that the first translation corresponding to the registered called office code is effective to control the principal route amplifier 1280 and the code register 1101-0, the test is made in the manner previously described to control the gate control circuit 1290 depending upon the all-trunks-busy condition of the direct trunk route. The translations appearing on the alternate route magnetizing tracks 1314W to 1314Z which pertain to the called office code digits "247" are such that the code registers 1101-1 to 1101-9 control the route digit registers in the coder 1800 portion of the director in the manner to be described below.

The first, second, third, fourth and fifth route digit registers in the coder 1800 will be operated to register respectively the route digits "48776"; the sixth route digit register will not be operated; the units digit rate register R1825 to R1828, inclusive, will register the units rate digit "5"; the TB and TC control relays R1885 and R1880 will be operated; the AB Toll conductor will be grounded to indicate that the call recorder 2000 and the detector 1900 are to be utilized in the connection for toll ticketing purposes; and the Y18 conductor will not be grounded to indicate that the tens digit of the rate of charge for the call will be the digit "0."

All of the operations which have been previously described in connection with a call from the FLorida 3 to the CHase exchange over a direct trunk route are the same for the present call except that the director will first transmit the routing digits "48776" registered in the route digit registers of the coder 1800, instead of the routing digits "45." The TB and TC control relays R1885 and R1880 will then cause the sender switch 1660 of the director to send out the digits "7234" comprising the numerical portion of the called subscriber directory number registered in the call register 1500. Accordingly, it will be seen that in order to complete a connection over an alternate trunk route from a calling subscriber in the FLorida 3 exchange to a called subscriber in the CHase exchange, the director will transmit impulses accoresponding to the digits "48776-7234."

Referring now to Figs. 2, 3 and 4 of the drawings, it will be assumed that the director 300A in the present call transmits the first routing digit "4" to the primary selector 500A and that the selector 500A selects the ticket repeater 2300A over the fourth level of its associated banks. The ticket repeater selector 2700A, individually associated with the said repeater, responds to the second routing digit "8" transmitted by the director to select the repeater 305 terminating a trunk to the EMpire 1 exchange. The third routing digit "7" transmitted by the director will be repeated by the repeater 305A over the interconnecting toll line 335 to the repeater 290 and to the associated incoming toll selector 205 in the EMpire 1 exchange. In response to the third routing digit "7," the incoming toll selector 205 selects an idle outgoing repeater, such as the repeater 285, terminating a toll line extending to the STate 8 exchange. The fourth routing digit "7" transmitted by the director over the above-traced path to the repeater 285 is repeated to the repeater 376 in the STate 8 exchange and the last-mentioned repeater repeats the fourth routing digit "7" to the incoming toll selector 377. In response to the fourth routing digit "7," the toll selector 377 selects an idle incoming selector, such as the selector 368. The director now transmits the fifth routing digit "6" to the incoming selector 368 thereby to cause the selector to select a repeater, such as the repeater 371, terminating a trunk line extending to the CHase exchange. The director 300A now transmits the four digits "7234" of the numerical portion of the called subscriber directory number and these digits are repeated by way of the repeater 371, and the repeater 372 to the incoming selector 373, which responds to the digit "7," the selector 374 responds to the digit "2" and the connector 375 responds to the digits "3" and "4." The connector 375 thereupon completes the connection to the desired called subscriber substation having the directory number CHase 7234 in a conventional manner.

In view of the foregoing, it will be understood that the connection is completed between the calling and the called subscribers over the above-traced path excluding, however, the director 300A, the translator 1300, the call recorder 2000A and the detector 1900A which have been released. The various items of information pertaining to the connection are identical to the items of information which are stored in the ticket repeater 2300A when the call is completed over a direct trunk route to the CHase exchange. The operation of the ticket repeater in timing the telephone connection and the operation of the tabulator 2800A to produce a record of the call is the same as has been described in the previously mentioned copending Ostline application.

*Failure to dial*

When the calling subscriber at substation 401 (Fig. 5) initiates a call in the manner previously described and receives the dial tone signal and thereafter fails to dial any digits of a called subscriber number, the timer 1090 (Fig. 10) of the controller 600 portion of the director will operate in the manner described in the copending Ostline application. Pulses at the rate of twelve per minute are transmitted over the conductor C1035 to the rotary magnet RM1094 whereby the wipers 1091 and 1092 are advanced one step every five seconds. At the end of the third pulse or fifteen seconds, the wiper 1091 applies ground potential to the conductor C1096 extending to Fig. 6 and then by way of the contacts 621 and 992, and the winding of the false seizure relay R770, to battery. The relay R770 operates over this circuit and, at its contacts 772, locks itself to ground at contacts 752. At its contacts 771, the relay R770 interrupts the impulsing circuit for controlling the registers in the call register 1500; at its contacts 775, it disconnects the dial tone signal from the calling subscriber line; at its contacts 774, it completes a circuit for transmitting a busy tone signal to the calling subscriber; and, finally, at its contacts 776, it completes a circuit for illuminating the false seizure lamp L666. The lamp L666 is a signal for indicating to the exchange attendant that the director has been falsely seized and if the calling subscriber fails to release the connection within a reasonable time interval, the attendant will investigate the false seizure condition and forcibly disconnect the calling subscriber line from the director. However, when the calling subscriber receives the busy signal, he will normally release the connection by hanging up the receiver of the associated telephone instrument.

*Dialing an incomplete called number*

In the foregoing description of operation it was assumed that a calling subscriber failed to dial any digit of a called number after the director was seized, and consequently, a director transmitted a busy signal to the calling subscriber after an elapse of fifteen seconds. If the calling subscriber dials three code digits designating a called exchange and these digits are registered in the first, second and third code registers in the call register 1500, the translator 1300 will be associated with the director and it will translate the registered called office code digits into appropriate routing digits and controls in the manner previously described. The director, in turn, will then attempt to set up the connection to the called office by transmitting impulses corresponding to the routing digits registered in the coder 1800 portion of the director. If it is assumed that the calling subscriber fails to dial one or more digits of the numerical portion of the directory number of the called subscriber in the called office, the timer 1090 (Fig. 10) will operate in the manner previously described. It should be noted, however, that the timer 1090 begins to count the five second pulses as soon as the director has been seized by the calling subscriber. At the end of fifteen seconds, the wiper 1091 applies ground potential to the conductor C1096, as previously noted. However, in the present call, the circuit for controlling the false seizure relay R770 is not completed at this time due to the fact that at least one digit has been dialed by the calling subscriber and registered in the call register 1500. When at least one digit has been dialed into the call register 1500, the tone control relay 620 is operated and interrupts, at its contacts 621, the circuit including the conductor C1096. Consequently, the false seizure relay R770 is disconnected from the conductor C1096 and will not operate under control of the timer 1090 at the end of the fifteen second time interval. At the end of thirty seconds, however, the wiper 1091 of the timer 1090 applies ground potential to the conductor C1097 extending to Fig. 6 and then by way of the contacts 992 and the winding of the false seizure relay R770, to battery. The false seizure relay R770 is thus operated after an elapsed time of thirty seconds to transmit a busy tone signal to the calling subscriber in the manner previously explained.

In this type of call, the translator 1300 will complete the translation of the called office code registered in the call register 1500 in the manner previously described. In response to the registration of the routing digits in the coder 1800 portion of the director, the translation complete relay R810 is operated as previously described in order to disconnect the translator 1300 from the calling director. The calling director, however, operates in a normal manner in attempting to set up the connection in accordance with the routing digits registered in the coder 1800, but the connection cannot be completed to the called subscriber line since all of the digits of the numerical portion of the called subscriber number have not been registered in the call register 1500. The switching apparatus which is operated under control of the director will remain in an operated position until the calling subscriber receives the busy tone signal and thereafter releases the connection.

From the foregoing description of operation, it should be understood that when the calling subscriber has dialed at least the first three digits of a called subscriber number, the director will operate in a normal manner in attempting to complete the connection. It will also be understood that if the subscriber fails to dial one or more of the remaining digits within approximately thirty seconds from the time the call is initiated, a busy tone signal will be automatically transmitted to the calling subscriber.

*Calls to information operator position "113" and to the long distance operator position "110"*

If a calling subscriber registers the code digits "113" designating the information operator position, these digits will be registered in the first, second and third registers 1520, 1530 and 1540 of the call register 1500 portion of the director and the translator 1300 will operate as previously noted to translate the digits "113" into appropriate routing digits whereby the call will be automatically routed to the information operator position. In the system illustrated in Fig. 3 of the drawings, it will be seen that a call can be routed to the information operator position "113" by way of the primary selector 500A and the special selector 340. Accordingly, the translator 1300 is provided with magnetized code markings corresponding to the routing digits "53" and in accordance with the code marking of the digit "0" whereby the TD control relay R1875 in the coder 1800 will be operated. Consequently, when the digit counters in the translator 1300 have counted indexing pulses corresponding to the code digits "113" registered in the coincidence detector 1100 signals corresponding to the routing digits "5" and "3" and the control digit "0" will be transmitted to the coder 1800 portion of the director in the manner previously described. In the present example, the routing digits "5" and "3" will be respectively registered on the first and second route digit registers of the coder 1800 and the TD control relay R1875 will be operated. As soon as the translation is completed, the translation complete relay R810 is operated in the manner previously described thereby to cause the disconnection of the translator 1300 from the associated director. The director will thereafter transmit impulses corresponding to the routing digits "53" registered in the coder 1800 in order to control the primary selector 500A and the special selector 340 to complete the connection to the information operator position. The TD control relay R1875 in its operated position together with the TA and the TB control relays R1890 and R1885 in their restored positions controls the send sequence switch 1650 so that any of the digits registered on the seven registers in the call register 1500 are skipped in the manner previously described. It may be well to mention at this time that since the call being described is to an operator position, no record is to be made of the call and, consequently, the translations performed by the translator 1300 is such that the rate translations normally required on a call are not provided and the AB Toll conductor will not be grounded. The AB Toll conductor must be grounded whenever it is necessary to produce a record of the items of information pertaining to a telephone connection.

If the digits "110" corresponding to the code of a long distance operator position are registered in the director by a calling subscriber, the director and the translator 1300 function in the same manner as has been described above except that the single routing digit "9" is registered in the first route register of the coder 1800 instead of the digits "53." The TD control relay R1875 is operated, as described in the above call, in order to prevent the director from sending out any of the digits which have been registered in the call register 1500. The single routing digit "9" is transmitted to the primary selector 500A thereby to cause the selector to extend the call to the long distance operator position "110." The long distance operator, upon receiving the call, will complete the connection manually over the long distance toll lines in the well-known manner.

*Call from the FLorida 3 exchange to the SUperior 5 exchange*

If a calling subscriber in the FLorida 3 exchange calls a subscriber in the SUperior 5 exchange, the code digits "785" are registered in the registers 1520, 1530 and 1540 of the call register 1500 and the four digits of the numerical portion of the subscriber's directory number will be registered in the registers 1610, 1620, 1630 and 1640 of the call register 1500. The translator 1300 will be operated in the manner previously described to register the called office code digits "785" in the coincidence detector 1100. When the indexing pulses counted by the digit counter 1370 and registered in the hundreds, tens and units counters H1120, T1130 and U1220 correspond to the digits "785" registered in the coincidence detector 1100, the angular position on the drum 1311 of the translator marker 1310 will be such that the first translation corresponding to the called office code "785" will be directly under the appropriate pick-up heads. The translations of the called office code "785" will cause the pickup heads to control the code registers 1101-0 to 1101-9 so that four routing digits "4868" are registered respectively in the first four route registers of the coder 1800. The appropriate units digit of the rate applicable to the call will be registered on the rate register relays R1825 to R1828, inclusive, and the TB control relay R1885 will be operated in accordance with the digit "8." Since the call is to be ticketed, the AB Toll conductor will be grounded in the manner previously described.

In view of the foregoing, the director will transmit switch setting impulses corresponding to the four routing digits "4868" and then impulses corresponding to the last five digits registered in the call register 1500, that is, the digit "5" registered in the register 1540 followed by the four digits of the numerical portion of the directory number registered in the register 1610, 1620, 1630 and 1640. The two called office code digits "78" registered in the call register 1500 are skipped due to the fact that the TB control relay R1885 is in its operated position.

Referring now to the trunking diagram of Figs. 2, 3 and 4, it will be seen that when the director transmits the first routing digit "4," the primary selector 500A will be operated to its fourth level thereby to select the idle toll ticket repeater 2300A, and the associated ticket repeater selector 2700A. As soon as the ticket repeater 2300A is included in the connection, a signal is automatically transmitted to the call recorder 2000A thereby to cause the call recorder to transfer various items of information stored therein to the ticket repeater 2300A in the manner explained in the previously noted copending Ostline application. The second routing digit "8" transmitted by the director will control the ticket repeater selector 2700A to select an idle outgoing repeater, such as the repeater 305, accessible in the eighth level of the associated banks. The third routing digit "6" transmitted by the director will be repeated by the repeater 305 over the interconnecting toll line 335 and the repeater 290 to the incoming toll selector 205 in the EMpire 1 exchange. The selector 205 is controlled by the third routing digit "6" to select an idle outgoing repeater, such as the repeater 280, accessible over the sixth level of its associated banks. The fourth routing digit "8" transmitted by the director over the above-traced path is repeated by the repeater 280 to the repeater 351 in the SUperior 5 exchange and the last-mentioned repeater repeats the impulses of the fourth routing digit "8" to the incoming selector 352. In response to the digit "8," the selector 352 will select an idle selector, such as the selector 353, accessible in the eighth level of its banks. The director now transmits the digit "5," registered in the third code register 1540 of the call register 1500, to the selector 353 thereby to cause the selector 353 to select an idle selector, such as the selector 354, accessible over the fifth level of its banks. The director now transmits the four digits of the numerical portion of the called subscriber number thereby to control the selector 354, the selector 355, and the connector 356 in order to complete the connection to the desired called subscriber substation in the SUperior 5 exchange. During the establishment of the above-mentioned connection, all of the items of record information pertaining to the telephone connection will have been transferred by the call recorder 2000A and the director to the toll ticket repeater 2300A and will have been released. The toll ticket repeater 2300A will time the connection and at the terminating thereof, the ticket repeater 2300A, the tabulator 2800A and associated apparatus will be controlled in the manner described in detail in the previously noted copending Ostline application to produce a record of the various items of information pertaining to the completed toll call.

*Call from the FLordia 3 exchange to the RUgby 2 exchange*

In the telephone network illustrated schematically in Fig. 1 of the drawings, it will be seen that the STate 8, SUperior 5 and RUgby 2 exchanges are located in zone 78. Each of the above-named exchanges are identified by the code digits "78" corresponding to the first two letters in the exchange names. The third digit in each case identifies the particular exchange in zone 78 to complete the three-digit code which is dialed by a calling subscriber in order to extend a connection to any one of the three exchanges. If it is assumed that the SUperior 5 and RUgby 2 exchanges serve substantially adjacent areas and that the RUgby 2 exchange may be reached via the SUperior 5 exchange as is schematicaly illustrated in Figs. 2, 3 and 4 telephone connections from the FLorida 3 exchange may be completed to the RUgby 2 exchange over the same trunk lines that were used in extending a connection from the FLorida 3 exchange to the SUperior 5 exchange.

In view of the foregoing it will be understood that the routing digits "4868" required to extend a connection from the FLorida 3 exchange to the selector 353 in the SUperior 5 exchange may also be utilized when calls are to be extended to the RUgby 2 exchange.

In view of the foregoing, the registration of the three code digits "782" of the RUgby 2 exchange in the call register 1500 portion of the director in the FLorida 3 exchange will cause the translator 1300 to make the same translations as were made when the called office code digits "785" of the SUperior 5 exchange were registered in the call register 1500. Consequently, the routing digits "4868" transmitted by the director will extend a connection over the previously traced path including the primary selector 500A, the ticket repeater 2300A, the ticket repeater selector 2700A, the repeater 305, the repeater 290, the incoming toll selector 205, the repeater 280, the repeater 351, the incoming selector 352 and the selector 353 in the SUperior 5 exchange. The director now transmits the digits registered in the last five registers in the call register 1500, since the first two registers 1520 and 1530 are skipped under control of the operated TB control relay R1885. The third called office code digit "2" registered in the third code register 1540 is now transmitted, and the selector 353 is operated to select an idle repeater, such as the repeater 358, terminating in the second level of its associated banks. The director now transmits the remaining four digits of the numerical portion of the called subscriber directory number by way of the repeater 358 to the repeater 361 in the RUgby 2 exchange in order to control the incoming selector 362, the selector 363, and the connector 364 to complete the connection to the desired called subscriber substation. The remaining operations of the apparatus in the FLorida 3 exchange whereby a record is produced of the various items of information pertaining to the telephone connection are described in detail in the previously noted copending Ostline application.

*The EMpire 1 exchange apparatus*

Referring now to the trunking diagram of the telephone system schematically illustrated in Figs. 2, 3 and 4 of the drawings it will be seen that the apparatus provided in the EMpire 1 exchange is substantially the same as the apparatus incorporated in the FLorida 3 exchange. However, the FLorida 3 exchange is provided with facilities for automatically producing a permanent record of the items of information pertaining to short haul toll calls and, therefore, includes the call recorder 2000A, the detector 1900A, the toll ticketing repeater 2300A, the toll ticket selector 2700A, the tabulator 2800A, the tabulator allotter 2801A, the record tape punch mechanism 2967 and the ticket tape punch mechanism 2968. The detail circuits of the above-named apparatus are shown in Figs. 19 to 31, inclusive, of the above-noted copending Ostline application. The EMpire 1 exchange, however, is arranged for director operation but no facilities are provided for producing records of short haul toll calls. This apparatus may be added to the EMpire 1 exchange at some future date, in which event it will correspond to the apparatus provided in the FLorida 3 exchange.

In view of the foregoing, it will be understood that all of the calls originating in the EMpire 1 exchange will utilize a director and a translator of the type illustrated in Figs. 6 to 18 in the present application to establish connections with any other exchanges included in the network. However, no record will be made of such connections. The translator, such as the translator 1300B, provided in the EMpire 1 exchange will translate called office code digits in the same manner as has been described above in connection with the detail operation of the translator 1300. However, since no record is to be produced of the telephone connections, the translator 1300B need only transmit the necessary routing digits and the necessary TA, TB, TC and TD relay controls to the coder 1800 portion of the director in the EMpire 1 exchange. When recording apparatus is added to the exchange equipment appropriate alterations may be made in the magnetizing tracks on the drum 1311 of the translator marker 1310 whereby translations will be made to cause records to be produced of short haul toll calls.

*Conclusion*

The translator 1300 illustrated in the present application is arranged to provide ten separate digital translations for each three-digit called office code and, therefore, was provided with a ten stage flip-flop digit counter 1370. If it is necessary to increase or decrease the number of digital translations to be made for any three-digit code, the number of stages in the flip-flop digital counter 1370 must be increased or decreased accordingly. In any event when the digit counter 1370 completes a cycle by counting down through each of its stages, the units digit counter U1220 must be operated in the manner described. Thus, it will be seen that the digit counter 1370 may be altered to count any number of pulses instead of merely ten, as illustrated, while still maintaining the hundreds, tens and units counters on a ten count decimal basis. The translations made by the translator, control the marking of a decimal number on four leads by marking one or two of the leads in accordance with any number from "1" to "0," inclusive. This arrangement may also be modified by registering the various digits in any suitable numerical form, such as binary, decimal or duodecimal. Various other modifications may be made in the translator 1300 which are within the true spirit and scope of the invention.

What is claimed is:

1. In a telephone system including a calling line, a called line having a given directory number, automatic switching apparatus, and a register mechanism operative to register said given directory number transmitted over said calling line and to register predetermined control signals transmitted thereto and to operate said switching apparatus in accordance with said control signals and at least a portion of said given directory number to set up a connection from said calling line to said called line; translator mechanism comprising means for registering a number corresponding to a predetermined portion of said given directory number as registered in said register mechanism, cyclically operating means including a magnetized member for generating control signals corresponding to a translation of said registered number during a predetermined portion of each operating cycle, a digit counting device operated through a counting cycle during each cycle of operation of said cyclically operating means, and means controlled jointly by said number registering means and said counting device at the time said predetermined portion of said operating cycle is reached by said cyclically operating means for transmitting said control signals to said register mechanism.

2. In a telephone system including a calling line, a called line having a given directory number, automatic switching apparatus, and a register mechanism operative to register said given directory number transmitted over said calling line and to register predetermined control signals transmitted thereto and to operate said switching apparatus in accordance with said control signals and at least a portion of said given directory number to set up a connection from said calling line to said called line; translator mechanism comprising a member having magnetized thereon control signals representing translations of different numbers, means cooperating with said member for transmitting said control signals representing translations of different numbers one after the other, means controlled by said register mechanism for registering a particular number corresponding to a predetermined portion of said directory number as registered in said register mechanism, and means governed in accordance with the particular number registered in said last-mentioned means for transmitting to said register mechanism only said control signals representing the translation of said particular number.

3. In a telephone system including a calling line, a called line having a given directory number, automatic switching apparatus, and a register mechanism operative to register said given directory number transmitted over said calling line and to register predetermined control signals transmitted thereto and to operate said switching apparatus in accordance with said control signals and at least a portion of said given directory number to set up a connection from said calling line to said called line; translator mechanism comprising means for registering a number corresponding to a predetermined portion of said given directory number as registered in said register mechanism, cyclically operating means including a magnetized member for generating control signals corresponding to a translation of said registered number during a predetermined portion of each operating cycle, a digit counting device operated through a counting cycle during each cycle of operation of said cyclically operating means, means operated responsive to the operation of said digit counting device to count digits corresponding to the digits in said registered number for transmitting said control signals to said register mechanism.

4. In a telephone system including a calling line, a called line having a given directory number, automatic switching apparatus, and a register mechanism operative to register said given directory number transmitted over said calling line and to register predetermined control signals transmitted thereto and to operate said switching apparatus in accordance with said control signals and at least a portion of said given directory number to set up a connection from said calling line to said called line; a translator, means for associating said translator and said register mechanism responsive to the registration of certain of the digits of said directory number in said register mechanism, means for re-registering said certain digits of said directory number as registered in said register mechanism in response to said association, a counting device, a magnetic storage device, means controlled by said storage device for operating said counting device intermittently to register digits of a number, control conductors, means controlled by said magnetic storage device for transmitting control signals over said control conductors to said register mechanism, a gate device normally blocking transmission of said control signals over said control conductors, means controlled responsive to the registration in said counting device of the digits of a number corresponding to the said certain digits registered in said reregister means for unblocking said gate device, and means controlled thereafter by said counting device and said gate device and said storage device for governing the number of said control signals transmitted over said control conductors to said register mechanism.

5. In a telephone system including a calling line, a called line having a given directory number including code digits indicative of the called exchange terminating said called line and numerical digit indicative of said called line in said called exchange, automatic switching apparatus, and a register mechanism operative to register the code and numerical digits of said given directory number transmitted over said calling line and to register predetermined control signals transmitted thereto and to operate said switching apparatus in accordance with said control signals and at least a portion of said given directory number to set up a connection from said calling line to said called line; translator mechanism comprising means for reregistering said code digits of said called line directory number, cyclically operating means including a magnetized member for generating control signals corresponding to a translation of said reregistered code digits during a predetermined portion of each operating cycle, a digit counting device operated through a counting cycle during each cycle of operation of said cyclically operating means, and means controlled by said digit counting device responsive to the operation thereof to count digits corresponding to said reregistered code digits for transmitting said control signals to said register mechanism.

6. In a telephone system including a calling line, a called line having a given directory number including code digits indicative of the called exchange terminating said called line and numerical digits indicative of said called line in said called exchange, automatic switching apparatus, and a register mechanism operative to register the code and numerical digits of said given directory number transmitted over said calling line and to register predetermined control signals transmitted thereto and to operate said switching apparatus in accordance with said control signals and at least a portion of said given directory number to set up a connection from said calling line to said called line; translator mechanism comprising a register operated to reregister said code digits of said directory number as registered in said register mechanism, cyclically operating means including a magnetized member for generating control signals corresponding to a translation of said reregistered code digits during a predetermined portion of each operating cycle, a digit counting device, means governed by said cyclically operating means during each cycle of operation for controlling said digit counting device to count a predetermined number of digits, and means controlled by said digit counting device in response to counting the particular digits corresponding to said registered code digits for transmitting said generated control signals corresponding thereto to said register mechanism.

7. In a telephone system including a calling line, a called line having a given directory number, switching apparatus, and a register mechanism operative to register said given directory number transmitted over said calling line and to register routing digits and a rate of digit transmitted thereto and to operate said switching apparatus in accordance with said routing digits and at least a portion of said given directory number to set up a connection from said calling line to said called line and for establishing a charge for said connection in accordance with said rate digit; translator mechanism comprising means for registering a number corresponding to a predetermined portion of said given directory number as registered in said register mechanism, cyclically operating means including a magnetized member for generating routing digits and a rate digit corresponding to a translation of said registered number during a predetermined portion of each operating cycle, a digit counting device operated through a counting cycle during each cycle of operation of said cyclically operating means, and means controlled jointly by said number registering means and said counting device at the time said predetermined portion of said operating cycle is reached by said cyclically operating means for transmitting said routing digits and said rate digit to said register mechanism.

8. In a telephone system including a calling line, a called line having a given directory number, automatic switching apparatus, and a register mechanism operative to register said given directory number transmitted over said calling line and to register routing digits and a rate digit transmitted thereto and to operate said switching apparatus in accordance with said routing digits and at least a portion of said given directory number to set up a connection from said calling line to said called line and for establishing a charge for said connection in accordance with said rate digit; translator mechanism comprising means for registering a number corresponding to a predetermined portion of said given directory number as registered in said register mechanism, cyclically operating means for generating routing digits and a rate digit corresponding to a translation of said registered number during a predetermined portion of each operating cycle, a vacuum tube digit counting device operated through a counting cycle during each cycle of operation of said cyclically operating means, a vacuum tube control device normally in blocked condition, means controlled jointly by said number registering means and said counting device only during said predetermined portion of said operating cycle of said cyclically operating means for unblocking said vacuum tube control device, and means including said vacuum tube control device operated in accordance with said routing digits and said rate digit generated during said predetermined portion of said operating cycle for transmitting corresponding routing and rate digits to said register mechanism.

9. In a telephone system including a calling line, a called line having a given directory number, switching apparatus, and a register mechanism operative to register said given directory number transmitted over said calling line and to register one or more routing digits and a control digit transmitted thereto and to operate said switching apparatus in accordance with said routing digit or digits and the portion of said given directory number determined by said control digit to set up a connection from said calling line to said called line; translator mechanism comprising a member having magnetically recorded thereon routing digits and control digits representing translations of different numbers, means for transmitting the routing digits and the control digit representing the translations of said different numbers one after the other, means for registering a particular number corresponding to a predetermined portion of said directory number as registered in said register mechanism, and means governed in accordance with the registration of said particular number in said last-mentioned means for transmitting to said register mechanism only said routing digit or digits and said control digit representing the translation of said particular number.

10. In a telephone system including a calling line, a called line having a given directory number, switching apparatus, and a register mechanism operative to register said given directory number transmitted over said calling line and to register routing digits and a control digit transmitted thereto and to operate said switching apparatus in accordance with said routing digits and the portion of said given directory number determined by said registered control digit to set up a connection from said calling line to said called line; a translator, means for associating said translator and said register mechanism responsive to the registration of certain of the digits of said directory number in said register mechanism, means for reregistering said certain digits of said directory number as registered in said register mechanism in response to said association, a counting device, a continuously operating storage device, means controlled by said storage device for operating said counting device intermittently to register digits of a number, control conductors, means controlled by said storage device for transmitting routing digits and a control digit corresponding to a translation of any number registrable in said reregister means over said control conductors to said register mechanism, a gate device normally blocking transmission of said translations to said register mechanism, means controlled responive to the registration in said counting device of the digits of a number matching said certain digits registered in said reregister means for unblocking said gate device, and means controlled thereafter by said counting device and said gate device and said storage device for transmitting over said control conductors to said register mechanism only the routing digits and the control digit corresponding to a predetermined translation of said certain digits registered in said reregister means.

11. In a telephone system including calling lines of different classes, a called line having a given directory number, switching apparatus, a register mechanism operative to register said given directory number transmitted over a calling one of said lines and to register the class of said one calling line and to register predetermined control signals transmitted thereto and to operate said switching apparatus in accordance with said control signals and at least a portion of said given directory number to set up a connection from said one calling line to said called line; translator mechanism comprising means for registering a number corresponding to a predetermined portion of said given directory number as registered in said register mechanism, means for registering the class of said one calling line, cyclically operating means for simultaneously generating a plurality of different groups of control signals during a predetermined portion of each operating cycle, each group of said control signals corresponding respectively to a different translation of said registered number, means controlled by said class registering means and governed in accordance with the class of said one calling line for selecting one of groups of control signals, a digit counting device operated through a counting cycle during each cycle of operation of said cyclically operating means, and means controlled jointly by said number registering means and said counting device at the time said predetermined portion of said operating cycle is reached by said cyclically operating means for transmitting said selected group of control signals to said register mechanism.

12. In a telephone system including calling lines of different classes, a called line having a given directory number, switching apparatus, and a register mechanism operative to register said given directory number transmitted over a calling one of said lines and to register the class of said one calling line and to register predetermined control signals transmitted thereto and to operate said switching apparatus in accordance with said control signals and at least a portion of said given directory number to set up a connection from said one calling line to said called line; translator mechanism comprising means for registering a number corresponding to a predetermined portion of said given directory number as registered in said register mechanism, means for registering the class of said one calling line as registered in said register mechanism, cyclically operating means for simultaneously generating different groups of control signals for each of said different classes of calling lines during a predetermined portion of each operating cycle, each of said different groups of control signals corresponding respectively to a different translation of said registered number, means for selecting the particular group of control signals in accordance with the class of the calling line registered in said class register, and means controlled jointly by said number registering means and said counting device at the time said predetermined portion of said operating cycle is reached by said cyclically operating means for transmitting to said register mechanism said selected group of control signals.

13. In a telephone system including calling lines of different classes, a called line having a given directory number, switching apparatus, and a register mechanism operative to register said given directory number transmitted over a calling one of said lines and to register the class of said one calling line and to register routing digits and a control digit transmitted thereto and to operate said switching apparatus in accordance with said routing digits and a portion of said given directory number determined by said control digit to set up a connection from said one calling line to said called line; translator mechanism comprising means for registering a number corresponding to a predetermined portion of said given directory number as registered in said register mechanism, means for registering the class of said one calling line as registered in said register mechanism, cyclically operating means for simultaneously generating different groups of routing digits and control digits during a predetermined portion of each operating cycle, each group of routing digits and control digits corresponding respectively to a different translation of said registered number for the different classes of calling lines, means controlled by said class registering means and governed in accordance with the class of said one calling line for selecting the one of said translations corresponding thereto, a digit counting device operated through a counting cycle during each cycle of operation of said cyclically operating means, and means controlled jointly by said number registering means and said counting device at the time said predetermined portion of said operating cycle is reached by said cyclically operating means for transmitting only said group of routing digits and said control digit of said selected translation to said register mechanism.

14. In a telephone system including a calling office, a called office having a given code designation, an intermediate office, switching mechanism located in said calling office, a group of direct paths extending from said switching mechanism to said called office, a group of indirect paths extending from said switching mechanism through said intermediate office to said called office, a register mechanism for registering said called office code designation and control signals transmitted thereto and for controlling said switching mechanism to select a path to said called office in accordance with said control signals to set up a connection from said calling office to said called office; translator mechanism comprising means for registering said called office code designation as registered in said register mechanism, cyclically operating means for generating first and second groups of control signals during a predetermined portion of each operating cycle, said first and second groups of control signals corresponding respectively to a direct path translation and an indirect path translation of said called office code, a digit counting device operated through a counting cycle during each cycle of operation of said cyclically operating means, a first gate circuit controllable by said first group of control signals and normally in a blocked condition, a second gate circuit controllable by said second group of control signals and normally in a blocked condition, means controlled jointly by said code register means and said counting device at the time said predetermined portion of said operating cycle is reached by said cyclically operating means for unblocking said first gate circuit and for transmitting said first and said second groups of control signals to said gate circuits, a direct path group test device operative only in the event all of the paths in said group of direct paths are busy for blocking said first gate circuit and for unblocking said second gate circuit, and means controlled by the unblocked one of said gate circuits for transmitting the corresponding group of control signals to said register mechanism.

15. In a telephone system including a calling office, a called office having a given code designation, an intermediate office, switching mechanism located in said calling office, a group of direct paths extending from said switching mechanism to said called office, a group of indirect paths extending from said switching mechanism through said intermediate office to said called office, a register mechanism for registering said called office code designation and control signals transmitted thereto and for controlling said switching mechanism to select a path to said called office in accordance with said control signals to set up a connection from said calling office to said called office; translator mechanism comprising means for registering said called office code designation as registered in said register mechanism, cyclically operating means for transmitting first and second groups of control signals during a predetermined portion of each operating cycle, said first and second groups of control signals corresponding respectively to a direct path translation and an indirect path translation of said called office code, a digit counting device operated through a counting cycle during each cycle of operation of said cyclically operating means, a first gate circuit normally blocking transmission of said first group of control signals, a second gate circuit normally blocking transmission of said second group of control signals, means controlled jointly by said code register means and said counting device at the time said predetermined portion of said operating cycle is reached by said cyclically operating means for unblocking said first gate circuit in order to render the same responsive to control signals in said first group transmitted thereto, a tester for said group of direct paths operated only in the event all of the paths in said direct group are busy, means controlled in the event said tester is operated at the time said first gate circuit responds to the first control signal transmitted thereto for again blocking said first gate circuit and for unblocking said second gate circuit, and means controlled thereafter by the unblocked one of said gate circuits for transmitting the corresponding group of control signals to said register mechanism.

16. In a translation device, a member having magnetically recorded thereon code signals representing translations of different numbers, sensing means positioned adjacent said member, means for moving said member and said sensing means relative to each other in order to control said sensing means to continuously transmit said code signals representing the translations of said different numbers one after the other, a translation register, a first register, means for operating said first register to register a particular number, and means thereafter controlled by said operated first register and said sensing means for operating said translation register to register only the said code signals representing the translation of said particular number registered in said first register.

17. In a translation device, a continuously moving member having magnetized thereon separate groups of code signals respectively representing translations of certain numbers, transmitter means positioned adjacent said member operated to transmit said groups of code signals one after the other during movement of said member, a translation register, a first register, means for operating said first register to register any one of said certain numbers, and means controlled responsive to the registration of one of said certain numbers in said first register for controlling said translation register to register only the transmitted group of code signals representing the translation of said number registered in said first register.

18. In a translating device, a register operative to register any plural digit number comprising a predetermined number of digits, a signal path, a continuously operating transmitter including a magnetized member for transmitting over said signal path a translation of every number registrable in said register during each cycle of operation, each of said translations comprising one or more signals, means included in said signal path for normally blocking transmission thereover of said translations, and means controllable during a single cycle of operation of said transmitter responsive to the registration in said register of a particular plural digit number for rendering said blocking means ineffective to block the transmission over said signal path of the translation of said particular registered number.

19. In a translation device, a register operative to register any plural digit number comprising a predetermined number of digits, a signal path, a continuously operating transmitter including a magnetized member for sequentially transmitting over said signal path an individual predetermined control number comprising one or more digits for each plural digit number registrable in said register, means included in said signal path for normally blocking transmission thereover of any of the digits of any control number in the event said register is in a non-operated condition, and means controlled responsive to the registration of a particular plural digit number in said register for rendering said transmission blocking means ineffective only during the interval of time said transmitter is transmitting over said signal path the particular predetermined control number individual to said registered plural digit number.

20. In a translation device, a register operative to register any plural digit number comprising a predetermined number of digits, a signal path, a continuously operating transmitter including a magnetized member for sequentially transmitting over said signal path an individual predetermined control number comprising one or more digits for each number registrable in said register, repeating means connected to said signal path operative to repeat said control numbers transmitted thereto over said signal path, means for normally blocking said repeating means from repeating any of the digits of a control number transmitted thereto over said signal path in the event said register is in a non-operated condition, means controlled by said register responsive to the registration therein of a particular plural digit number for rendering said blocking means ineffective only during the interval of time said transmitter is transmitting over said signal path the particular predetermined control number individual to said registered particular plural digit number, and means controlled by said repeating means for registering only the digit or digits comprising said particular predetermined control number transmitted over said signal path during the time said blocking means is rendered ineffective.

21. In a translator mechanism, a first digit register, means for operating said first digit register to register a digit, a first digit counter, a second digit counter, a device, means including said device for generating indexing signals, means including said device for generating control signals, means controlled by said indexing signals for operating said first digit counter to count each of said indexing signals, means controlled by said first digit counter each time a predetermined number of said indexing pulses are counted for operating said second digit counter to count a digit, a second digit register, means controlled by said second digit counter in response to the counting of a digit corresponding to the digit registered in said first digit register for rendering said second digit register responsive to said control signals, and means in said second digit register for registering said control signals.

22. In a translator mechanism, a first digit register, means for operating said first digit register to register a digit, a first digit counter, a second digit counter, a device, means including said device for generating indexing signals, means including said device for generating control signals, means controlled by said indexing signals for operating said first digit counter to count each of said indexing signals, means controlled by said first digit counter each time a predetermined number of said indexing pulses are counted for operating said second digit counter to count a digit, a second digit register, means controlled by said second digit counter in response to the counting of a digit corresponding to the digit registered in said first digit register for rendering said second digit register responsive to said control signals, means controlled thereafter controlling said second register to respond to at least as many control signals transmitted thereto as there are indexing pulses in said predetermined number of indexing pulses, and means in said second digit register for registering said control signals.

23. In a translator mechanism, a first digit register, means for operating said first digit register to register a digit, a first digit counter, a second digit counter, a device, means including said device for generating indexing signals, means including said device for generating control signals, means controlled by said indexing signals for controlling said first digit counter to count each of said indexing signals, means controlled by said first digit counter each time a predetermined number of indexing pulses are counted for operating said second digit counter to count a digit, a second digit register, means controlled by said second digit counter in response to the counting of a digit corresponding to the digit registered in said first digit register for rendering said second digit register responsive to said control signals, and means in said second digit register thereafter controlled by said first digit counter and said control signals for registering at least as many of said control signals as there are indexing pulses in said predetermined number of said indexing pulses.

24. In a translator mechanism, a first register operated to register a particular number, a device, means in said device for transmitting indexing signals, means in said device for transmitting control signals corresponding to translations of any number registrable on said first register, a first counter operated to count each of said indexing signals, a second counter, means controlled by said first counter each time a predetermined number of indexing pulses are counted for operating said second counter to register a check number indicative of the number of times said predetermined number of indexing pulses are counted by said first counter, a second register, means controlled by said second counter in response to the operation thereof to register a check number corresponding to the particular number registered in said first register for rendering said second register responsive to said control signals, and means in said second register for registering each control signal transmitted thereto during the counting of a predetermined number of indexing pulses by said first counter in order to register in said second register only the control signals corresponding to a translation of said particular number registered in said first register.

25. In a translation device, a first register for registering any plural digit number comprising a predetermined number of digits, a member having stored thereon signals corresponding to digital translations individual to each of said numbers, pick-up means, a second register, a control device, means continuously to move said member through the field of said pick-up means in order continuously to transmit said stored signals to said control device, means normally conditioned to block operation of said control device by said signals, means for operating said first register to register a particular plural digit number, means controlled during movement of said member for rendering said blocking means ineffective to block said control device at the instant the first of said stored signals corresponding to the digital translations individual to said particular number reaches the field of said pick-up means, and means thereafter controlled by said control device in response to the operation thereof by said stored signals for controlling said second register to register all of said stored signals corresponding to the digital translations individual to said particular number.

26. In a translation device, a first register for registering any plural digit number comprising a predetermined number of digits, a member having stored thereon coded signals corresponding to digital translations individual to each of said numbers, pick-up means, a second register, means continuously to move said member through the field of said pick-up means in order to transmit said stored signals to said second register, means normally conditioned to block transmission of said signals to said second register, means for operating said first register to register a particular plural digit number, means controlled during movement of said member for maintaining said transmission blocking means in said normal condition and for rendering the same ineffective at the instant the first of the stored signals corresponding to the digital translations individual to said particular number reached the field of said pick-up means, means for controlling said second register to register all of said coded signals corresponding to the digital translations individual to said particular number, and means controlled at the instant the last of the stored signals corresponding to the digital translations individual to said particular number is moved past the field of said pick-up means for returning said transmission blocking means to said normal condition.

27. In a translator, an indexing conductor, a set of signal conductors, means for transmitting indexing pulses over said indexing conductor and for simultaneously transmitting coded signals over said set of signal conductors, a first register, a gate circuit terminating said signal conductors and operative in accordance with each of said coded signals transmitted thereover for controlling said first register, means blocking operation of said gate circuit, a first counting device operated to count said indexing pulses transmitted over said indexing conductor, a second counting device, means controlled by said first counting device each time it counts a predetermined number of said indexing pulses for operating said second counting device, a second register, a plurality of marking conductors, means controlled by said second counting device for marking said marking conductors in accordance with a number indicative of the number of times said prdetermined number of indexing pulses have been counted, means for registering a particular number in said second register, means controlled in response to the marking of said marking conductors in accordance with the number corresponding to said particular number registered in said second register for controlling said blocking means in order to render said gate circuit operative to respond to each coded signal thereafter transmitted over said signal conductors, and means controlled by the operation of said gate circuit for registering said coded signals in said first register.

28. In a translator, an indexing conductor, a set of signal conductors, means for transmitting indexing pulses over said indexing conductor and for simultaneously transmitting coded signals over said set of signal conductors, a first register, a gate circuit terminating said signal conductors and operative in accordance with each of said coded signals transmitted thereover for controlling said first register, means blocking operation of said gate circuit, a first counting device operated to count said indexing pulses transmitted over said indexing conductor, a second counting device, means controlled by said first counting device each time it counts a predetermined number of said indexing pulses for operating said second counting device, a second register, a plurality of marking conductors, means controlled by said second counting device for marking said marking conductors in accordance with a number indicative of the number of times said predetermined number of indexing pulses have been counted, means for registering a particular number in said second register, means controlled in response to the marking of said marking conductors in accordance with the number corresponding to said particular number registered in said second register for controlling said blocking means in order to render said gate circuit operative to respond to each coded signal thereafter transmitted over said signal conductors, and means in said first register controlled jointly by said first counting device and said gate circuit for registering said coded signals.

29. In a translator, an indexing conductor, a set of signal conductors, means for transmitting indexing pulses over said indexing conductor and for simultaneously transmitting coded signals over said set of signal conductors, a first register, a gate circuit terminating said signal conductors and operative in accordance with each of said coded signals transmitted thereover for controlling said first register, means blocking operation of said gate circuit, a first counting device operated to count said indexing pulses transmitted over said indexing conductor, a second counting device, means controlled by said first counting device each time it counts a predetermined number of said indexing pulses for operating said second counting device, a second register, a plurality of marking conductors, means controlled by said second counting device for marking said marking conductors in accordance with a number indicative of the number of times said predetermined number of indexing pulses have been counted, means for registering a particular number in said second register, means controlled in response to the marking of said marking conductors in accordance with the number corresponding to said particular number registered in said second register for controlling said blocking means in order to render said gate circuit operative to respond to each coded signal thereafter transmitted over said signal conductors, a predetermined number of control conductors, means controlled by said first counting device for successively marking said control conductors one at a time as each of said indexing pulses is counted, and means in said first register controlled in response to the successive markings on said control conductors for rendering said first register operative to successively register said coded signals in accordance with the operations of said gate circuit.

30. In a translator, an indexing conductor, a set of signal conductors, means for transmitting indexing pulses over said indexing conductor and for simultaneously transmitting coded signals over said set of signal conductors, a first register, a gate circuit terminating said signal conductors and operative in accordance with each of said coded signals transmitted thereover for controlling said first register, means blocking operation of said gate circuit, a first counting device operated to count said indexing pulses transmitted over said indexing conductor, a second counting device, means controlled by said first counting device each time it counts a predetermined number of said indexing pulses for operating said second counting device, a second register, a plurality of marking conductors, means controlled by said second counting device for marking said marking conductors in accordance with a number indicative of the number of times said predetermined number of indexing pulses have been counted, means for registering a particular number in said second register, means controlled in response to the marking of said marking conductors in accordance with the number corresponding to said particular number registered in said second register for controlling said blocking means in order to render said gate circuit operative to respond to each coded signal thereafter transmitted over said signal conductors, a predetermined number of control conductors, means controlled by said first counting device for successively marking said control conductors one at a time as each of said indexing pulses is counted, a predetermined number of sub-registers in said first register successively rendered operative in response to the successive markings on said control conductors, and means jointly controlled by the markings on said control conductors and the operation of said gate circuit for sequentially registering in successive ones of said sub-registers a coded signal each time an indexing pulse in said predetermined number of indexing pulses is counted.

31. In a translator, an indexing conductor, a set of signal conductors, means for transmitting indexing pulses over said indexing conductor and for simultaneously transmitting coded signals over said set of signal conductors, a first register, a gate circuit terminating said signal conductors and operative in accordance with each of said coded signals transmitted thereover for controlling said first register, means blocking operation of said gate circuit, a first counting device operated to count said indexing pulses transmitted over said indexing conductor, a second counting device, means controlled by said first counting device each time it counts a predetermined number of said indexing pulses for operating said second counting device, a second register, a plurality of marking conductors, means controlled by said second counting device for marking said marking conductors in accordance with a number indicative of the number of times said predetermined number of indexing pulses have been counted, means for registering a particular number in said second register, means controlled in response to the marking of said marking conductors in accordance with the number corresponding to said particular number registered in said second register for controlling said blocking means in order to render said gate circuit operative to respond to each coded signal thereafter transmitted over said signal conductors, a predetermined number of control conductors, means controlled by said first counting device for successively marking said control conductors one at a time as each of said indexing pulses is counted, means in said first register controlled in response to the successive markings on said control conductors for rendering said first register operative to successively register coded signals in accordance with the operation of said gate circuit, and means in said second register effective in response to the markings of said marking conductors in accordance with a different number than said particular number registered in said second register for again controlling said blocking means to block operation of said gate circuit.

32. In a translator, an indexing conductor, a set of signal conductors, means for transmitting indexing pulses over said indexing conductor and for simultaneously transmitting a coded signal over said set of signal conductors each time an indexing pulse is transmitted, a gate circuit terminating said signal conductors and controllable in accordance with each of said coded signals transmitted thereover, a coincidence detector blocking operation of said gate circuit, a fractional counter operated to register said indexing pulses, a digit counting device comprising a units digit and a tens digit register, means controlled by said fractional counter each time a predetermined number of said indexing pulses are registered therein for operating said digit counting device, a first register, units digit and tens digit marking conductors, means controlled by the units digit and tens digit register in said digit counting device for respectively marking said marking conductors in accordance with the units and tens digits of the number indicative of the number of times said predetermined number of indexing pulses have been counted by said fractional counter, means for operating said first register to register a plural digit number, means controlled in response to the marking of said marking conductors in accordance with the respective units and tens digits of a number corresponding to said plural digit number registered in said first register for controlling said coincidence detector to unblock said gate circuit, and means controlled by the operation of said gate circuit for registering each of said coded signals transmitted during the time said marking conductors are marked in accordance with the units and tens digits of said number corresponding to said plural digit number registered in said first register.

33. In a translator mechanism cyclically operating means for transmitting a predetermined number of groups of indexing pulses during each cycle of operation and for transmitting control signals corresponding to predetermined translations of different plural digit numbers as each group of indexing pulses are counted, a fractional counter, means controlled by said indexing pulses for operating said fractional counter to register each indexing pulse in each of said groups of indexing pulses, a digit counter, means controlled by said fractional counter each time a group of said indexing pulses are counted for operating said digit counter to register digits indicative of the number of the group of said indexing pulses counted by said fractional counter, a first register, means for operating said first register to register one of said plural digit members, a second register operative to register control signals corresponding to a translation of the plural digit number registered in said first register, a coincidence detector governed in accordance with the digits registered in said digit counter for blocking operation of said second register in the event that the digits registered in said digit counter do not coincide with said plural digit number registered in said first register and for rendering said second register operative in the event the digits registered in said digit counter coincide with said plurality digit number registered in said first register, and means thereafter controlled by said fractional counter as it counts a group of said indexing pulses for operating said second register to register only the said control signals corresponding to the predetermined translation of said one plural digit number registered in said first register.

34. In a translation device, a first register operative to register any plural digit number comprising a predetermined number of digits, a second register, a gate circuit, a continuously operated transmitter, means including said transmitter for transmitting to said gate circuit a translation of every number registrable in said first register during each cycle of operation of said transmitter, each of said translations comprising one or more digits, blocking means normally preventing said gate circuit from responding to any of the translations transmitted thereto, means for operating said first register to register a particular one of said numbers, means controlled thereafter during a single operating cycle of said transmitter for rendering said blocking means ineffective in order to permit said gate circuit to respond only to the translation of said one particular number registered in said first register, and means controlled by said gate circuit for operating said second register to register only the digit or digits of the translation corresponding to said one particular number registered in said first register.

35. In a translation device, a number register for registering any plural digit number having a predetermined number of digits, a recording device having recorded thereon coded signals comprising a multidigit translation of each number registrable in said register, a plurality of code conductors, means including said recording device continuously transmitting sequentially said coded signal translations for each registrable number in a predetermined order, a code signal register, control means terminating said code conductors and operative in accordance with said code signals, means normally preventing operation of said control means, means for operating said number register to register a particular one of said plural digit numbers, means including said operated number register for controlling said preventing means to permit operation of said control means only during the interval that the coded signals of the translation of said particular number registered in said number register are being transmitted, and means controlled by the operation of said control means for registering said last named translation in said code signal register.

36. In a translation device, a number register for registering any plural digit number having a predetermined number of digits, a magnetic recording device having recorded thereon magnetized spots constituting coded signals comprising a multidigit translation of each number registrable in said register, a plurality of code conductors, means including said recording device continuously transmitting sequentially said coded signal translations for each registrable number in a predetermined order, a code signal register, a vacuum tube controller terminating said conductors and operative in accordance with said code signals to control said code signal register, a blocking potential normally preventing operation of said vacuum tube controller, means for operating said number register to register a particular number, a digit counter, means including said magnetic recording device for transmitting a digit pulse to said digit counter each time a translation of a registrable number is transmitted, means governed by said digit counter in response to the counting of the digit pulse corresponding to said particular registered number for removing said blocking potential from said vacuum tube controller thereby to permit said vacuum tube controller to operate in accordance with the coded signals corresponding to the particular translation of said particular number registered in said number register, and means controlled by the operation of said vacuum tube controller for registering said particular translation in said code signal register.

37. In a translation device, a cyclically operating device for generating code signals corresponding to predetermined translations of different plural digit numbers and for generating a predetermined number of indexing signals during each cycle of operation, a first counting device operated to count each indexing signal generated by said device, digit pulse means controlled by said first counting device each time it counts a certain number of said indexing pulses for transmitting a digit pulse, a second counting device operated to count each of said digit pulses, a gate circuit operative at certain times to respond to code signals generated by said device, a first control device normally blocking operation of said gate circuit, a second control device controllable by said second counting device for normally blocking operation of said gate circuit, a first register, means for operating said first register to register one of said plural digit numbers, pick-up means controlled responsive to the registration of said one number in said first register for conditioning said first control device to respond to said first counting device, means controlled thereafter by said first counting device in response to the completion of the counting of the said certain number of indexing pulses for rendering said first control device ineffective to block said gate circuit, means controlled by said second counting device in response to counting a number of digit pulses equal to said one plural digit number registered in said first register for rendering said second control device ineffective to block said gate circuit, means for thereafter operating said gate circuit in accordance with the code signals corresponding to the translation of said one plural digit number, and a code signal register controlled in accordance with the operations of said gate circuit to register said code signals.

38. In a translator mechanism, cyclically operating means for transmitting a predetermined number of groups of indexing pulses during each cycle of operation and for transmitting a synchronizing pulse at the beginning of each cycle of operation, a fractional counter, means controlled by said indexing pulses for operating said fractional counter to register each of said indexing pulses in each of said groups, a digit counter, means controlled by said fractional counter each time it counts a group of said indexing pulses for operating said digit counter to register a digit indicative of the number of the group of indexing pulses counted by said fractional counter, and means controlled by said synchronizing pulse for restoring said fractional counter and said digit counter to normal at the beginning of each new operating cycle of said cyclically operating means in order to synchronize said counters with said cyclically operating means at the beginning of each cycle.

39. In a translation device, a number register for registering any plural digit number having a predetermined number of digits, a recording device having recorded thereon a first group of coded signals comprising a first multidigit translation of each number registrable in said number register and a second group of coded signals comprising a second multidigit translation of each number registrable in said number register, means including said recording device continuously transmitting simultaneously said first group and said second group of coded signal translations for each registrable number in numerical order, a first selecting device, a second selecting device, means for operating said register to register a particular plural digit number and for operating said first or said second selecting device, a code signal register, and means operated at the instant the numerical order corresponding to said particular plural digit number registered in said number register is reached during the continuous transmission of said coded signals for rendering said code signal register operative to register said first group or said second group of coded signals corresponding to the multidigit translation of said particular number registered in said number register depending upon the operated condition of said first or said second selecting device.

40. In a translation device, a continually moving member of magnetic material having magnetized thereon coded signals corresponding to predetermined translations of different plural digit numbers and indexing signals corresponding in number to the maximum number of coded signals that may be magnetized on said member, means for transmitting all of said indexing signals and all of said coded signals during each cycle of operation of said member, a first counting device operated to count each of said indexing signals, a digit counter operated to count a digit each time said first counting device counts a predetermined number of indexing pulses, a first register, means for operating said first register to register one of said plural digit numbers, a second register, means for operating said second register to register translation digits corresponding to a new predetermined translation of said one plural digit number registered in said first register, a plurality of recording heads, circuits for said recording heads, means controlled by said digit counter in response to counting a number of digit pulses equal to said one registered plural digit number for completing said circuits for said recording heads, means controlled by said first counting device as it counts a predetermined number of indexing pulses for successively operating said recording heads over said circuits in accordance with the successive digits of said registered translation, whereby the successive operations of said recording heads magnetize said member in accordance with coded signals corresponding to the translation digits of said new predetermined translation of said one registered plural digit number and simultaneously rendering ineffective the magnetized coded signals corresponding to the original translation of said one registered plural digit number.

41. In a translator mechanism, a first register operative to register any plural digit number comprising a predetermined number of digits, cyclically operating means for generating a predetermined number of groups of indexing pulses during each cycle of operation, a fractional counter, means controlled by said indexing pulses for operating said fractional counter to register each indexing pulse in each of said groups, a digit counter, means controlled by said fractional counter each time a group of indexing pulses are counted for operating said digit counter to register digits indicative of the group of said indexing pulses counted by said fractional register, means operated to register a particular plural digit number in said first register, a translation register operated to register one or more translation digits corresponding to a particular translation of said particular plural digit number, a control device operable in accordance with translation digits to record code signals on said cyclically operating means, a coincidence detector governed in accordance with the digits registered in said digit counter for blocking operation of said control device in the event the digits registered in said digit counter fail to coincide with the said particular plural digit number registered in said first register and for unblocking said control device for operation in the event the digits registered in said digit counter coincide with the said particular plural digit number registered in said first register, said fractional counter thereafter controlling said control device sequentially in accordance with the translation digits registered in said translation register during the counting of a group of indexing pulses in order to record code signals corresponding to said translation digits on said cyclically operating means in the particular portion of its operating cycle that coincides with the group of indexing pulses that corresponds to the plural digit number registered in said first register.

42. In a magnetic recorder, a continuously moving member of magnetic material, a plurality of electromagnets adjacent said member, a control circuit for each of said electromagnets, an indexing head adjacent said member, a counting device, magnetized spots on member for controlling said indexing head to transmit successive indexing pulses to said counting device, a first register for preregistering any plural digit number having a predetermined number of digits, a first key set for operating said register to register a particular number, a second key set operative to register a plurality of digits representing the translation of said particular number registered in said first register, means selectively governed in accordance with the number registered in said first register and controlled by said counting device responsive to the counting thereby of a predetermined number of indexing pulses for completing said control circuits for said electromagnets, and means controlled by said counting device during the counting of an additional predetermined number of indexing pulses for transmitting over said control circuits successive signals corresponding to digits registered on said second key set in order to control said electromagnets to magnetize said member to record said digits.

43. In a magnetic recorder, a continuously moving member of magnetic material, a plurality of electromagnets adjacent said member, a control circuit for each of said electromagnets, an indexing head adjacent said member, a counting device, magnetized spots on member for controlling said indexing head to transmit successive indexing pulses to said counting device, a first register for registering any plural digit number having a predetermined number of digits, a first key set for operating said register to register a particular number, a second key set operative to register a plurality of digits representing the translation of said particular number registered in said first register, means selectively governed in accordance with the number registered in said first register and controlled by said counting device responsive to the counting thereby of a predetermined number of indexing pulses for completing said control circuits for said electromagnets, means thereafter controlled by said counting device during the counting of an additional predetermined number of indexing pulses for code marking said control circuits in accordance with each of the digits registered in said second key set, and means governed in accordance with said code markings for controlling said electromagnets to spot magnetize said member in accordance with said code markings.

44. In a translation device for translating any one of a plurality of called office codes, a register operated to register one of said called office codes, a signal generator operated to continuously generate groups of translation signals individual respectively to each one of said plurality of called office codes, a counting mechanism operated to count each group of said translation signals, a matching device operated to match the number of said groups of generated translation signals counted by said mechanism with the said one called office code registered in said register, and a signal transmitter operated to transmit only the said group of translation signals individual to said one registered called office code during the time the number of said group of generated translation signals matches said one registered called office code.

45. In a translating device for translating any one of a plurality of called office codes, a continuously moving member having magnetically recorded thereon individual translations for each of said plurality of called office codes, a register operated to register one of said called office codes, selecting means operated to select the particular recorded translation on said moving member individual to said registered called office code, and means for transmitting signals in accordance with only said selected translation.

46. In a translating device for translating any one of a plurality of called office codes, a register operated to register one of said called office codes, a member having magnetically recorded thereon translations individual to each of said plurality of called office codes, selecting means operated to select the particular translation on said member individual to said registered called office code, and means for transmitting only said selected translation.

47. In a translating device for translating any one of a plurality of different multi-digit called office codes into predetermined routing digits, a continuously moving endless tape having magnetically recorded thereon different groups of predetermined routing digits constituting individual translation of each of said called office codes, a register operated to register one of said called office codes, selecting means operated to select the portion of said tape having recorded thereon the particular group of routing digits individual to said registered called office code, and means for transmitting only said selected group of routing digits.

48. In a translating device for setting-up a telephone connection from a calling office to a called office, a register operated to register digits constituting the code of said called office, a magnetic medium having magnetic recordings thereon corresponding to a translation of said called office code digits, selecting means operated to select the portion of said magnetic medium having recorded thereon the particular translation of said registered called office code digits, a sender operated to send signals corresponding to said particular translation on said selected portion of said medium, and automatic switching apparatus controlled in accordance with said signals for completing a connection between said calling office and said called office.

49. In a translating device for setting-up a telephone connection from a calling line to a called line, a register operated to register a plurality of digits transmitted over said calling line constituting the directory number identifying said called line, a magnetic tape having recorded thereon given digits constituting a translation of certain of said registered digits of said called line directory number, selecting means operated to select said magnetic tape in accordance with said registered directory number, a sender operated to send signals corresponding to said given digits and to send signals corresponding to at least some of the digits of said registered directory number, and automatic switching apparatus selectively operated in accordance with said signals sent by said sender of said given digits and of said registered directory digits to set up a connection from said calling line to said called line.

50. In a translation device for setting-up a telephone connection from a calling office to a called office, a register operated to register digits constituting the code of said called office, a magnetic medium having magnetic recordings thereon bearing a predetermined relationship to said registered called office code digits, means controlled by the registration of said called office code digits for selecting said magnetic medium, a sender operated to send signals corresponding to said recordings on said magnetic medium, and automatic switching apparatus controlled in accordance with said signals to complete a connection between said calling office and said called office.

51. In a magnetic recorder, a continuously moving member of magnetic material having magnetically recorded thereon different index characters, an index register operated to register index characters, an information register operated to register information related to said index characters registered in said index register, magnetic recording heads associated with said member, means for sensing said index characters recorded on said magnetic member, and means controlled in response to the sensing of said index characters recorded on said magnetic member corresponding to said index characters registered in said index register for controlling said recording heads to record on said magnetic member said information registered in said information register.

52. In a magnetic recorder, a continuously moving member of magnetic material having magnetically recorded thereon different index numbers and information characters corresponding respectively to predetermined translations of each of said index numbers, magnetic recording heads associated with said member, an index register operated to register an index number, an information register operated to register information characters constituting a translation of said index number registered in said index register, means for sensing said index numbers recorded on said member, and means controlled in response to the sensing of the index number recorded on said member corresponding to said index number registered in said index register for controlling said recording heads to erase said translation characters previously recorded on said member and to record on said member said information characters registered in said information register, whereby a new translation of said index number is magnetically recorded on said member.

References Cited in the file of this patent

UNITED STATES PATENTS

| Number | Name | Date |
|---|---|---|
| 1,277,440 | Lundell | Sept. 3, 1918 |
| 2,112,951 | Carpenter | Apr. 5, 1938 |
| 2,254,933 | Bryce | Sept. 2, 1941 |
| 2,298,519 | Tillman | Oct. 13, 1942 |
| 2,359,617 | Bryce | Oct. 3, 1944 |
| 2,394,990 | Eisler | Feb. 19, 1946 |
| 2,416,445 | Jensen | Feb. 25, 1947 |
| 2,431,646 | Kenney | Nov. 25, 1947 |
| 2,437,118 | Ostline | Mar. 2, 1948 |
| 2,514,578 | Heller et al. | July 11, 1950 |
| 2,549,071 | Dusek | Apr. 17, 1951 |
| 2,564,403 | May | Aug. 14, 1951 |
| 2,567,812 | Hickman | Sept. 11, 1951 |
| 2,597,866 | Gridley | May 27, 1952 |